(12) United States Patent
Shimada et al.

(10) Patent No.: US 11,988,821 B2
(45) Date of Patent: May 21, 2024

(54) ZOOM LENS AND IMAGING APPARATUS

(71) Applicant: FUJIFILM Corporation, Tokyo (JP)

(72) Inventors: Yasutaka Shimada, Saitama (JP); Takuya Tanaka, Saitama (JP); Takashi Kunugise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 386 days.

(21) Appl. No.: 17/355,254

(22) Filed: Jun. 23, 2021

(65) Prior Publication Data

US 2022/0003977 A1    Jan. 6, 2022

(30) Foreign Application Priority Data

Jun. 29, 2020   (JP) ................. 2020-112157

(51) Int. Cl.
| | | |
|---|---|---|
| *G02B 15/14* | (2006.01) | |
| *G02B 13/00* | (2006.01) | |
| *G02B 13/18* | (2006.01) | |
| *G02B 15/20* | (2006.01) | |

(52) U.S. Cl.
CPC ... *G02B 15/145129* (2019.08); *G02B 13/009* (2013.01); *G02B 13/18* (2013.01); *G02B 15/20* (2013.01)

(58) Field of Classification Search
CPC .......... G02B 15/145129; G02B 13/009; G02B 13/18; G02B 15/20; G02B 27/0025; G02B 13/0045; G02B 15/173; G02B 13/02
See application file for complete search history.

(56) References Cited

U.S. PATENT DOCUMENTS

| | | | |
|---|---|---|---|
| 2011/0085251 A1 | 4/2011 | Wasawa | |
| 2012/0314298 A1* | 12/2012 | Ota ................ | G02B 15/145129 |
| | | | 359/683 |
| 2013/0003189 A1 | 1/2013 | Sanjo et al. | |
| 2015/0247996 A1* | 9/2015 | Ikeda .................. | G02B 15/173 |
| | | | 359/687 |
| 2016/0054579 A1 | 2/2016 | Miyazawa | |
| 2018/0203214 A1 | 7/2018 | Sakamoto | |
| 2018/0329186 A1 | 11/2018 | Fujikura et al. | |
| 2019/0094505 A1 | 3/2019 | Shimada et al. | |

(Continued)

FOREIGN PATENT DOCUMENTS

| | | | | |
|---|---|---|---|---|
| JP | 2007212830 | * | 8/2007 | ..... G02B 15/144113 |
| JP | 2013-033242 A | | 2/2013 | |
| JP | 2016-045297 A | | 4/2016 | |

(Continued)

OTHER PUBLICATIONS

An Office Action; "Notice of Reasons for Refusal," mailed by the Japanese Patent Office dated Apr. 25, 2023, which corresponds to Japanese Patent Application No. 2020-112157 and is related to U.S. Appl. No. 17/355,254; with English language translation.

*Primary Examiner* — Wyatt A Stoffa
*Assistant Examiner* — Ray Alexander Dean
(74) *Attorney, Agent, or Firm* — Studebaker & Brackett PC

(57) ABSTRACT

A zoom lens consisting of, in order from an object side to an image side: a first lens group that has a positive refractive power; a second lens group that has a negative refractive power; an intermediate lens group that consists of one or two lens groups; and a final lens group, wherein during zooming, the second lens group moves along an optical axis, and all distances between adjacent lens groups change.

19 Claims, 32 Drawing Sheets

(56) References Cited

U.S. PATENT DOCUMENTS

2019/0265447 A1   8/2019   Hori et al.

FOREIGN PATENT DOCUMENTS

| | | |
|---|---|---|
| JP | 2017-083782 A | 5/2017 |
| JP | 2017-156741 A | 9/2017 |
| JP | 2017-181719 A | 10/2017 |
| JP | 2018-116182 A | 7/2018 |
| JP | 2018-189839 A | 11/2018 |
| JP | 2018-194730 A | 12/2018 |
| JP | 2019-061064 A | 4/2019 |
| JP | 2019-148760 A | 9/2019 |
| KR | 10-2011-0040246 A | 4/2011 |
| WO | 2020/129837 A1 | 6/2020 |

\* cited by examiner

FIG. 2
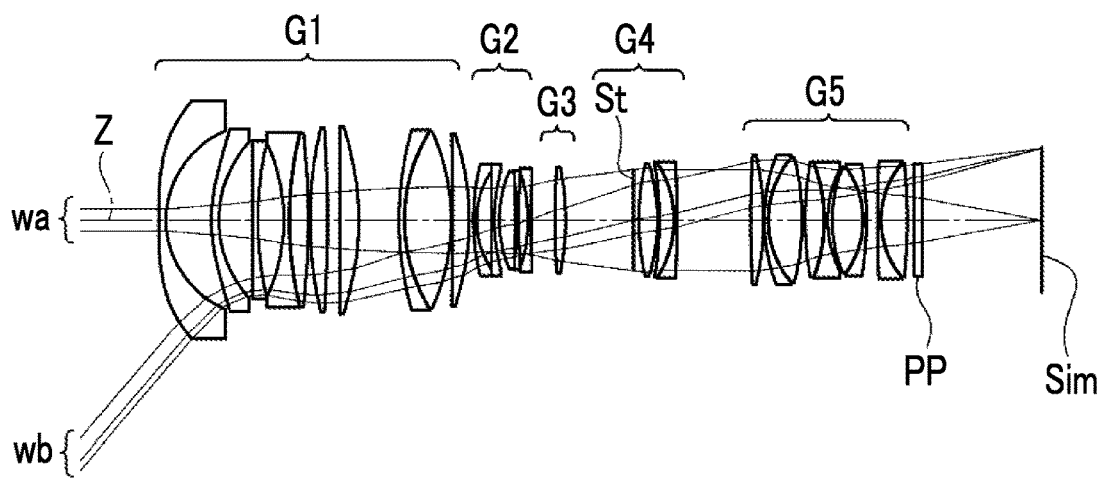
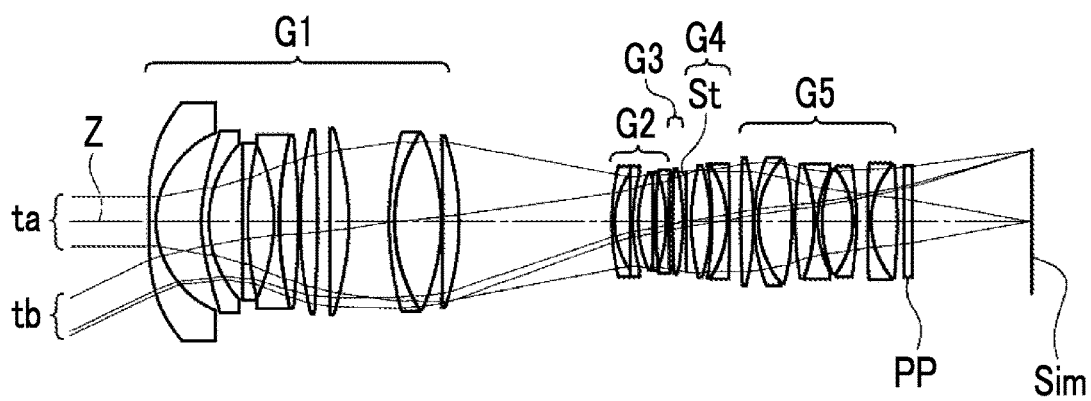

ZOOM LENS AND IMAGING APPARATUS

CROSS-REFERENCE TO RELATED APPLICATIONS

The present application claims priority under 35 U.S.C. § 119 to Japanese Patent Application No. 2020-112157, filed on Jun. 29, 2020. The above application is hereby expressly incorporated by reference, in its entirety, into the present application.

BACKGROUND

Technical Field

The present disclosure relates to a zoom lens and an imaging apparatus.

Related Art

In the related art, as a zoom lens applicable to an imaging apparatus such as a broadcasting camera, a movie camera, and a digital camera, for example, the lens systems described in JP2018-194730A, JP2017-181719A, and JP2017-083782A are known.

In recent years, there has been a demand for a zoom lens that has favorable optical performance while having a small size.

SUMMARY

The present disclosure has been made in view of the above circumstances, and an object of the present disclosure is to provide a zoom lens, which has favorable optical performance while having a small size, and an imaging apparatus including the zoom lens.

The zoom lens according to the first aspect of the present disclosure consists of, in order from an object side to an image side: a first lens group that has a positive refractive power; a second lens group that has a negative refractive power; an intermediate lens group that consists of one or two lens groups; and a final lens group, in which during zooming, the second lens group moves along an optical axis, and all distances between adjacent lens groups change.

The zoom lens according to the second aspect of the present disclosure consists of, in order from an object side to an image side: a first lens group that has a positive refractive power; a second lens group that has a negative refractive power; an intermediate lens group that consists of one or two lens groups; and a final lens group that has a positive refractive power. During zooming, the second lens group moves along an optical axis, and all distances between adjacent lens groups change, at least one lens group of the intermediate lens group and the final lens group includes a pair of a positive lens and a negative lens arranged adjacent to each other. Assuming that an Abbe number of the positive lens based on a d line is νp, an Abbe number of the negative lens based on the d line is νn, a refractive index of the negative lens at a d line is Nn, and a temperature coefficient of the refractive index of the negative lens at the d line at 25° C. is $(dNn/dT)\times 10^{-6}$, where a unit of $dNn/dT$ is $°C.^{-1}$, Conditional Expressions (1), (2), and (3) are satisfied.

$$-1.5 < dNn/dT < 3 \tag{1}$$

$$0 < Nn + 0.0105 \times \nu n - 2.2188 < 0.15 \tag{2}$$

$$1.5 < \nu p/\nu n < 2.5 \tag{3}$$

It is preferable that the zoom lens according to the second aspect satisfies at least one of Conditional Expressions (1-1), (2-1), or (3-1).

$$-0.5 < dNn/dT < 2 \tag{1-1}$$

$$0 < Nn + 0.0105 \times \nu n - 2.2188 < 0.1 \tag{2-1}$$

$$1.7 < \nu p/\nu n < 2.3 \tag{3-1}$$

Further, it is preferable that the zoom lens according to the second aspect satisfies Conditional Expressions (4) and (5), and it is more preferable that the zoom lens satisfies at least one of Conditional Expressions (4-1) and (5-1).

$$1.68 < Nn < 1.88 \tag{4}$$

$$1.71 < Nn < 1.85 \tag{4-1}$$

$$30 < \nu n < 50 \tag{5}$$

$$33 < \nu n < 48 \tag{5-1}$$

Further, in the zoom lens according to the second aspect, assuming that a focal length of the positive lens is fp, a focal length of the negative lens is fn, a temperature coefficient of the refractive index of the positive lens at the d line at 25° C. is $(dNp/dT)\times 10^{-6}$, and a unit of fp and fn is mm and a unit of $dNp/dT$ is $°C.^{-1}$, it is preferable that Conditional Expression (6) is satisfied, and it is more preferable that Conditional Expression (6-1) is satisfied.

$$-0.2 < (dNp/dT)/fp + (dNn/dT)/fn < 0.2 \tag{6}$$

$$-0.15 < (dNp/dT)/fp + (dNn/dT)/fn < 0.15 \tag{6-1}$$

Further, in the zoom lens according to the second aspect, assuming that a partial dispersion ratio of the positive lens between a g line and an F line is θgFp, and a partial dispersion ratio of the negative lens between the g line and the F line is θgFn, it is preferable that Conditional Expression (7) is satisfied, and it is more preferable that Conditional Expression (7-1) is satisfied.

$$0 < \theta gFn - \theta gFp < 0.07 \tag{7}$$

$$0.01 < \theta gFn - \theta gFp < 0.06 \tag{7-1}$$

Further, in the zoom lenses according to the first and second aspects, assuming that an average value of Abbe numbers of all positive lenses included in the intermediate lens group and the final lens group based on the d line is νpave, and an average value of Abbe numbers of all negative lenses included in the intermediate lens group and the final lens group based on the d line is νnave, it is preferable that Conditional Expression (8) is satisfied, and it is more preferable that Conditional Expression (8-1) is satisfied.

$$1 < \nu pave/\nu nave < 1.85 \tag{8}$$

$$1 < \nu pave/\nu nave < 1.8 \tag{8-1}$$

Further, in the zoom lenses according to the first and second aspects, it is preferable that the first lens group remains stationary with respect to an image plane during zooming.

Further, in the zoom lenses according to the first and second aspects, it is preferable that the final lens group remains stationary with respect to an image plane during zooming.

Further, in the zoom lens according to the first and second aspects, assuming that a focal length of the zoom lens at a wide angle end in a state where an object at infinity is in focus is fw, and a focal length of the first lens group is f1, it is preferable that Conditional Expression (9) is satisfied.

$$0.3 < fw/f1 < 0.55 \qquad (9)$$

Further, in the zoom lenses according to the first and second aspects, the intermediate lens group may consist of, in order from the object side to the image side: a third lens group having a positive refractive power; and a fourth lens group having a positive refractive power.

Further, in the zoom lenses according to the first and second aspects, the intermediate lens group may consist of, in order from the object side to the image side: a third lens group having a negative refractive power; and a fourth lens group having a positive refractive power.

In the present specification, it should be noted that the terms "consisting of ~" and "consists of ~" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~group that has a positive refractive power" in the present specification means that the group has a positive refractive power as a whole. Similarly, the term "~group having a negative refractive power" means that the group has a negative refractive power as a whole. The "lens group" is not limited to a configuration in which the lens group consists of plural lenses, but the lens group may consist of only one lens. Further, regarding the "one lens group", the "one lens group" is defined as a lens group of which the distance to the adjacent group in the optical axis direction changes during zooming. That is, in a case where the lens group is divided at distances that change during zooming, the lens group included in one division is regarded as one lens group.

The terms "a lens having a positive refractive power", "a positive lens", and "a lens with a positive power" are synonymous. The terms "a lens having a negative refractive power", "a negative lens", and "a lens with a negative power" are synonymous. A compound aspheric lens (a lens in which a spherical lens and an aspheric film formed on the spherical lens are integrally formed and function as one aspheric lens as a whole) is not regarded as cemented lenses, but the compound aspheric lens is regarded as one lens. Unless otherwise specified, a sign of the refractive power and a surface shape of a lens surface of a lens including an aspheric surface are considered in the paraxial region.

The "focal length" used in each conditional expression is a paraxial focal length. The values used in each conditional expression are based on the d line except for the partial dispersion ratio in a state where the object at infinity is in focus. The partial dispersion ratio θgF between the g line and the F line of a certain lens is defined by θgF=(Ng−NF)/(NF−NC), where Ng, NF, and NC are the refractive indices of the lens at the g line, the F line, and the C line.

The "C line", "d line", "F line", and "g line" described in the present specification are emission lines. The wavelength of the C line is 656.27 nm (nanometers) and the wavelength of the d line is 587.56 nm (nanometers), the wavelength of F line is 486.13 nm (nanometers), and the wavelength of g line is 435.84 nm (nanometers).

According to the aspects of the present disclosure, it is possible to provide a zoom lens, which has favorable optical performance while having a small size, and an imaging apparatus including the zoom lens.

BRIEF DESCRIPTION OF THE DRAWINGS

FIG. 2 is a cross-sectional view showing a configuration and rays of a zoom lens of Example 1.

DESCRIPTION OF EMBODIMENTS

Hereinafter, embodiments of the present disclosure will be described in detail with reference to the accompanying drawings.

Figure 1:
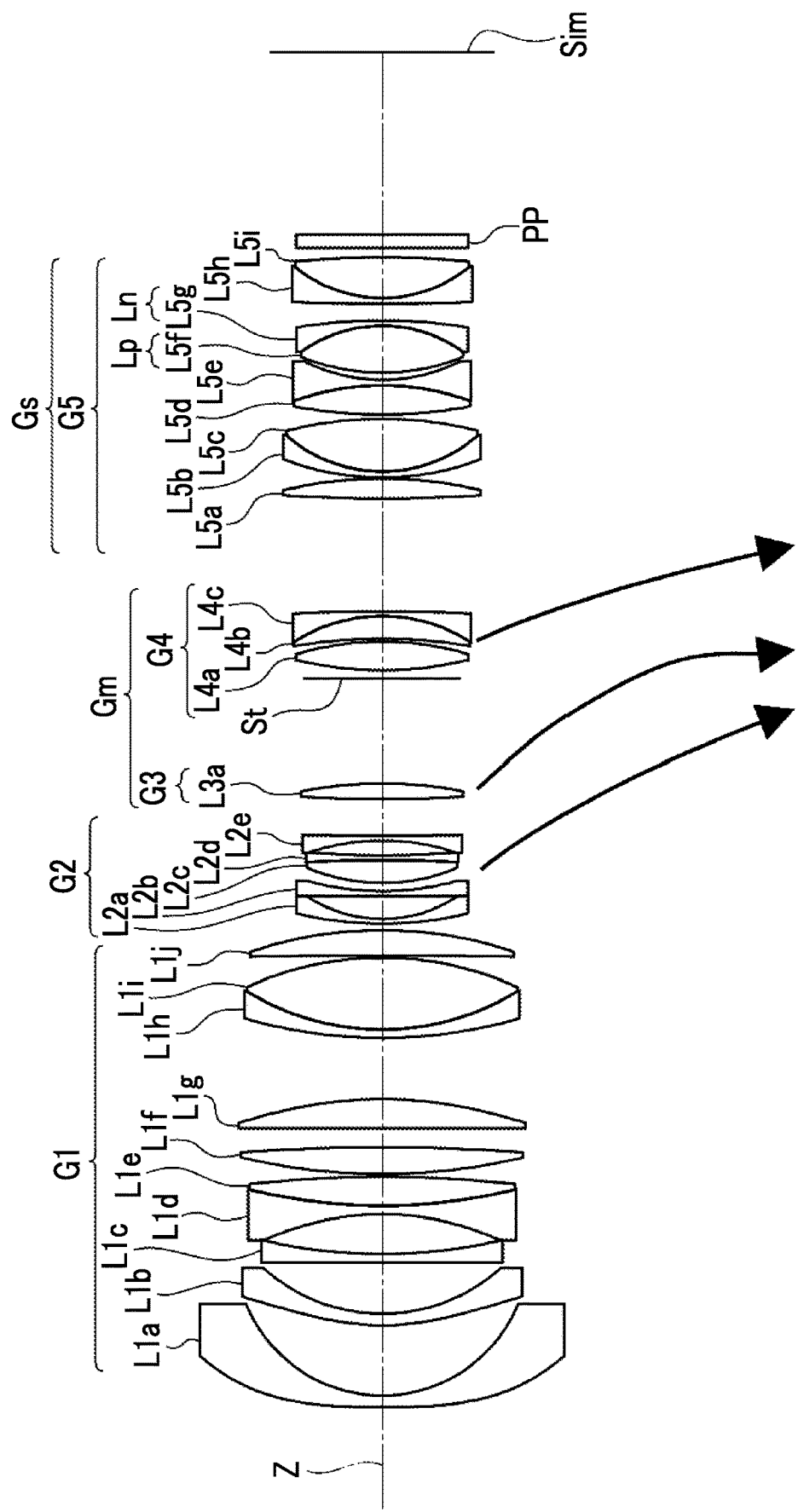
FIG. 1 is a cross-sectional view showing a configuration of a zoom lens according to an embodiment of the present disclosure and a diagram showing movement loci thereof, the zoom lens corresponding to a zoom lens of Example 1.

First, the configuration of the zoom lens according to the first embodiment of the present disclosure will be described with reference to FIGS. 1 and 2. FIG. 1 is a cross-sectional view showing a configuration and movement loci of a zoom lens according to an embodiment of the present disclosure. FIG. 2 is a cross-sectional view showing a lens configuration and rays in each state of the zoom lens. The examples shown in FIGS. 1 and 2 correspond to a zoom lens of Example 1 described later. FIGS. 1 and 2 show situations where an object at infinity is in focus, the left side thereof is an object side, and the right side thereof is an image side. FIG. 1 shows a wide angle end state. In FIG. 2, the upper part labeled "wide angle end" shows the wide angle end state, and the lower part labeled "telephoto end" shows the telephoto end state. FIG. 2 shows, as the rays, the on-axis rays wa and rays with the maximum angle of view wb in the wide angle end state and the on-axis rays to and rays with the maximum angle of view tb in the telephoto end state.

Further, FIGS. 1 and 2 show an example in which, assuming that a zoom lens is applied to an imaging apparatus, an optical member PP of which the incident surface and the exit surface are parallel is disposed between the zoom lens and the image plane Sim. The optical member PP is a member assumed to include at various filters, a prism, a cover glass, and/or the like. The various filters include, for example, a low pass filter, an infrared cut filter, and a filter that cuts a specific wavelength region. The optical member PP has no refractive power, and the optical member PP may be configured to be omitted. Hereinafter, the description will be made mainly with reference to FIG. 1.

The zoom lens according to the present embodiment consists of a first lens group G1, a second lens group G2, an intermediate lens group Gm, and a final lens group Gs in order from the object side to the image side. The first lens group G1 is a lens group having a positive refractive power. The second lens group G2 is a lens group having a negative refractive power. The intermediate lens group Gm consists of one or two lens groups. The final lens group Gs is a lens group having a positive refractive power. In the zoom lens according to the present embodiment, the second lens group G2 moves along the optical axis during zooming, and all distances between adjacent lens groups change.

By making the first lens group G1 closest to the object side have a positive refractive power, it is possible to achieve reduction in total length of the lens system. Thus, there is an advantage in achieving reduction in size. For the second lens group G2 that moves through zooming and has a negative refractive power, the intermediate lens group Gm is able to correct fluctuation in focusing position due to the zooming. In a case where the intermediate lens group Gm consists of one lens group, the zooming mechanism can be simplified. Thus, there is an advantage in achieving reduction in weight. In a case where the intermediate lens group Gm consists of two lens groups, the two lens groups are relatively moved in a floating method. Therefore, it is possible to satisfactorily correct field curvature and fluctuations in spherical aberration during zooming. Since the final lens group Gs closest to the image side has a positive refractive power, it is possible to suppress an increase in incident angle of the principal ray of the off-axis rays on the image plane Sim. Thus, there is an advantage in suppressing shading.

The zoom lens shown in FIG. 1 consists of, in order from the object side to the image side along the optical axis Z, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The aperture stop St is disposed at a position closest to the object side in the fourth lens group G4. It should be noted that the aperture stop St shown in FIG. 1 does not indicate a shape thereof, but indicates a position thereof in the optical axis direction. In the example shown in FIG. 1, the group consisting of the third lens group G3 and the fourth lens group G4 corresponds to the intermediate lens group Gm, and the fifth lens group G5 corresponds to the final lens group Gs.

In the zoom lens of the example shown in FIG. 1, during zooming, the second lens group G2, the third lens group G3, and the fourth lens group G4 move along the optical axis Z by changing the distances between the adjacent groups of the respective groups. That is, the third lens group G3 and the fourth lens group G4, which are two lens groups included in the intermediate lens group Gm, move along the optical axis Z in different loci respectively during zooming. In FIG. 1, under the lens group that moves during zooming, each arrow schematically indicates the movement locus of each lens group during zooming from the wide angle end to the telephoto end.

In the zoom lens of the example shown in FIG. 1, the first lens group G1 consists of ten lenses L1a to L1j in order from the object side to the image side. The second lens group G2 consists of five lenses L2a to L2e in order from the object side to the image side. The third lens group G3 consists of one lens L3a. The fourth lens group G4 consists of, in order from the object side to the image side, an aperture stop St and three lenses L4a to L4c. The fifth lens group G5 consists of nine lenses L5a to L5i in order from the object side to the image side.

In the zoom lens of the present disclosure, the number of lenses constituting each lens group and the position of the aperture stop St can be different from the example shown in FIG. 1.

In the zoom lens according to the present embodiment, at least one lens group of the intermediate lens group Gm and the final lens group Gs includes a pair of positive lens Lp and a negative lens Ln arranged adjacent to each other. Here, the "pair of positive lens Lp and negative lens Ln" is a pair of a positive lens and a negative lens arranged adjacent to each other, and means that a surface distance on the optical axis between the lenses is smaller than a surface distance on the optical axis between each lens and the other adjacent lens. The "pair of positive lens Lp and negative lens Ln" also includes a cemented lens. Further, it is assumed that the positive lens Lp and the negative lens Ln are included in the same lens group, and other components such as the aperture stop St are not included between the positive lens Lp and the negative lens Ln.

Assuming that an Abbe number of the positive lens Lp based on the d line is νp, an Abbe number of the negative lens Ln based on the d line is νn, a refractive index of the negative lens Ln at the d line is Nn, and a temperature coefficient of the refractive index of the negative lens Ln at the d line at 25° C. is $(dNn/dT) \times 10^{-6}$, where the unit of dNn/dT is $°C.^{-1}$, the positive lens Lp and the negative lens Ln satisfy Conditional Expressions (1), (2), and (3).

$$-1.5 < dNn/dT < 3 \qquad (1)$$

$$0 < Nn + 0.0105 \times vn - 2.2188 < 0.15 \qquad (2)$$

$$1.5 < vp/vn < 2.5 \qquad (3)$$

By not allowing the result of Conditional Expression (1) to be equal to or less than the lower limit, a material having a high refractive index or a material having an appropriate Abbe number can be selected for the negative lens Ln. Therefore, the absolute value of the curvature can be prevented from being large. Thus, it is easy to suppress occurrence of various aberrations including chromatic aberration. Further, it is possible to prevent the thickness of the peripheral portion of the negative lens Ln in the optical axis direction from being excessively large. Thus, there is an advantage in achieving reduction in size. By not allowing the result of Conditional Expression (1) to be equal to or greater than the upper limit, it is possible to suppress fluctuation in focusing position in a case where the temperature changes. For example, in an optical system such as a zoom lens according to the present embodiment, the focusing position generally tends to move toward the image side in a case where the temperature increases. By not allowing the result of Conditional Expression (1) to be equal to or greater than the upper limit, it is possible to suppress the movement of the focusing position to the image side in a case where the temperature increases. In addition, in a case of a configuration in which Conditional Expression (1-1) is satisfied, it is possible to obtain more favorable characteristics.

$$-0.5 < dNn/dT < 2 \qquad (1-1)$$

By not allowing the result of Conditional Expression (2) to be equal to or less than the lower limit, a material having a high refractive index or a material having an appropriate Abbe number can be selected for the negative lens Ln. Therefore, the absolute value of the curvature can be prevented from being large. Thus, it is easy to suppress occurrence of various aberrations including chromatic aberration. Further, it is possible to prevent the thickness of the peripheral portion of the negative lens Ln in the optical axis direction from being excessively large. Thus, there is an advantage in achieving reduction in size. By not allowing the result of Conditional Expression (2) to be equal to or greater than the upper limit, the absolute value of the curvature of the negative lens Ln is prevented from being small. Thus, there is an advantage in correcting chromatic aberration. Moreover, since it is possible to select a material having an appropriate Abbe number, it is easy to correct chromatic aberration. In addition, in a case of a configuration in which Conditional Expression (2-1) is satisfied, it is possible to obtain more favorable characteristics.

$$0 < Nn + 0.0105 \times vn - 2.2188 < 0.1 \qquad (2-1)$$

By satisfying Conditional Expression (3), primary longitudinal chromatic aberration can be appropriately corrected, and longitudinal chromatic aberration and lateral chromatic aberration can be easily corrected. In addition, in a case of a configuration in which Conditional Expression (3-1) is satisfied, it is possible to obtain more favorable characteristics.

$$1.7 < vp/vn < 2.3 \qquad (3-1)$$

For example, in the zoom lens of the example shown in FIG. 1, the lens L5f corresponds to the positive lens Lp and the lens L5g corresponds to the negative lens Ln. In the zoom lens according to the present embodiment, the positive lens Lp and the negative lens Ln can be different from the example shown in FIG. 1.

Further, in the zoom lens according to the present embodiment, it is preferable that the negative lens Ln satisfies Conditional Expression (4). By not allowing the result of Conditional Expression (4) to be equal to or less than the lower limit, a material having a high refractive index can be selected. Therefore, it is possible to prevent the absolute value of the curvature from being large, and it is easy to suppress occurrence of various aberrations including chromatic aberration. Further, it is possible to prevent the thickness of the peripheral portion of the negative lens Ln in the optical axis direction from being excessively large. Thus, there is an advantage in achieving reduction in size. By not allowing the result of Conditional Expression (4) to be equal to or greater than the upper limit, it is possible to select a material having an appropriate Abbe number. Therefore, it is easy to suppress occurrence of lateral chromatic aberration. In addition, in a case of a configuration in which Conditional Expression (4-1) is satisfied, it is possible to obtain more favorable characteristics.

$$1.68 < Nn < 1.88 \qquad (4)$$

$$1.71 < Nn < 1.85 \qquad (4-1)$$

Further, in the zoom lens according to the present embodiment, it is preferable that the negative lens Ln satisfies Conditional Expression (5). By not allowing the result of Conditional Expression (5) to be equal to or less than the lower limit, it is easy to suppress occurrence of chromatic aberration. By not allowing the result of Conditional Expression (5) to be equal to or greater than the upper limit, a material having a high refractive index can be selected. Therefore, it is possible to prevent the absolute value of the curvature from being large, and it is easy to suppress occurrence of various aberrations including chromatic aberration. Further, it is possible to prevent the thickness of the peripheral portion of the negative lens Ln in the optical axis direction from being excessively large. Thus, there is an advantage in achieving reduction in size. In addition, in a case of a configuration in which Conditional Expression (5-1) is satisfied, it is possible to obtain more favorable characteristics.

$$30 < vn < 50 \qquad (5)$$

$$33 < vn < 48 \qquad (5-1)$$

Further, in the zoom lens according to the present embodiment, assuming that a focal length of the positive lens Lp is fp, a focal length of the negative lens Ln is fn, a temperature coefficient of the refractive index of the positive lens Lp at the d line at 25° C. is $(dNp/dT) \times 10^{-6}$, and the unit of fp and fn is mm (millimeter) and the unit of dNp/dT is $°C.^{-1}$, it is preferable that the positive lens Lp and the negative lens Ln satisfy Conditional Expression (6). By not allowing the result of Conditional Expression (6) to be equal to or less than the lower limit, it is possible to suppress fluctuations in focusing position in a case where the temperature changes. For example, in an optical system such as a zoom lens according to the present embodiment, the focusing position generally tends to move toward the image side in a case where the temperature increases. By not allowing the result of Conditional Expression (6) to be equal to or greater than the upper limit, it is possible to suppress the movement of the focusing position to the image side in a case where the temperature increases. By not allowing the result of Conditional Expression (6) to be equal to or greater than the upper limit, the positive lens Lp can be made to have an appropriate refractive power, and longitudinal chromatic aberration can be easily corrected. Further, since a material having an appropriate refractive index and an appropriate Abbe number can be selected for the negative lens Ln, occurrence of various aberrations can be suppressed. In addition, in a case of a configuration in which Conditional Expression (6-1) is satisfied, it is possible to obtain more favorable characteristics.

$$-0.2<(dNp/dT)/fp+(dNn/dT)/fn<0.2 \quad (6)$$

$$-0.15<(dNp/dT)/fp+(dNn/dT)/fn<0.15 \quad (6\text{-}1)$$

Further, in the zoom lens according to the present embodiment, assuming that a partial dispersion ratio of the positive lens Lp between a g line and an F line is θgFp, and a partial dispersion ratio of the negative lens Ln between the g line and the F line is θgFn, it is preferable that the positive lens Lp and the negative lens Ln satisfy Conditional Expression (7). By not allowing the result of Conditional Expression (7) to be equal to or less than the lower limit, a material having an appropriate Abbe number can be selected, and it is easy to correct primary longitudinal chromatic aberration. By not allowing the result of Conditional Expression (7) to be equal to or greater than the upper limit, it is easy to correct secondary longitudinal chromatic aberration. In addition, in a case of a configuration in which Conditional Expression (7-1) is satisfied, it is possible to obtain more favorable characteristics.

$$0<θgFn-θgFp<0.07 \quad (7)$$

$$0.01<θgFn-θgFp<0.06 \quad (7\text{-}1)$$

Next, the configuration of the zoom lens according to the second embodiment of the present disclosure will be described with reference to FIG. 1. Since the illustration method and configuration of the zoom lens shown in FIG. 1 are as described above, some description will not be repeated here. The zoom lens according to the present embodiment consists of a first lens group G1, a second lens group G2, an intermediate lens group Gm, and a final lens group Gs in order from the object side to the image side. The first lens group G1 is a lens group having a positive refractive power. The second lens group G2 is a lens group having a negative refractive power. The intermediate lens group Gm consists of one or two lens groups. In the zoom lens according to the present embodiment, the second lens group G2 moves along the optical axis during zooming, and all distances between adjacent lens groups change.

By making the first lens group G1 closest to the object side have a positive refractive power, it is possible to achieve reduction in total length of the lens system. Thus, there is an advantage in achieving reduction in size. For the second lens group G2 that moves through zooming and has a negative refractive power, the intermediate lens group Gm is able to correct fluctuation in focusing position due to the zooming. In a case where the intermediate lens group Gm consists of one lens group, the zooming mechanism can be simplified. Thus, there is an advantage in achieving reduction in weight. In a case where the intermediate lens group Gm consists of two lens groups, the two lens groups are relatively moved in a floating method. Therefore, it is possible to satisfactorily correct field curvature and fluctuations in spherical aberration during zooming.

Next, a preferable configuration and a possible configuration common to the zoom lenses according to the first embodiment and the second embodiment of the present disclosure will be described.

In the zoom lens according to each embodiment, it is preferable that the first lens group G1 remains stationary with respect to the image plane during zooming. In the example zoom lens shown in FIG. 1, the first lens group G1 remains stationary with respect to the image plane Sim during zooming. By making the first lens group G1 having the largest outer shape stationary with respect to the image plane Sim, it is possible to reduce fluctuation in center of gravity of the zoom lens due to the zooming. Therefore, the convenience at the time of imaging can be enhanced.

Further, in the zoom lens according to each embodiment, it is preferable that the final lens group Gs remains stationary with respect to the image plane during zooming. In the zoom lens of the example shown in FIG. 1, the fifth lens group G5 corresponding to the final lens group Gs remains stationary with respect to the image plane Sim during zooming. There are many members such as a communication contact with the camera body and a mount mechanism to be provided and arranged near the final lens group Gs closest to the image side. Therefore, the final lens group Gs remains stationary during zooming, and the moving mechanism for the final lens group Gs is not necessary. As a result, this configuration is advantageous for achieving reduction in size and weight.

Further, in the zoom lens according to each embodiment, for example, the configuration described below can be adopted as the intermediate lens group Gm. The intermediate lens group Gm can be configured to consist of, in order from the object side to the image side: the third lens group G3 having a positive refractive power; and the fourth lens group G4 having a positive refractive power. In such a case, since the third lens group G3 has a positive refractive power, the height of the rays incident on the fourth lens group G4 in the radial direction can be suppressed to a low value. Thus, there is an advantage in achieving reduction in size.

Alternatively, the intermediate lens group Gm can be configured to consist of, in order from the object side to the image side: the third lens group G3 having a negative refractive power; and the fourth lens group G4 having a positive refractive power. In such a case, since the third lens group G3 can also have a zooming effect together with the second lens group G2, it is easy to suppress fluctuations in various aberrations during zooming. As a result, there is an advantage in achieving an increase in magnification.

Further, in the zoom lens according to each embodiment, assuming that an average value of Abbe numbers of all positive lenses included in the intermediate lens group Gm and the final lens group Gs based on the d line is vpave, and an average value of Abbe numbers of all negative lenses included in the intermediate lens group Gm and the final lens group Gs based on the d line is vnave, it is preferable that Conditional Expression (8) is satisfied. By satisfying Conditional Expression (8), primary longitudinal chromatic aberration can be appropriately corrected, and longitudinal chromatic aberration and lateral chromatic aberration can be easily corrected. In addition, in a case of a configuration in which Conditional Expression (8-1) is satisfied, it is possible to obtain more favorable characteristics.

$$1 < vpave/vnave < 1.85 \quad (8)$$

$$1 < vpave/vnave < 1.8 \quad (8\text{-}1)$$

Further, in the zoom lens according to each embodiment, assuming that a focal length of the zoom lens at a wide angle end in a state where an object at infinity is in focus is fw, and a focal length of the first lens group G1 is f1, it is preferable that Conditional Expression (9) is satisfied. By not allowing the result of Conditional Expression (9) to be equal to or less than the lower limit, it is possible to suppress an increase in total length of the lens system. By not allowing the result of Conditional Expression (9) to be equal to or greater than the upper limit, it is possible to suppress the focal length of the first lens group G1 from being short, that is, it is possible to suppress the back focal length of the first lens group G1 from being short in a case where the first lens group G1 is approximated as a thin lens. Thereby, it is easy to take a long range in which the second lens group G2 is able to move during zooming, and it is easy to ensure a necessary magnification. In addition, in a case of a configuration in which Conditional Expression (9-1) is satisfied, it is possible to obtain more favorable characteristics.

$$0.3 < fw/f1 < 0.55 \quad (9)$$

$$0.4 < fw/f1 < 0.55 \quad (9\text{-}1)$$

The above-mentioned preferred configurations and available configurations according to each embodiment may be optional combinations, and it is preferable to appropriately and selectively adopt the configurations in accordance with required specification.

Next, numerical examples of the zoom lens of the present disclosure will be described.

Example 1

FIG. 1 is a cross-sectional view showing a configuration of a zoom lens of Example 1, and an illustration method and a configuration thereof are as described above. Therefore, some description is not repeated herein. Tables 1A and 1B show basic lens data of the zoom lens of Example 1, Table 2 shows specification and variable surface distance, and Table 3 shows aspheric surface coefficients thereof. In addition, Table 1A and Table 1B show the basic lens data divided into two tables in order to avoid lengthening of one table.

In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the Nd column shows the refractive index of each component at the d line, the vd column shows the Abbe number based on the d line of each component, the θgF column shows the partial dispersion ratio of each component between the g line and F line, the column of dN/dT shows the temperature coefficient of the refractive index of each component at the d line at 25° C. ($\times 10^{-6}$). For lenses, the respective columns of materials show material names of the respective lenses and names of manufacturers thereof with periods interposed therebetween. The names of the manufacturers are shown schematically. "OHARA" is OHARA Inc., "HOYA" is HOYA Corporation, "HIKARI" is Hikari Glass Co., Ltd., "SUMITA" is Sumita Optical Glass, Inc., and "SCHOTT" is SCHOTT AG, and "CDGM" is CDGM Glass Co., Ltd.

In Tables 1A and 1B, the sign of the radius of curvature of the surface convex toward the object side is positive and the sign of the radius of curvature of the surface convex toward the image side is negative. Table 1B also shows the aperture stop St and the optical member PP, and in the column of the surface number of the surface corresponding to the aperture stop St, the surface number and (St) are noted. A value at the bottom place of D in Table 1B indicates a distance between the image plane Sim and the surface closest to the image side in the table. In Tables 1A and 1B, the symbol DD[ ] is used for each variable surface distance during zooming, and the object side surface number of the distance is given in [ ] and is noted in the column D.

Table 2 shows values of the zoom ratio Zr, the focal length f of the zoom lens, the back focal length Bf of the zoom lens at the air conversion distance, the F number FNo., the maximum total angle of view 2ω, and the variable surface distance, based on the d line. (°) in the place of 2ω indicates that the unit thereof is a degree. In Table 2, the columns labeled the wide angle end and the telephoto end show values in the wide angle end state and the telephoto end state, respectively.

In Tables 1A and 1B, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m is an integer of 4 or more) shows numerical values of the aspheric surface coefficients for each aspheric surface. The "E±n" (n: an integer) in numerical values of the aspheric surface coefficients of Table 3 indicates "$\times^{\pm n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | vd | θgF | dN/dT (×10⁻⁶) | Material Name |
|---|---|---|---|---|---|---|---|
| *1 | 325.68480 | 2.415 | 1.80100 | 34.97 | 0.5864 | 3.6 | S-LAM66.OHARA |
| 2 | 31.36758 | 14.499 | | | | | |
| *3 | 50.64932 | 2.400 | 1.90366 | 31.31 | 0.5948 | 4.0 | TAFD25.HOYA |
| 4 | 37.97759 | 10.572 | | | | | |
| 5 | ∞ | 1.740 | 1.90200 | 25.26 | 0.6166 | 2.0 | J-LASFH24HS.HIKARI |
| 6 | 111.07178 | 8.183 | | | | | |
| 7 | −60.84110 | 1.750 | 1.48749 | 70.24 | 0.5301 | −0.8 | S-FSL5.OHARA |
| 8 | 119.13110 | 5.940 | 1.84666 | 23.78 | 0.6192 | 1.4 | FDS90-SG.HOYA |
| 9 | −260.02173 | 0.619 | | | | | |
| 10 | 131.21712 | 5.500 | 1.73800 | 32.33 | 0.5900 | 5.1 | S-NBH53V.OHARA |
| 11 | −423.87338 | 3.945 | | | | | |
| 12 | ∞ | 6.010 | 1.49700 | 81.54 | 0.5375 | −6.2 | S-FPL51.OHARA |
| *13 | −84.63923 | 12.623 | | | | | |
| 14 | 105.78722 | 1.755 | 1.84666 | 23.78 | 0.6192 | 1.4 | FDS90-SG.HOYA |
| 15 | 55.63867 | 14.740 | 1.43700 | 95.10 | 0.5336 | −6.3 | FCD100.HOYA |
| 16 | −70.95481 | 0.500 | | | | | |
| 17 | −1360.44797 | 5.210 | 1.53775 | 74.70 | 0.5394 | −4.3 | S-FPM3.OHARA |
| 18 | −88.25851 | DD[18] | | | | | |
| 19 | 76.39427 | 1.000 | 1.59282 | 68.62 | 0.5441 | −5.7 | FCD515.HOYA |
| 20 | 29.07957 | 4.747 | | | | | |
| 21 | ∞ | 1.000 | 1.72916 | 54.67 | 0.5453 | 3.4 | TAC8.HOYA |
| 22 | 59.78822 | 1.705 | | | | | |
| 23 | 41.42340 | 4.670 | 1.72825 | 28.32 | 0.6076 | 2.6 | E-FD10L.HOYA |
| 24 | −338.20563 | 1.000 | 1.72916 | 54.67 | 0.5453 | 3.4 | TAC8.HOYA |
| 25 | 219.57033 | 3.075 | | | | | |
| 26 | −49.00340 | 1.000 | 1.88100 | 40.14 | 0.5701 | 4.5 | TAFD33.HOYA |
| 27 | 1057.78187 | DD[27] | | | | | |
| 28 | 331.64729 | 3.250 | 1.49700 | 81.61 | 0.5389 | −6.2 | FCD1.HOYA |
| 29 | −85.63272 | DD[29] | | | | | |

TABLE 1B

Example 1

| Sn | R | D | Nd | vd | θgF | dN/dT (×10⁻⁶) | Material Name |
|---|---|---|---|---|---|---|---|
| 30(St) | ∞ | 1.700 | | | | | |
| *31 | 75.90440 | 5.950 | 1.73800 | 32.33 | 0.5900 | 5.1 | S-NBH53V.OHARA |
| 32 | −63.72691 | 0.602 | | | | | |
| 33 | −109.24994 | 4.670 | 1.51742 | 52.43 | 0.5565 | 2.4 | S-NSL36.OHARA |
| 34 | −34.82100 | 0.900 | 1.87070 | 40.73 | 0.5683 | 3.9 | TAFD32.HOYA |
| 35 | −454.40527 | DD[35] | | | | | |
| 36 | 327.07424 | 4.150 | 1.56883 | 56.00 | 0.5485 | 3.1 | J-BAK4.HIKARI |
| 37 | −91.92051 | 0.217 | | | | | |
| 38 | 58.74338 | 1.270 | 1.59270 | 35.27 | 0.5936 | 0.3 | J-F16.HIKARI |
| 39 | 31.10410 | 10.870 | 1.59282 | 68.62 | 0.5441 | −5.7 | FCD515.HOYA |
| 40 | −85.30585 | 0.934 | | | | | |
| 41 | 104.17963 | 6.000 | 1.53775 | 74.70 | 0.5394 | −4.3 | S-FPM3.OHARA |
| 42 | −55.08990 | 1.155 | 1.91082 | 35.25 | 0.5822 | 5.3 | TAFD35.HOYA |
| 43 | 37.31995 | 1.488 | | | | | |
| 44 | 46.54141 | 9.690 | 1.53775 | 74.70 | 0.5394 | −4.3 | S-FPM3.OHARA |
| 45 | −29.49730 | 1.095 | 1.83400 | 37.17 | 0.5787 | −0.1 | S-LAH60MQ.OHARA |
| 46 | −115.14262 | 3.475 | | | | | |
| 47 | 499.35766 | 1.155 | 1.91082 | 35.25 | 0.5822 | 5.3 | TAFD35.HOYA |
| 48 | 29.36260 | 8.250 | 1.69895 | 30.05 | 0.6028 | 2.5 | E-FD15L.HOYA |
| 49 | −199.52702 | 2.000 | | | | | |
| 50 | ∞ | 2.620 | 1.51680 | 64.20 | 0.5343 | 2.7 | BSC7.HOYA |
| 51 | ∞ | 37.885 | | | | | |

TABLE 2

| | Example 1 | |
| --- | --- | --- |
| | Wide Angle End | Telephoto End |
| Zr | 1.0 | 2.3 |
| f | 19.699 | 44.933 |
| Bf | 37.885 | 37.885 |
| FNo. | 2.74 | 2.75 |
| 2ω(°) | 100.8 | 53.0 |
| DD[18] | 1.320 | 48.072 |
| DD[27] | 7.572 | 1.024 |
| DD[29] | 21.360 | 1.034 |
| DD[35] | 23.229 | 3.351 |

TABLE 3

| | Example 1 | | | |
| --- | --- | --- | --- | --- |
| Sn | 1 | 3 | 13 | 31 |
| KA | 1.0000000E+00 | 1.0000000E+00 | 1.0000000E+00 | 1.0000000E+00 |
| A4 | 8.1453055E−06 | −6.2292685E−06 | 8.8331424E−07 | −3.8866746E−07 |
| A6 | −1.0228643E−08 | 1.1380002E−09 | −1.5311922E−09 | −6.2132119E−09 |
| A8 | 1.4833718E−11 | 1.1596949E−11 | 1.1135019E−11 | 9.4593513E−11 |
| A10 | −1.7132642E−14 | −6.9992956E−14 | −4.3499458E−14 | −8.4975698E−13 |
| A12 | 1.4454906E−17 | 2.3319602E−16 | 1.0645589E−16 | 4.7441598E−15 |
| A14 | −8.2060433E−21 | −4.7046712E−19 | −1.6532631E−19 | −16.524608E−17 |
| A16 | 2.8860167E−24 | 5.6853457E−22 | 1.5767664E−22 | 3.4707444E−20 |
| A18 | −5.4203712E−28 | −3.7863416E−25 | −8.4052923E−26 | −3.9767082E−23 |
| A20 | 3.6831493E−32 | 1.0705391E−28 | 1.9133485E−29 | 1.8715413E−26 |

Figure 3:
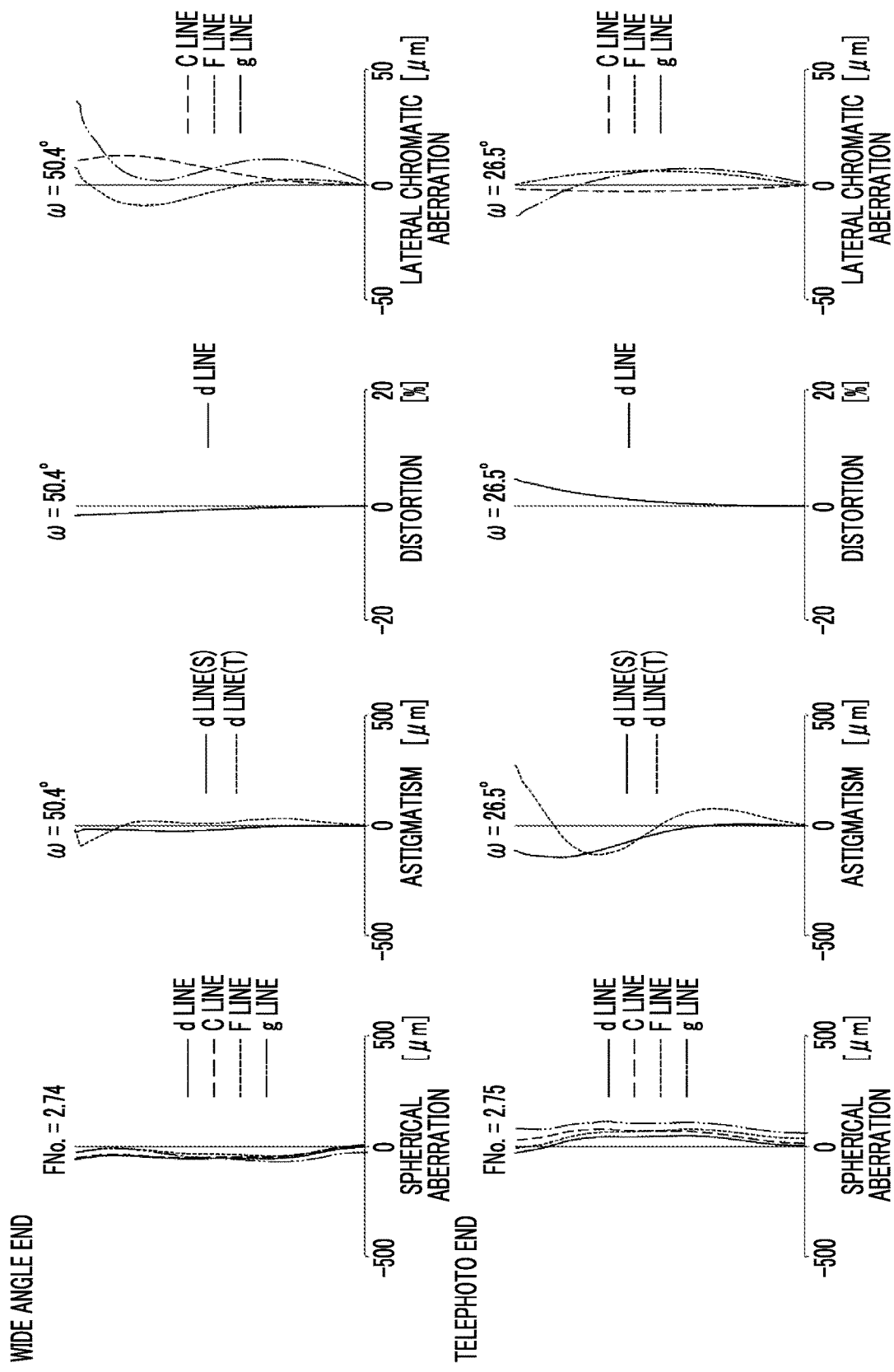
FIG. 3 is a diagram showing aberrations of the zoom lens of Example 1.

FIG. 3 is a diagram showing aberrations of the zoom lens of Example 1 in a state where the object at infinity is in focus. FIG. 3 shows, in order from the left, spherical aberration, astigmatism, distortion, and lateral chromatic aberration. In FIG. 3, the upper part labeled wide angle end shows aberrations in the wide angle end state, and the lower part labeled telephoto end shows aberrations in the telephoto end state. In spherical aberration diagram, aberrations at the d line, the C line, the F line, and the g line are respectively indicated by the solid line, the long dashed line, the short dashed line, and the chain double-dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration diagram, aberrations at the C line, the F line, and the g line are respectively indicated by the long dashed line, the short dashed line, and the chain double-dashed line. In spherical aberration diagram, FNo. indicates an F number. In the other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will not be given.

Example 2

Figure 4:
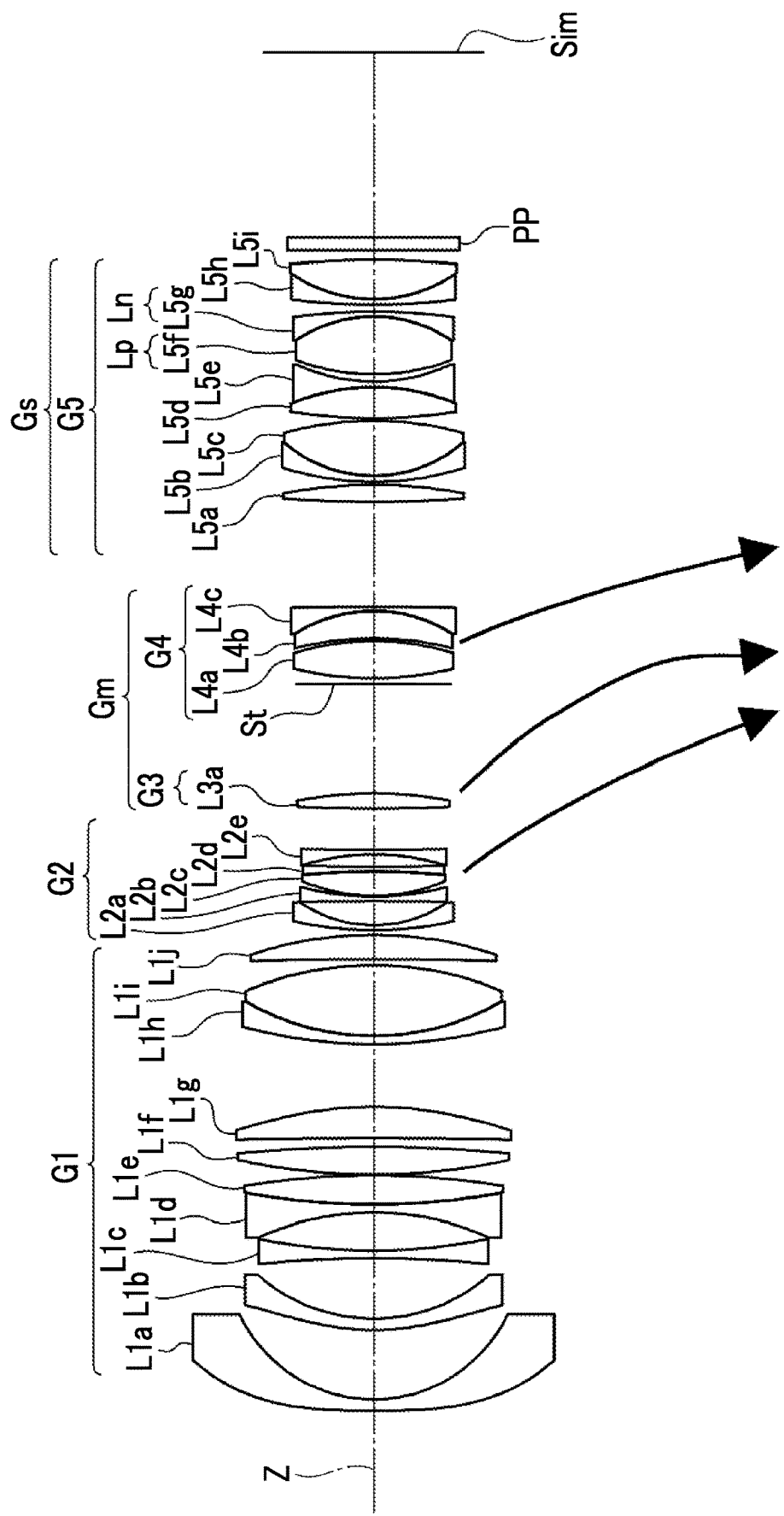
FIG. 4 is a cross-sectional view showing a configuration of a zoom lens of Example 2 and a diagram showing movement loci thereof.

FIG. 4 is a cross-sectional view showing a configuration of the zoom lens of Example 2. The zoom lens shown in Example 2 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of one lens L3a. The fourth lens group G4 consists of, in order from the object side to the image side, an aperture stop St and three lenses L4a to L4c. The fifth lens group G5 consists of nine lenses L5a to L5i in order from the object side to the image side. The lens L5f corresponds to the positive lens Lp, and the lens L5g corresponds to the negative lens Ln.

Figure 5:
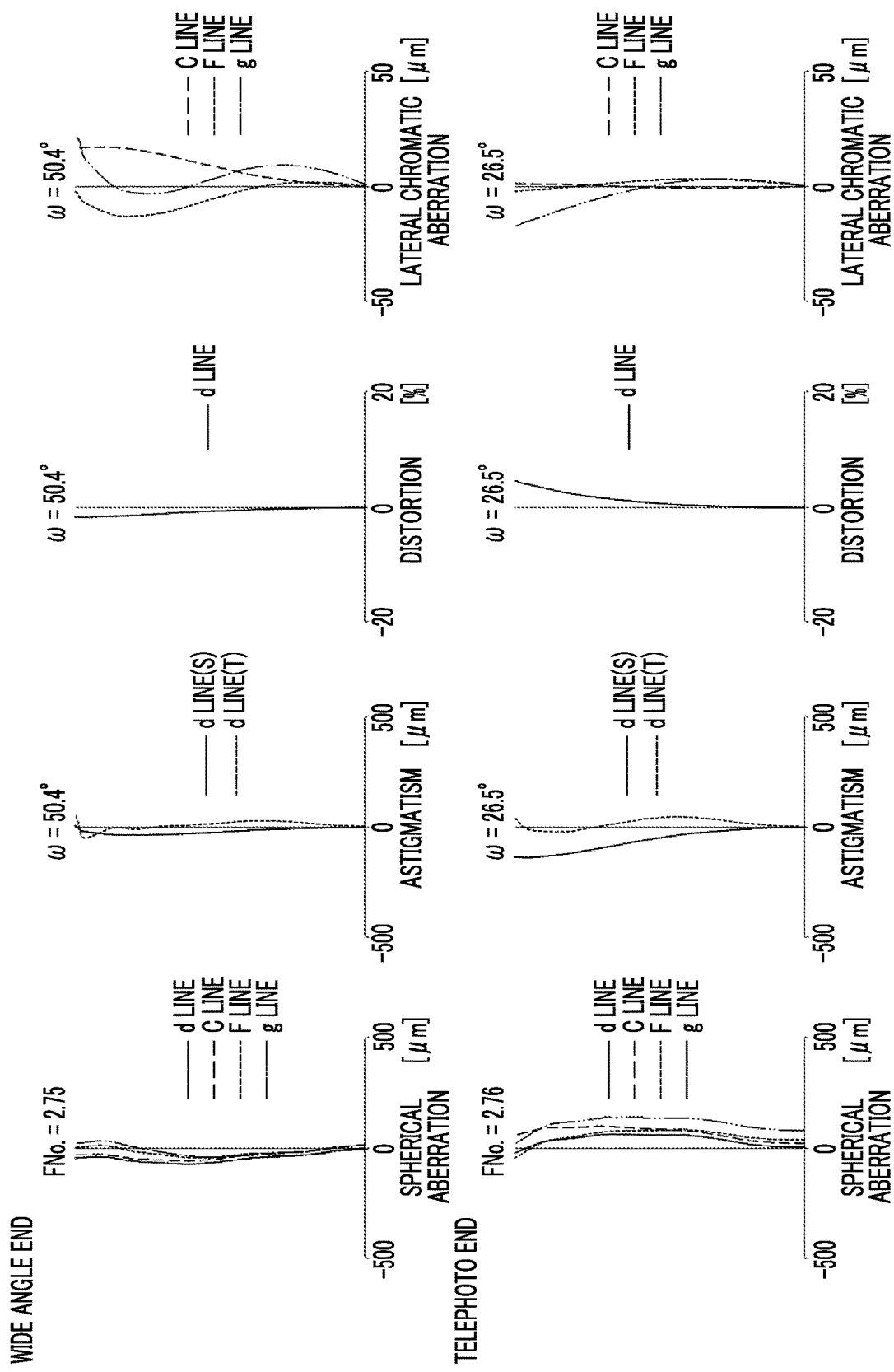
FIG. 5 is a diagram showing aberrations of the zoom lens of Example 2.

Tables 4A and 4B show the basic lens data of the zoom lens of Example 2, Table 5 shows the specifications and the variable surface distances, Table 6 shows the aspheric surface coefficients, and FIG. 5 shows a diagram of aberrations in a state where the object at infinity is in focus.

TABLE 4A

| | Example 2 | | | | | | |
| --- | --- | --- | --- | --- | --- | --- | --- |
| Sn | R | D | Nd | vd | θgF | dN/dT (×10⁻⁶) | Material Name |
| *1 | 369.08957 | 2.400 | 1.80100 | 34.97 | 0.5864 | 3.6 | S-LAM66.OHARA |
| 2 | 32.18055 | 14.501 | | | | | |
| *3 | 49.91382 | 2.400 | 1.90366 | 31.31 | 0.5948 | 4.0 | TAFD25.HOYA |
| 4 | 38.01085 | 12.672 | | | | | |

TABLE 4A-continued

Example 2

| Sn | R | D | Nd | vd | θgF | dN/dT (×10⁻⁶) | Material Name |
|---|---|---|---|---|---|---|---|
| 5 | −252.25586 | 1.650 | 1.90200 | 25.26 | 0.6166 | 2.0 | J-LASFH24HS.HIKARI |
| 6 | 125.23461 | 7.905 | | | | | |
| 7 | −61.29490 | 1.660 | 1.48749 | 70.24 | 0.5301 | −0.8 | S-FSL5.OHARA |
| 8 | 153.44826 | 6.128 | 1.84666 | 23.78 | 0.6192 | 1.4 | FDS90-SG.HOYA |
| 9 | −166.95556 | 0.120 | | | | | |
| 10 | 138.54284 | 5.782 | 1.73800 | 32.33 | 0.5900 | 5.1 | S-NBH53V.OHARA |
| 11 | −304.34360 | 1.849 | | | | | |
| 12 | −1551.95104 | 6.598 | 1.49700 | 81.54 | 0.5375 | −6.2 | S-FPL51.OHARA |
| *13 | −80.06772 | 13.124 | | | | | |
| 14 | 109.55406 | 1.740 | 1.84666 | 23.78 | 0.6192 | 1.4 | FDS90-SG.HOYA |
| 15 | 55.77936 | 14.691 | 1.43700 | 95.10 | 0.5336 | −6.3 | FCD100.HOYA |
| 16 | −73.42054 | 1.272 | | | | | |
| 17 | −875.20467 | 5.099 | 1.53775 | 74.70 | 0.5394 | −4.3 | S-FPM3.OHARA |
| 18 | −85.19735 | DD[18] | | | | | |
| 19 | 81.56352 | 1.000 | 1.59282 | 68.62 | 0.5441 | −5.7 | FCD515.HOYA |
| 20 | 27.98351 | 5.059 | | | | | |
| 21 | −869.80005 | 1.000 | 1.72916 | 54.67 | 0.5453 | 3.4 | TAC8.HOYA |
| 22 | 63.01680 | 0.126 | | | | | |
| 23 | 39.41829 | 5.061 | 1.72825 | 28.46 | 0.6077 | 2.8 | S-TIH10.OHARA |
| 24 | −181.98651 | 1.000 | 1.72916 | 54.67 | 0.5453 | 3.4 | TAC8.HOYA |
| 25 | 379.78698 | 2.637 | | | | | |
| 26 | −51.44051 | 1.000 | 1.90043 | 37.37 | 0.5767 | 4.2 | TAFD37A.HOYA |
| 27 | 677.79159 | DD[27] | | | | | |
| 28 | 293.52217 | 3.177 | 1.49700 | 81.64 | 0.5371 | −5.5 | J-FK01A.HIKARI |
| 29 | −87.26067 | DD[29] | | | | | |

TABLE 4B

Example 2

| Sn | R | D | Nd | vd | θgF | dN/dT (×10⁻⁶) | Material Name |
|---|---|---|---|---|---|---|---|
| 30(St) | ∞ | 1.200 | | | | | |
| *31 | 72.15509 | 7.814 | 1.80100 | 34.97 | 0.5864 | 3.6 | S-LAM66.OHARA |
| 32 | −59.22980 | 0.590 | | | | | |
| 33 | −67.86056 | 5.684 | 1.55298 | 55.07 | 0.5447 | 5.1 | J-KZFH4.HIKARI |
| 34 | −32.15984 | 0.900 | 1.87070 | 40.73 | 0.5683 | 3.9 | TAFD32.HOYA |
| 35 | −780.81690 | DD[35] | | | | | |
| 36 | 292.68494 | 3.586 | 1.58144 | 40.75 | 0.5776 | 3.5 | S-TIL25.OHARA |
| 37 | −103.38822 | 0.594 | | | | | |
| 38 | 64.86158 | 1.270 | 1.59270 | 35.31 | 0.5934 | 0.2 | S-FTM16.OHARA |
| 39 | 29.50569 | 11.516 | 1.59282 | 68.62 | 0.5441 | −5.7 | FCD515.HOYA |
| 40 | −75.10364 | 0.592 | | | | | |
| 41 | 114.35034 | 6.509 | 1.53775 | 74.70 | 0.5394 | −4.3 | S-FPM3.OHARA |
| 42 | −46.41439 | 1.170 | 1.90043 | 37.37 | 0.5767 | 4.2 | TAFD37A.HOYA |
| 43 | 39.97656 | 1.502 | | | | | |
| 44 | 47.65769 | 12.136 | 1.51860 | 69.89 | 0.5318 | 3.6 | J-PKH1.HIKARI |
| 45 | −29.86784 | 1.000 | 1.83400 | 37.17 | 0.5787 | −0.1 | S-LAH60MQ.OHARA |
| 46 | −129.28660 | 1.527 | | | | | |
| 47 | 150.48102 | 1.100 | 1.91082 | 35.25 | 0.5822 | 5.3 | TAFD35.HOYA |
| 48 | 31.39941 | 8.159 | 1.63980 | 34.47 | 0.5923 | 2.5 | S-TIM27.OHARA |
| 49 | −179.51431 | 2.000 | | | | | |
| 50 | ∞ | 2.620 | 1.51680 | 64.20 | 0.5343 | 2.7 | BSC7.HOYA |
| 51 | ∞ | 38.927 | | | | | |

TABLE 5

Example 2

| | Wide Angle End | Telephoto End |
|---|---|---|
| Zr | 1.0 | 2.3 |
| f | 19.702 | 44.940 |
| Bf | 38.927 | 38.927 |
| FNo. | 2.75 | 2.76 |
| 2ω(°) | 100.8 | 53.0 |
| DD[18] | 1.001 | 49.162 |

TABLE 5-continued

Example 2

| | Wide Angle End | Telephoto End |
|---|---|---|
| DD[27] | 8.587 | 1.413 |
| DD[29] | 22.678 | 2.124 |
| DD[35] | 21.893 | 1.460 |

TABLE 6

Example 2

| Sn | 1 | 3 | 13 | 31 |
|---|---|---|---|---|
| KA | 1.0000000E+00 | 1.0000000E+00 | 1.0000000E+00 | 1.0000000E+00 |
| A4 | 8.2863147E−06 | −6.5000422E−06 | 8.0440060E−07 | −3.8924522E−08 |
| A6 | −1.0699488E−08 | 4.7883935E−10 | −7.2410300E−10 | −5.9778820E−09 |
| A8 | 1.6156135E−11 | 1.7740304E−11 | 6.1578322E−12 | 1.2824965E−10 |
| A10 | −2.0288522E−14 | −9.8219200E−14 | −2.6690745E−14 | −1.5021133E−12 |
| A12 | 1.9529821E−17 | 3.1507628E−16 | 7.2248068E−17 | 1.0629716E−14 |
| A14 | −1.3355445E−20 | −6.2534112E−19 | −1.2195944E−19 | −4.6388259E−17 |
| A16 | 6.0629404E−24 | 7.4961653E−22 | 1.2377697E−22 | 1.2223547E−19 |
| A18 | −1.6300995E−27 | −4.9754483E−25 | −6.8884444E−26 | −1.7838289E−22 |
| A20 | 1.9659586E−31 | 1.4036586E−28 | 1.6118994E−29 | 1.1073111E−25 |

Example 3

Figure 6:
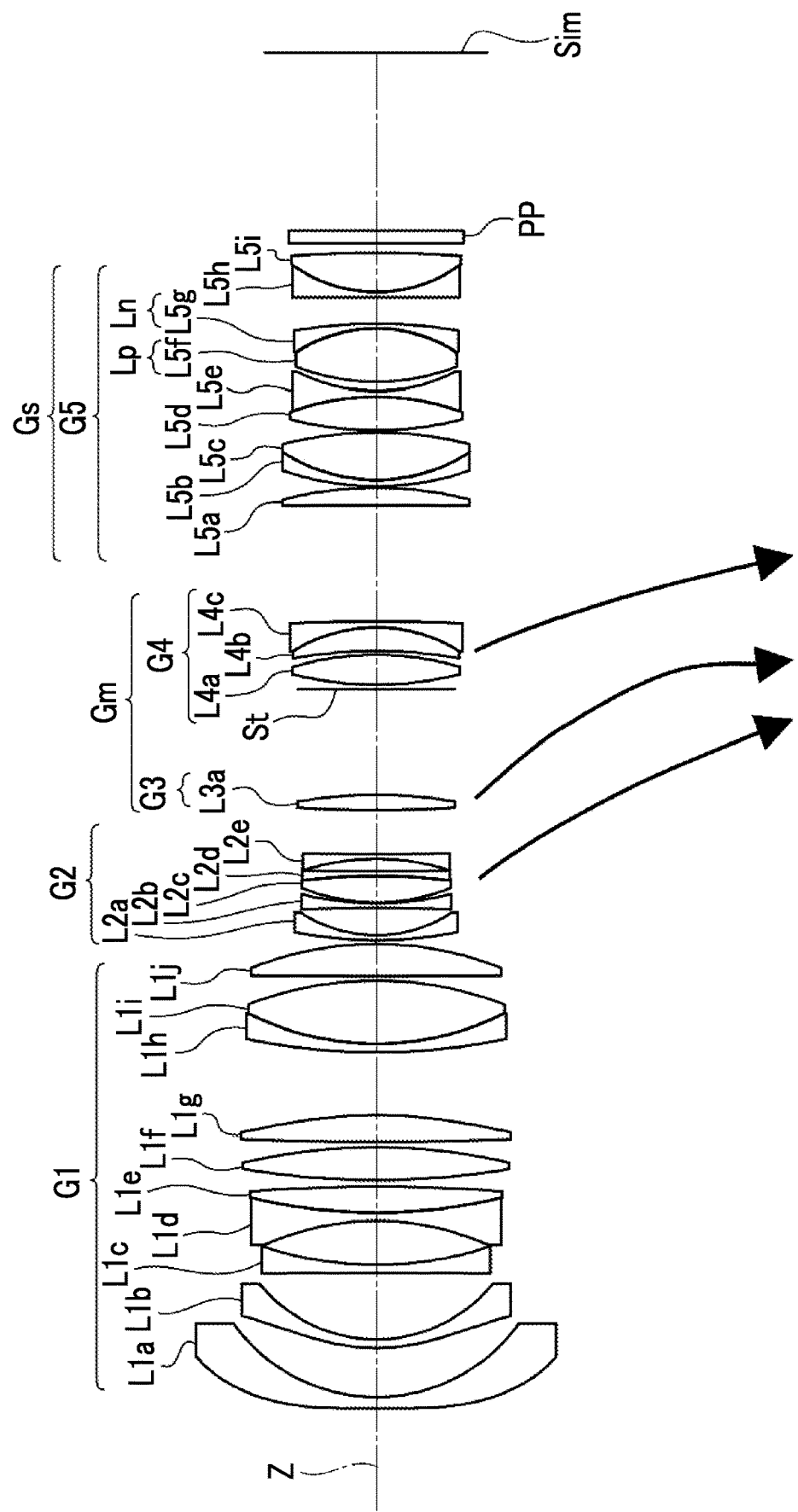
FIG. 6 is a cross-sectional view showing a configuration of a zoom lens of Example 3 and a diagram showing movement loci thereof.

FIG. 6 is a cross-sectional view showing a configuration of the zoom lens of Example 3. The zoom lens shown in Example 3 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of one lens L3a. The fourth lens group G4 consists of, in order from the object side to the image side, an aperture stop St and three lenses L4a to L4c. The fifth lens group G5 consists of nine lenses L5a to L5i in order from the object side to the image side. The lens L5f corresponds to the positive lens Lp, and the lens L5g corresponds to the negative lens Ln.

Figure 7:
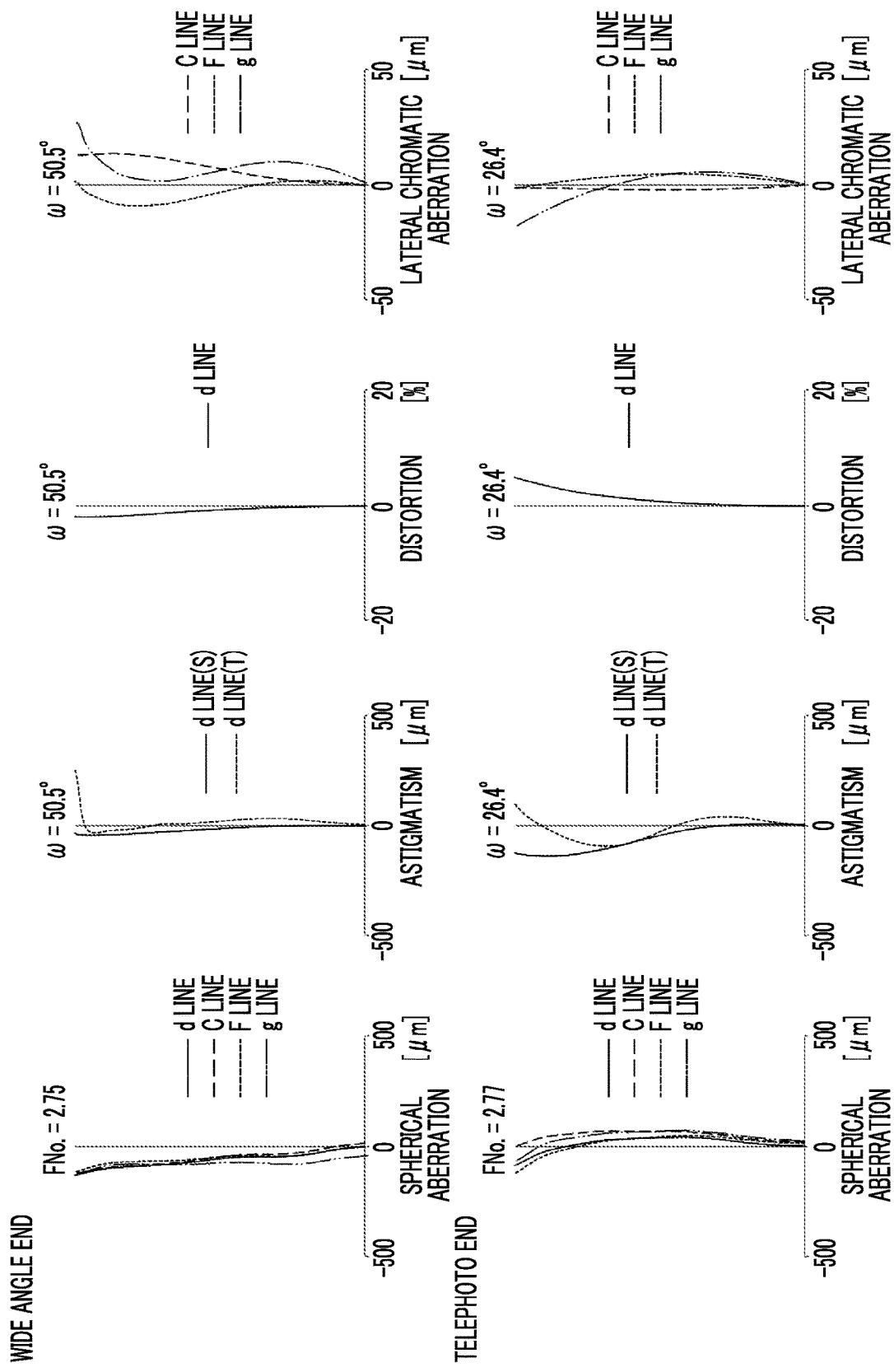
FIG. 7 is a diagram showing aberrations of the zoom lens of Example 3.

Tables 7A and 7B show the basic lens data of the zoom lens of Example 3, Table 8 shows the specifications and the variable surface distances, Table 9 shows the aspheric surface coefficients, and FIG. 7 shows a diagram of aberrations in a state where the object at infinity is in focus.

TABLE 7A

Example 3

| Sn | R | D | Nd | vd | θgF | dN/dT (×10$^{-6}$) | Material Name |
|---|---|---|---|---|---|---|---|
| *1 | ∞ | 2.400 | 1.80100 | 34.97 | 0.5864 | 3.6 | S-LAM66.OHARA |
| 2 | 37.48955 | 10.123 | | | | | |
| *3 | 38.61145 | 1.800 | 1.90366 | 31.31 | 0.5948 | 4.0 | TAFD25.HOYA |
| 4 | 32.09280 | 13.784 | | | | | |
| 5 | −1869.16262 | 1.650 | 1.90366 | 31.31 | 0.5948 | 4.0 | TAFD25.HOYA |
| 6 | 77.14096 | 9.041 | | | | | |
| 7 | −58.95755 | 1.660 | 1.48749 | 70.24 | 0.5301 | −0.8 | S-FSL5.OHARA |
| 8 | 115.97105 | 5.316 | 1.80518 | 25.46 | 0.6157 | 0.9 | FD60-W.HOYA |
| 9 | −366.90264 | 1.410 | | | | | |
| 10 | 175.56698 | 6.754 | 1.73800 | 32.33 | 0.5900 | 5.1 | S-NBH53V.OHARA |
| 11 | −126.89051 | 1.199 | | | | | |
| 12 | 880.17539 | 5.281 | 1.43700 | 95.10 | 0.5336 | −6.3 | FCD100.HOYA |
| *13 | −98.78604 | 13.042 | | | | | |
| 14 | 138.07826 | 1.740 | 1.84666 | 23.78 | 0.6205 | 1.3 | S-TIH53W.OHARA |
| 15 | 61.06285 | 13.039 | 1.43700 | 95.10 | 0.5336 | −6.3 | FCD100.HOYA |
| 16 | −77.23380 | 0.892 | | | | | |
| 17 | 3437.09942 | 6.621 | 1.53775 | 74.70 | 0.5394 | −4.3 | S-FPM3.OHARA |
| 18 | −72.38382 | DD[18] | | | | | |
| 19 | 88.75494 | 1.000 | 1.59282 | 68.62 | 0.5441 | −5.7 | FCD515.HOYA |
| 20 | 29.13567 | 5.654 | | | | | |
| 21 | −429.38275 | 1.000 | 1.72916 | 54.68 | 0.5445 | 4.0 | S-LAL18.OHARA |
| 22 | 68.65870 | 0.123 | | | | | |
| 23 | 41.71913 | 5.466 | 1.72825 | 28.46 | 0.6077 | 2.8 | S-TIH10.OHARA |
| 24 | −128.36803 | 1.000 | 1.72916 | 54.68 | 0.5445 | 4.0 | S-LAL18.OHARA |
| 25 | 1195.62069 | 2.536 | | | | | |
| 26 | −51.70659 | 1.000 | 1.91082 | 35.25 | 0.5822 | 5.3 | TAFD35.HOYA |
| 27 | 630.05962 | DD[27] | | | | | |
| 28 | 284.46875 | 3.177 | 1.49700 | 81.54 | 0.5375 | −6.2 | S-FPL51.OHARA |
| 29 | −94.66585 | DD[29] | | | | | |

TABLE 7B

Example 3

| Sn | R | D | Nd | vd | θgF | dN/dT (×10⁻⁶) | Material Name |
|---|---|---|---|---|---|---|---|
| 30(St) | ∞ | 1.000 | | | | | |
| *31 | 73.62717 | 6.129 | 1.73800 | 32.33 | 0.5900 | 5.1 | S-NBH53V.OHARA |
| 32 | −63.60773 | 0.840 | | | | | |
| 33 | −96.19927 | 4.879 | 1.51742 | 52.43 | 0.5565 | 2.4 | S-NSL36.OHARA |
| 34 | −33.53617 | 1.200 | 1.87070 | 40.73 | 0.5683 | 3.9 | TAFD32.HOYA |
| 35 | −432.31982 | DD[35] | | | | | |
| 36 | −1946.80255 | 3.434 | 1.56883 | 56.00 | 0.5485 | 3.1 | J-BAK4.HIKARI |
| 37 | −83.72424 | 0.416 | | | | | |
| 38 | 62.32647 | 1.270 | 1.59270 | 35.31 | 0.5934 | 0.2 | S-FTM16.OHARA |
| 39 | 36.64422 | 9.791 | 1.59282 | 68.62 | 0.5441 | −5.7 | FCD515.HOYA |
| 40 | −82.46122 | 0.501 | | | | | |
| 41 | 75.28668 | 6.879 | 1.53775 | 74.70 | 0.5394 | −4.3 | S-FPM3.OHARA |
| 42 | −53.71643 | 1.170 | 1.91082 | 35.25 | 0.5822 | 5.3 | TAFD35.HOYA |
| 43 | 38.04746 | 1.832 | | | | | |
| 44 | 48.19135 | 10.977 | 1.53775 | 74.70 | 0.5394 | −4.3 | S-FPM3.OHARA |
| 45 | −31.68105 | 1.000 | 1.83400 | 39.58 | 0.5762 | 1.5 | S-LAH63Q.OHARA |
| 46 | −101.58348 | 5.435 | | | | | |
| 47 | −868391.45213 | 1.100 | 1.91082 | 35.25 | 0.5822 | 5.3 | TAFD35.HOYA |
| 48 | 30.49445 | 8.023 | 1.69895 | 30.13 | 0.6030 | 3.6 | S-TIM35.OHARA |
| 49 | −251.94621 | 2.000 | | | | | |
| 50 | ∞ | 2.620 | 1.51680 | 64.20 | 0.5343 | 2.7 | BSC7.HOYA |
| 51 | ∞ | 36.883 | | | | | |

TABLE 8

Example 3

| | Wide Angle End | Telephoto End |
|---|---|---|
| Zr | 1.0 | 2.3 |
| f | 19.684 | 44.898 |
| Bf | 36.883 | 36.883 |
| FNo. | 2.75 | 2.77 |
| 2ω(°) | 101.0 | 52.8 |
| DD[18] | 0.798 | 48.629 |
| DD[27] | 9.152 | 1.401 |
| DD[29] | 21.675 | 2.345 |
| DD[35] | 24.053 | 3.303 |

TABLE 9

Example 3

| Sn | 1 | 3 | 13 | 31 |
|---|---|---|---|---|
| KA | 1.0000000E+00 | 1.0000000E+00 | 1.0000000E+00 | 1.0000000E+00 |
| A4 | 1.1880252E−05 | −1.0452156E−05 | 9.8958006E−07 | −2.2285556E−07 |
| A6 | −1.9668012E−08 | 3.6155693E−09 | −1.8146852E−09 | −6.6646743E−09 |
| A8 | 3.6586403E−11 | 9.0808884E−12 | 1.5145789E−11 | 1.1721480E−10 |
| A10 | −5.5843200E−14 | −7.2749550E−14 | −6.8205481E−14 | −1.1591793E−12 |
| A12 | 6.4541929E−17 | 2.2973603E−16 | 1.8887672E−16 | 7.1173537E−15 |
| A14 | −5.2499889E−20 | −4.2884944E−19 | −3.2546273E−19 | −2.7569827E−17 |
| A16 | 2.8054580E−23 | 4.7958995E−22 | 3.3852471E−22 | 6.5702324E−20 |
| A18 | −8.7764479E−27 | −2.9782356E−25 | −1.9410024E−25 | −8.8055050E−23 |
| A20 | 1.2185990E−30 | 7.9072393E−29 | 4.7022443E−29 | 5.0830598E−26 |

Example 4

Figure 8:
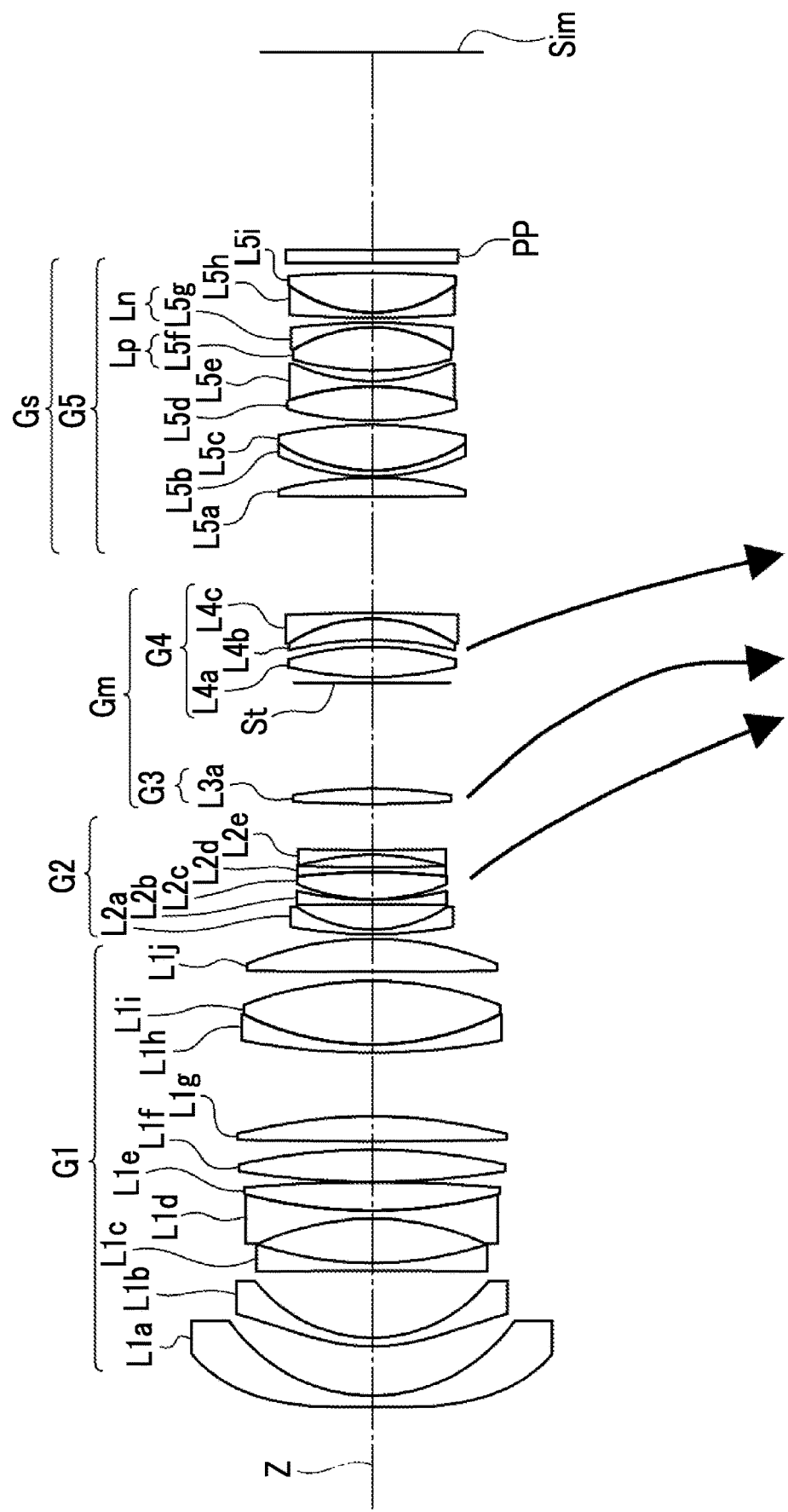
FIG. 8 is a cross-sectional view of a configuration of a zoom lens of Example 4 and a diagram showing movement loci thereof.

FIG. 8 is a cross-sectional view showing a configuration of the zoom lens of Example 4. The zoom lens shown in Example 4 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of one lens L3a. The fourth lens group G4 consists of, in order from the object side to the image side, an aperture stop St and three lenses L4a to L4c. The fifth lens group G5 consists of nine lenses L5a to L5i in order from the object side to the image side. The lens L5f corresponds to the positive lens Lp, and the lens L5g corresponds to the negative lens Ln.

Figure 9:
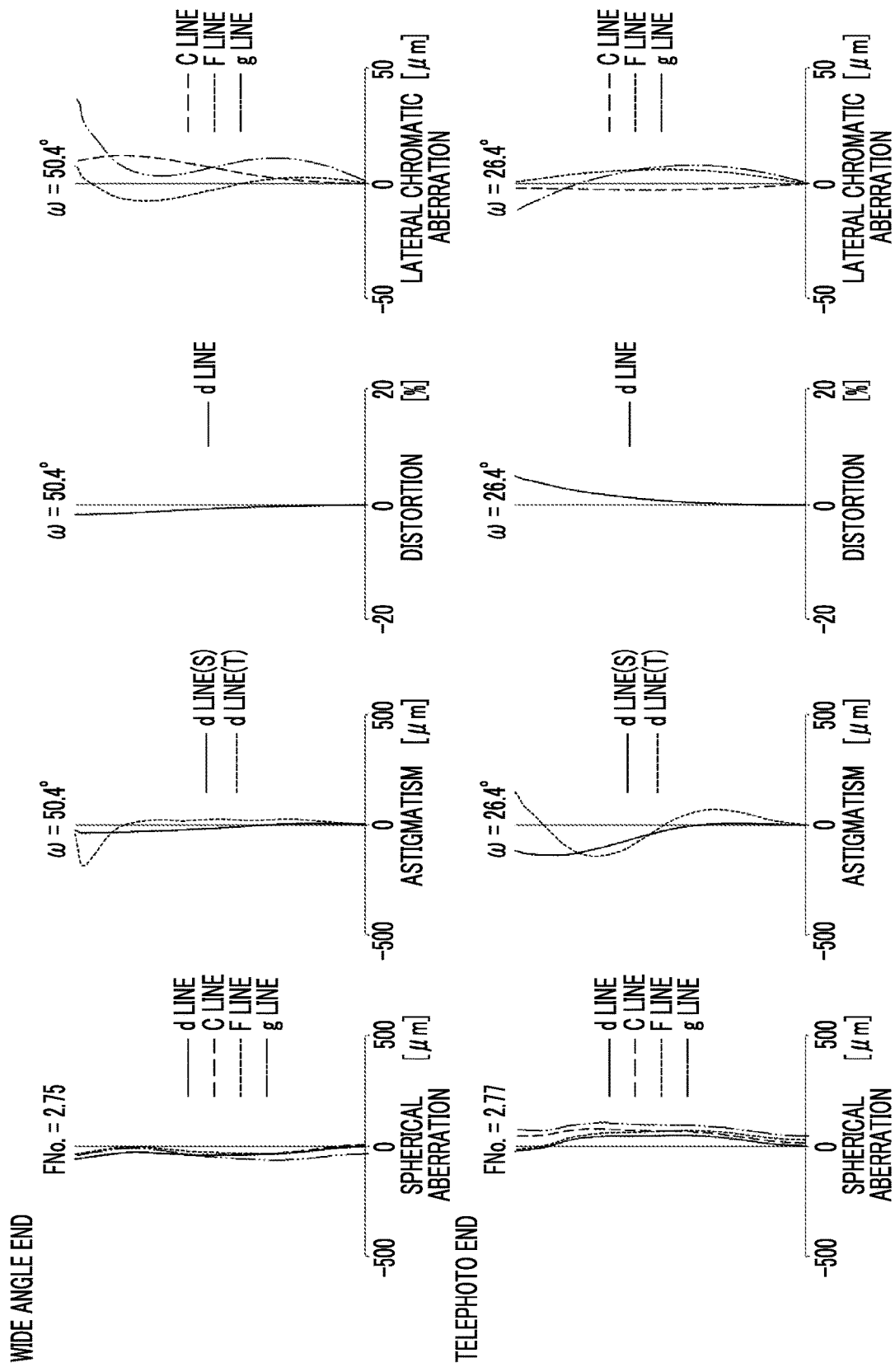
FIG. 9 is a diagram showing aberrations of the zoom lens of Example 4.

Tables 10A and 10B show the basic lens data of the zoom lens of Example 4, Table 11 shows the specifications and the variable surface distances, Table 12 shows the aspheric surface coefficients, and FIG. 9 shows a diagram of aberrations in a state where the object at infinity is in focus.

TABLE 10A

Example 4

| Sn | R | D | Nd | vd | θgF | dN/dT (×10⁻⁶) | Material Name |
|---|---|---|---|---|---|---|---|
| *1 | ∞ | 2.400 | 1.80100 | 34.97 | 0.5864 | 3.6 | S-LAM66.OHARA |
| 2 | 37.31368 | 10.160 | | | | | |
| *3 | 38.63752 | 1.800 | 1.90366 | 31.31 | 0.5948 | 4.0 | TAFD25.HOYA |
| 4 | 31.89233 | 13.849 | | | | | |
| 5 | −1769.58122 | 1.650 | 1.90366 | 31.31 | 0.5948 | 4.0 | TAFD25.HOYA |
| 6 | 77.76712 | 9.103 | | | | | |
| 7 | −58.81333 | 1.660 | 1.48749 | 70.24 | 0.5301 | −0.8 | S-FSL5.OHARA |
| 8 | 108.40319 | 5.826 | 1.80518 | 25.46 | 0.6157 | 0.9 | FD60-W.HOYA |
| 9 | −340.96933 | 0.119 | | | | | |
| 10 | 183.24194 | 6.639 | 1.73800 | 32.33 | 0.5900 | 5.1 | S-NBH53V.OHARA |
| 11 | −129.88581 | 1.695 | | | | | |
| 12 | 994.64117 | 5.258 | 1.43700 | 95.10 | 0.5336 | −6.3 | FCD100.HOYA |
| *13 | −97.77198 | 13.098 | | | | | |
| 14 | 148.50469 | 1.740 | 1.84666 | 23.78 | 0.6205 | 1.3 | S-TIH53W.OHARA |
| 15 | 62.32448 | 13.106 | 1.43700 | 95.10 | 0.5336 | −6.3 | FCD100.HOYA |
| 16 | −76.24482 | 1.839 | | | | | |
| 17 | 1747.05670 | 6.784 | 1.53775 | 74.70 | 0.5394 | −4.3 | S-FPM3.OHARA |
| 18 | −70.15978 | DD[18] | | | | | |
| 19 | 96.13592 | 1.000 | 1.59282 | 68.62 | 0.5441 | −5.7 | FCD515.HOYA |
| 20 | 29.53525 | 5.140 | | | | | |
| 21 | −790.66855 | 1.000 | 1.72916 | 54.68 | 0.5445 | 4.0 | S-LAL18.OHARA |
| 22 | 69.50908 | 0.131 | | | | | |
| 23 | 41.79454 | 5.555 | 1.72825 | 28.46 | 0.6077 | 2.8 | S-TIH10.OHARA |
| 24 | −137.37620 | 1.000 | 1.72916 | 54.68 | 0.5445 | 4.0 | S-LAL18.OHARA |
| 25 | 497.31212 | 2.583 | | | | | |
| 26 | −52.77684 | 1.000 | 1.91082 | 35.25 | 0.5822 | 5.3 | TAFD35.HOYA |
| 27 | 897.15916 | DD[27] | | | | | |
| 28 | 279.31159 | 3.177 | 1.49700 | 81.54 | 0.5375 | −6.2 | S-FPL51.OHARA |
| 29 | −98.17226 | DD[29] | | | | | |

TABLE 10B

Example 4

| Sn | R | D | Nd | vd | θgF | dN/dT (×10⁻⁶) | Material Name |
|---|---|---|---|---|---|---|---|
| 30(St) | ∞ | 1.200 | | | | | |
| *31 | 74.96495 | 6.216 | 1.72047 | 34.71 | 0.5835 | 3.5 | S-NBH8.OHARA |
| 32 | −61.62483 | 1.422 | | | | | |
| 33 | −73.50573 | 4.417 | 1.51633 | 64.14 | 0.5353 | 2.7 | S-BSL7.OHARA |
| 34 | −32.44753 | 1.200 | 1.80400 | 46.53 | 0.5578 | 4.4 | S-LAH65VS.OHARA |
| 35 | −370.67464 | DD[35] | | | | | |
| 36 | 1003.65680 | 3.987 | 1.59282 | 68.62 | 0.5441 | −5.7 | FCD515.HOYA |
| 37 | −79.00221 | 0.305 | | | | | |
| 38 | 48.46880 | 1.270 | 1.59270 | 35.31 | 0.5934 | 0.2 | S-FTM16.OHARA |
| 39 | 37.88508 | 9.404 | 1.49700 | 81.54 | 0.5375 | −6.2 | S-FPL51.OHARA |
| 40 | −87.88423 | 0.902 | | | | | |
| 41 | 69.79296 | 7.005 | 1.53775 | 74.70 | 0.5394 | −4.3 | S-FPM3.OHARA |
| 42 | −55.46704 | 1.170 | 1.95375 | 32.32 | 0.5901 | 4.9 | TAFD45.HOYA |
| 43 | 39.97280 | 2.157 | | | | | |
| 44 | 62.23346 | 8.925 | 1.49700 | 81.54 | 0.5375 | −6.2 | S-FPL51.OHARA |
| 45 | −31.82701 | 1.000 | 1.71700 | 47.93 | 0.5606 | −0.2 | S-LAM3.OHARA |
| 46 | −135.38860 | 0.985 | | | | | |
| 47 | 233.15601 | 1.100 | 1.91082 | 35.25 | 0.5822 | 5.3 | TAFD35.HOYA |
| 48 | 29.95262 | 8.187 | 1.68893 | 31.07 | 0.6004 | 2.6 | S-TIM28.OHARA |
| 49 | −235.86335 | 2.000 | | | | | |
| 50 | ∞ | 2.620 | 1.51680 | 64.20 | 0.5343 | 2.7 | BSC7.HOYA |
| 51 | ∞ | 41.027 | | | | | |

TABLE 11

Example 4

|  | Wide Angle End | Telephoto End |
| --- | --- | --- |
| Zr | 1.0 | 2.3 |
| f | 19.700 | 44.935 |
| Bf | 41.027 | 41.027 |
| FNo. | 2.75 | 2.77 |
| 2ω(°) | 100.8 | 52.8 |
| DD[18] | 1.000 | 49.187 |
| DD[27] | 9.536 | 1.372 |
| DD[29] | 21.607 | 1.597 |
| DD[35] | 23.869 | 3.856 |

TABLE 12

Example 4

| Sn | 1 | 3 | 13 | 31 |
| --- | --- | --- | --- | --- |
| KA | 1.0000000E+00 | 1.0000000E+00 | 1.0000000E+00 | 1.0000000E+00 |
| A4 | 1.1713826E−05 | −1.0318995E−05 | 9.9272069E−07 | −2.9456156E−07 |
| A6 | −1.8252967E−08 | 4.2167987E−09 | −1.3394921E−09 | −2.8151784E−09 |
| A8 | 3.0617721E−11 | −7.8467627E−13 | 1.0203532E−11 | 3.9909586E−11 |
| A10 | −4.0274352E−14 | −2.2267460E−14 | −4.2811471E−14 | −3.0538747E−13 |
| A12 | 3.8933298E−17 | 8.7592090E−17 | 1.1413703E−16 | 1.3238478E−15 |
| A14 | −2.5956461E−20 | −1.9182453E−19 | −1.9413381E−19 | −2.8131347E−18 |
| A16 | 1.1304742E−23 | 2.4833873E−22 | 2.0254627E−22 | 8.6426203E−22 |
| A18 | −2.9175422E−27 | −1.7593595E−25 | −1.1762974E−25 | 6.8820271E−24 |
| A20 | 3.4917329E−31 | 5.2235596E−29 | 2.9021507E−29 | −8.6435985E−27 |

Example 5

Figure 10:
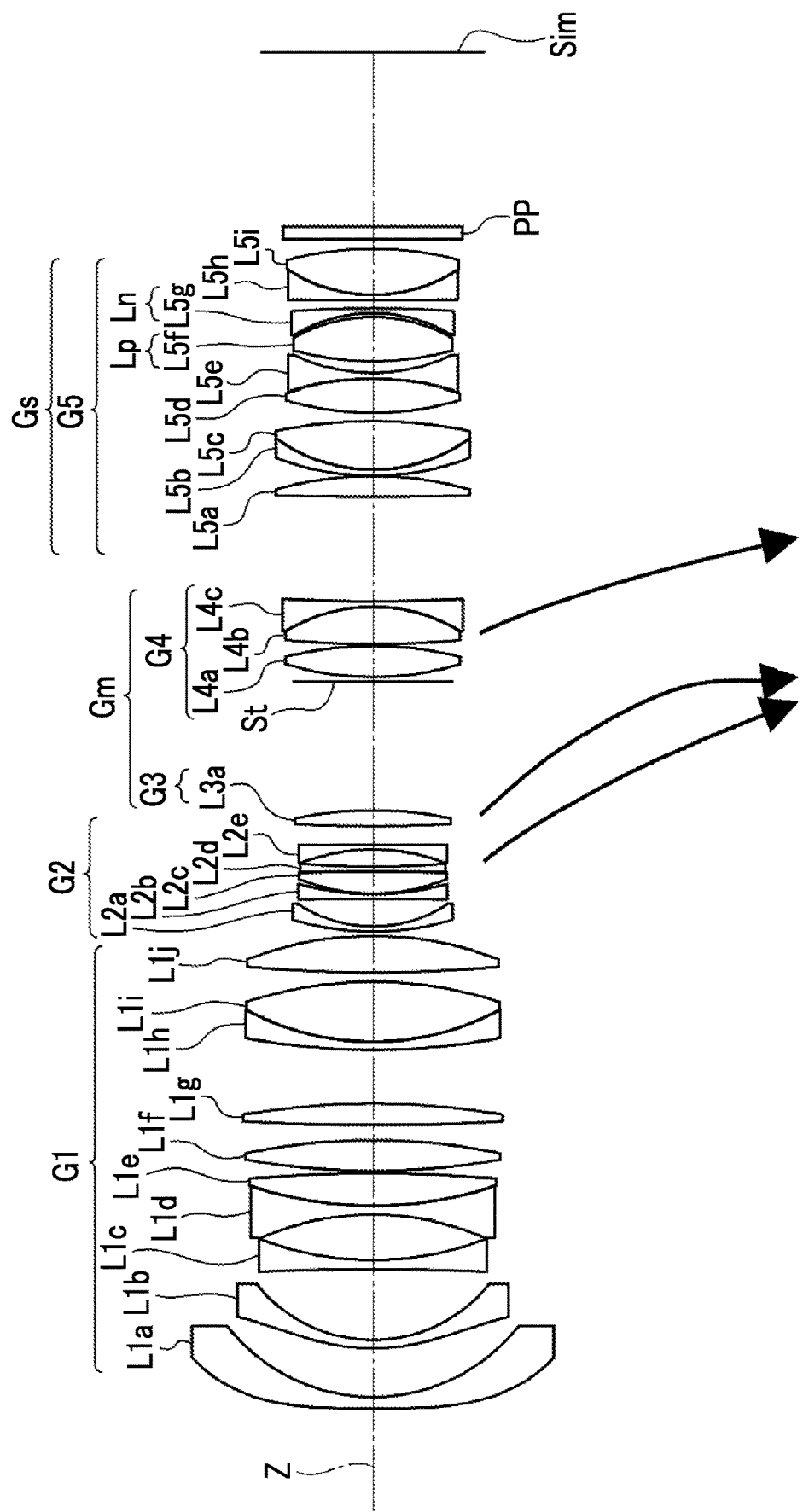
FIG. 10 is a cross-sectional view of a configuration of a zoom lens of Example 5 and a diagram showing movement loci thereof.

FIG. 10 is a cross-sectional view showing a configuration of the zoom lens of Example 5. The zoom lens shown in Example 5 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of one lens L3a. The fourth lens group G4 consists of, in order from the object side to the image side, an aperture stop St and three lenses L4a to L4c. The fifth lens group G5 consists of nine lenses L5a to L5i in order from the object side to the image side. The lens L5f corresponds to the positive lens Lp, and the lens L5g corresponds to the negative lens Ln.

Figure 11:
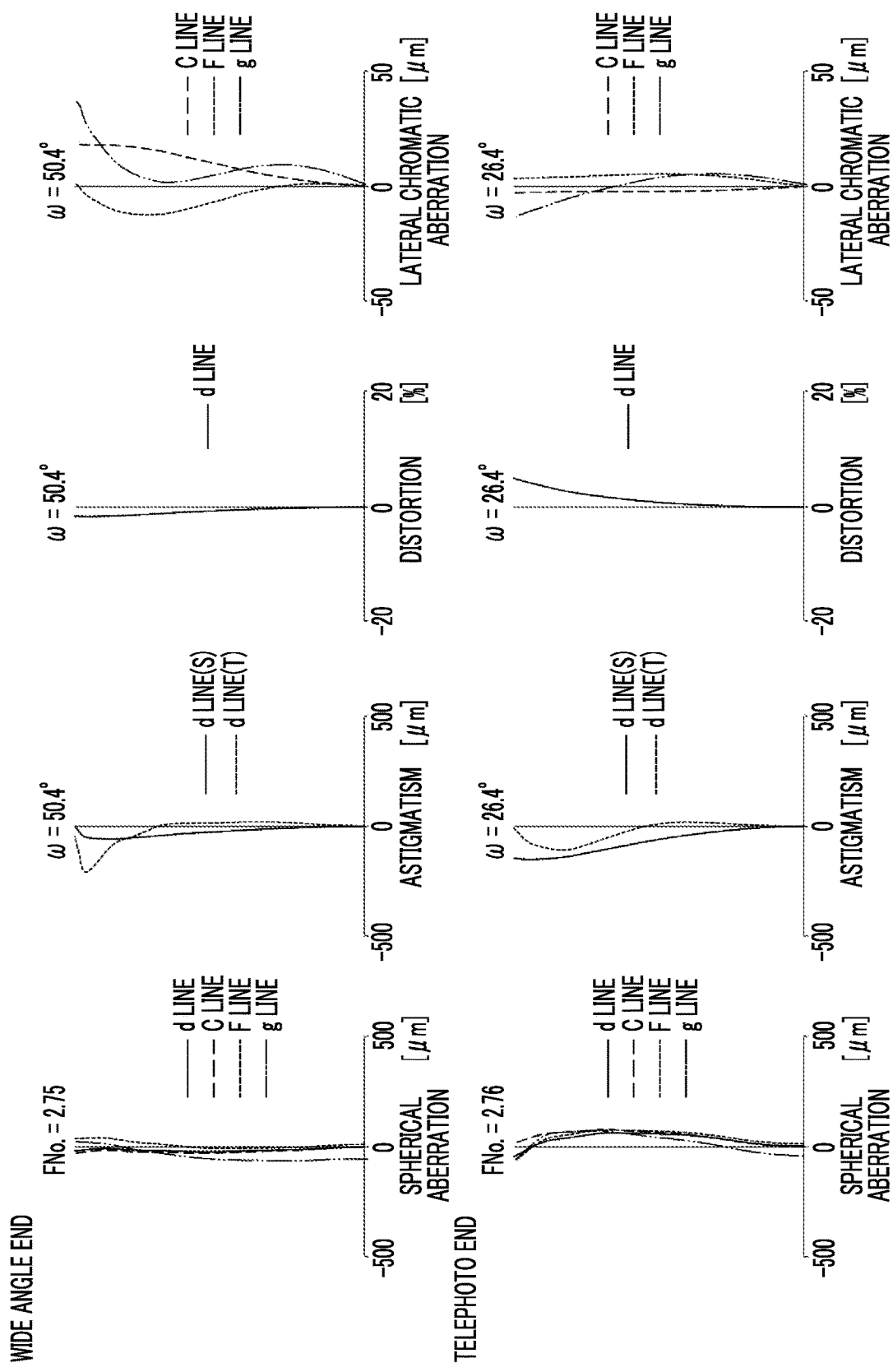
FIG. 11 is a diagram showing aberrations of the zoom lens of Example 5.

Tables 13A and 13B show the basic lens data of the zoom lens of Example 5, Table 14 shows the specifications and the variable surface distances, Table 15 shows the aspheric surface coefficients, and FIG. 11 shows a diagram of aberrations in a state where the object at infinity is in focus.

TABLE 13A

Example 5

| Sn | R | D | Nd | vd | θgF | dN/dT (×10⁻⁶) | Material Name |
| --- | --- | --- | --- | --- | --- | --- | --- |
| *1 | ∞ | 2.400 | 1.80100 | 34.97 | 0.5864 | 3.6 | S-LAM66.OHARA |
| 2 | 39.66847 | 10.001 |  |  |  |  |  |
| *3 | 39.08885 | 1.800 | 1.90366 | 31.31 | 0.5948 | 4.0 | TAFD25.HOYA |
| 4 | 31.81941 | 14.693 |  |  |  |  |  |
| 5 | −458.24023 | 1.800 | 1.73400 | 51.47 | 0.5487 | 6.0 | S-LAL59.OHARA |
| 6 | 66.20438 | 9.335 |  |  |  |  |  |
| 7 | −61.90940 | 1.810 | 1.48749 | 70.24 | 0.5301 | −0.8 | S-FSL5.OHARA |
| 8 | 82.55513 | 6.741 | 1.67300 | 38.26 | 0.5758 | 3.8 | S-NBH52V.OHARA |
| 9 | −292.73342 | 0.500 |  |  |  |  |  |
| 10 | 159.48568 | 6.326 | 1.80000 | 29.84 | 0.6018 | 4.4 | S-NBH55.OHARA |
| 11 | −134.30330 | 2.943 |  |  |  |  |  |

TABLE 13A-continued

Example 5

| Sn | R | D | Nd | vd | θgF | dN/dT (×10⁻⁶) | Material Name |
|---|---|---|---|---|---|---|---|
| 12 | 460.36390 | 4.512 | 1.43700 | 95.10 | 0.5336 | −6.3 | FCD100.HOYA |
| *13 | −144.01381 | 11.086 | | | | | |
| 14 | 150.39872 | 1.650 | 1.84666 | 23.78 | 0.6205 | 1.3 | S-TIH53W.OHARA |
| 15 | 57.49082 | 12.396 | 1.43700 | 95.10 | 0.5336 | −6.3 | FCD100.HOYA |
| 16 | −87.58837 | 1.864 | | | | | |
| 17 | 301.07921 | 7.549 | 1.53775 | 74.70 | 0.5394 | −4.3 | S-FPM3.OHARA |
| 18 | −74.75286 | DD[18] | | | | | |
| 19 | 60.25169 | 1.000 | 1.65160 | 58.55 | 0.5427 | 2.2 | S-LAL7.OHARA |
| 20 | 28.67269 | 5.703 | | | | | |
| 21 | −1208.05232 | 1.000 | 1.74400 | 44.79 | 0.5656 | 3.0 | S-LAM2.OHARA |
| 22 | 58.58766 | 0.121 | | | | | |
| 23 | 41.46357 | 4.549 | 1.75575 | 24.71 | 0.6291 | −0.5 | J-SFH5.HIKARI |
| 24 | −526.06957 | 1.000 | 1.80100 | 34.97 | 0.5864 | 3.6 | S-LAM66.OHARA |
| 25 | 172.32238 | 3.529 | | | | | |
| 26 | −43.81837 | 1.000 | 1.81600 | 46.62 | 0.5568 | 5.2 | S-LAH59.OHARA |
| 27 | −2138.37290 | DD[27] | | | | | |
| 28 | 361.49807 | 3.177 | 1.49700 | 81.54 | 0.5375 | −6.2 | S-FPL51.OHARA |
| 29 | −83.45580 | DD[29] | | | | | |

TABLE 13B

Example 5

| Sn | R | D | Nd | vd | θgF | dN/dT (×10⁻⁶) | Material Name |
|---|---|---|---|---|---|---|---|
| 30(St) | ∞ | 1.000 | | | | | |
| *31 | 65.31404 | 6.352 | 1.68893 | 31.07 | 0.6004 | 2.6 | S-TIM28.OHARA |
| 32 | −77.20838 | 0.401 | | | | | |
| 33 | 206.21708 | 7.700 | 1.48749 | 70.24 | 0.5301 | −0.8 | S-FSL5.OHARA |
| 34 | −36.07618 | 1.170 | 1.88100 | 40.14 | 0.5701 | 4.5 | TAFD33.HOYA |
| 35 | 392.06132 | DD[35] | | | | | |
| 36 | 562.77885 | 4.297 | 1.51860 | 69.89 | 0.5318 | 3.6 | J-PKH1.HIKARI |
| 37 | −78.39268 | 0.119 | | | | | |
| 38 | 58.83596 | 1.260 | 1.66382 | 27.35 | 0.6320 | −2.6 | J-SFH4.HIKARI |
| 39 | 35.60140 | 10.009 | 1.59522 | 67.73 | 0.5443 | −6.0 | S-FPM2.OHARA |
| 40 | −102.65874 | 1.731 | | | | | |
| 41 | 66.92332 | 6.898 | 1.53775 | 74.70 | 0.5394 | −4.3 | S-FPM3.OHARA |
| 42 | −59.53867 | 1.170 | 1.88100 | 40.14 | 0.5701 | 4.5 | TAFD33.HOYA |
| 43 | 39.24449 | 2.390 | | | | | |
| 44 | 62.68710 | 9.129 | 1.49700 | 81.54 | 0.5375 | −6.2 | S-FPL51.OHARA |
| 45 | −34.21567 | 0.801 | | | | | |
| 46 | −32.31906 | 1.000 | 1.83400 | 37.17 | 0.5787 | −0.1 | S-LAH60MQ.OHARA |
| 47 | −238.42173 | 1.700 | | | | | |
| 48 | 3405.18374 | 1.100 | 1.91082 | 35.25 | 0.5822 | 5.3 | TAFD35.HOYA |
| 49 | 33.46323 | 9.436 | 1.67270 | 32.10 | 0.5989 | 2.9 | S-TIM25.OHARA |
| 50 | −71.78019 | 2.000 | | | | | |
| 51 | ∞ | 2.620 | 1.51680 | 64.20 | 0.5343 | 2.7 | BSC7.HOYA |
| 52 | ∞ | 36.115 | | | | | |

TABLE 14

Example 5

| | Wide Angle End | Telephoto End |
|---|---|---|
| Zr | 1.0 | 2.3 |
| f | 19.703 | 44.942 |
| Bf | 36.115 | 36.115 |
| FNo. | 2.75 | 2.76 |
| 2ω(°) | 100.8 | 52.8 |
| DD[18] | 0.929 | 48.517 |
| DD[27] | 3.905 | 1.402 |
| DD[29] | 26.578 | 1.443 |
| DD[35] | 21.463 | 1.513 |

TABLE 15

Example 5

| Sn | 1 | 3 | 13 | 31 |
|---|---|---|---|---|
| KA | 1.0000000E+00 | 1.0000000E+00 | 1.0000000E+00 | 1.0000000E+00 |
| A4 | 1.0978749E−05 | −9.8731224E−06 | 6.1102194E−07 | −3.1382746E−07 |
| A6 | −1.6527791E−08 | 1.3544760E−09 | −4.6784885E−10 | −2.0687752E−09 |
| A8 | 2.7982320E−11 | 1.9209531E−11 | 2.7047527E−12 | 4.8699527E−11 |
| A10 | −3.8603815E−14 | −1.1730632E−13 | −8.6325312E−15 | −5.5257409E−13 |
| A12 | 4.0496039E−17 | 3.6358840E−16 | 1.5687743E−17 | 3.8011580E−15 |
| A14 | −3.0175474E−20 | −6.7222309E−19 | −1.3416789E−20 | −1.5984094E−17 |
| A16 | 1.4983312E−23 | 7.3935515E−22 | −1.1246813E−24 | 4.0166727E−20 |
| A18 | −4.4255886E−27 | −4.4740060E−25 | 1.0243312E−26 | −5.5303305E−23 |
| A20 | 5.9102577E−31 | 1.1479896E−28 | −5.0939984E−30 | 3.2042280E−26 |

Example 6

Figure 12:
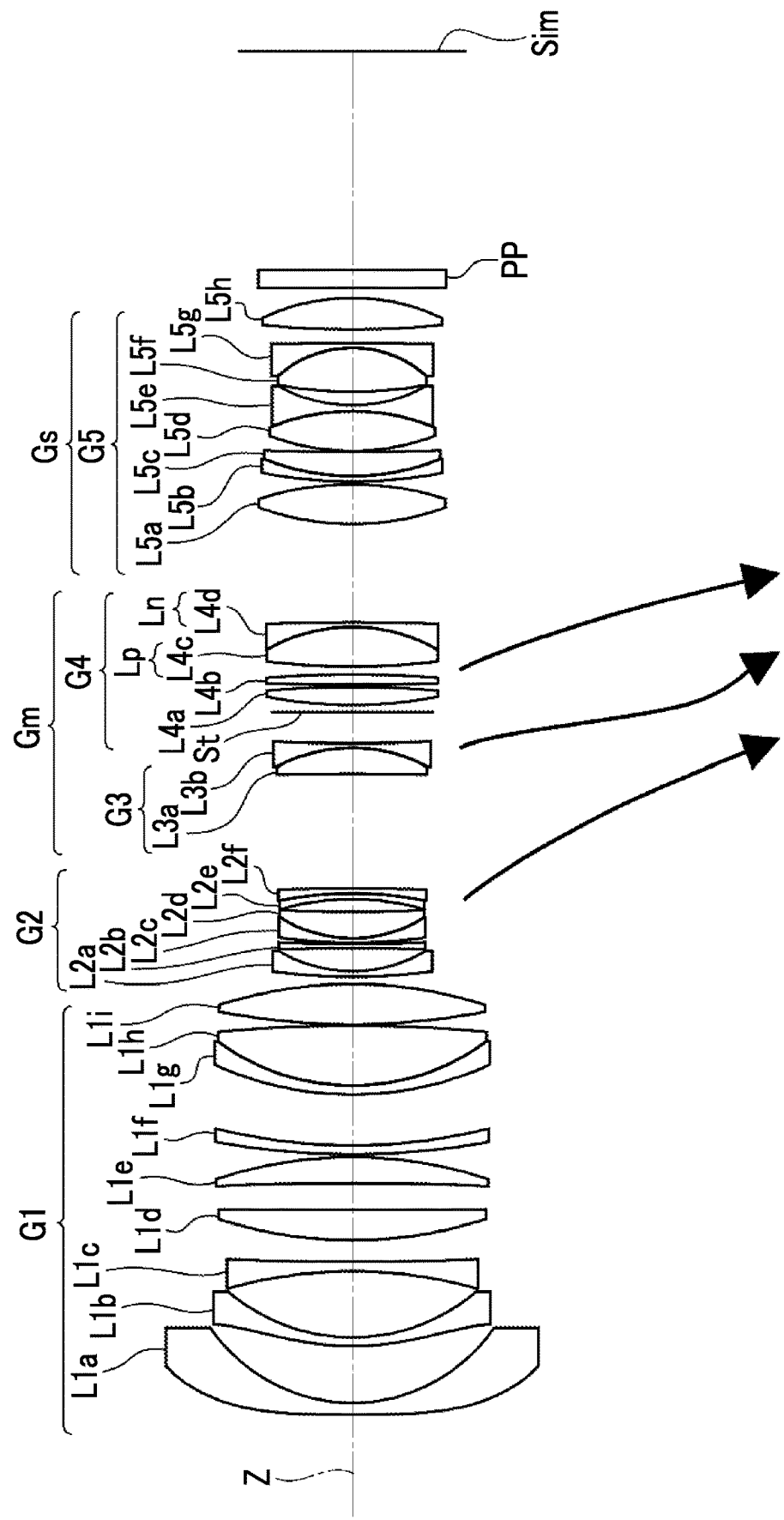
FIG. 12 is a cross-sectional view of a configuration of a zoom lens of Example 6 and a diagram showing movement loci thereof.

FIG. 12 is a cross-sectional view showing a configuration of the zoom lens of Example 6. The zoom lens shown in Example 6 consists of, in order from the object side to the image side, a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of nine lenses L1a to L1i in order from the object side to the image side. The second lens group G2 consists of six lenses L2a to L2f in order from the object side to the image side. The third lens group G3 consists of two lenses L3a and L3b in order from the object side to the image side. The fourth lens group G4 consists of, in order from the object side to the image side, an aperture stop St and four lenses L4a to L4d. The fifth lens group G5 consists of eight lenses L5a to L5h in order from the object side to the image side. The lens L4c corresponds to the positive lens Lp, and the lens L4d corresponds to the negative lens Ln.

Figure 13:
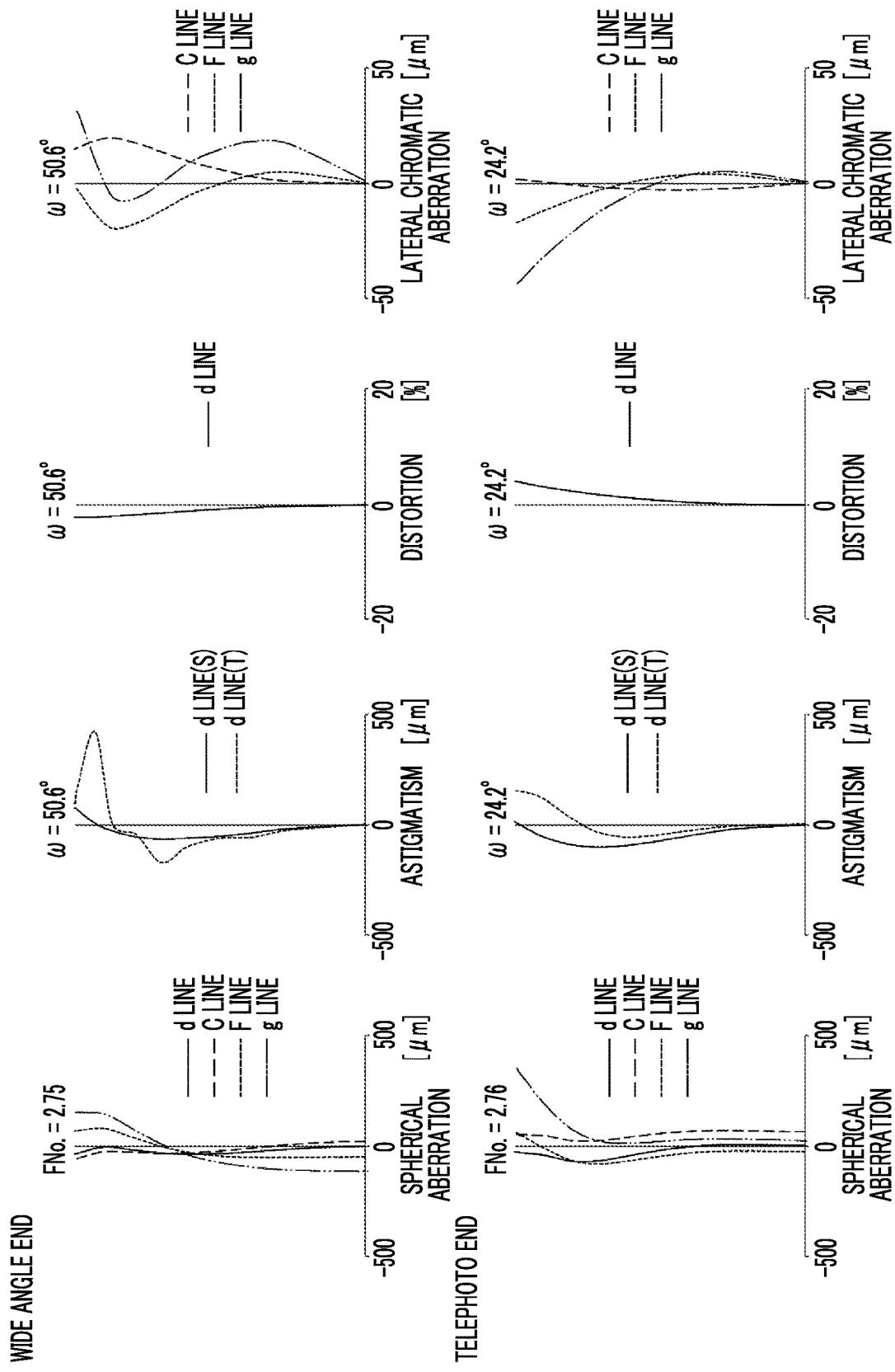
FIG. 13 is a diagram showing aberrations of the zoom lens of Example 6.

Tables 16A and 16B show the basic lens data of the zoom lens of Example 6, Table 17 shows the specifications and the variable surface distances, Table 18 shows the aspheric surface coefficients, and FIG. 13 shows a diagram of aberrations in a state where the object at infinity is in focus.

TABLE 16A

Example 6

| Sn | R | D | Nd | vd | θgF | dN/dT (×10⁻⁶) | Material Name |
|---|---|---|---|---|---|---|---|
| *1 | 4658.45330 | 2.400 | 1.80610 | 33.27 | 0.5885 | 4.7 | NBFD15.HOYA |
| 2 | 36.01670 | 11.507 | | | | | |
| *3 | 52.98199 | 1.800 | 1.90366 | 31.31 | 0.5948 | 4.0 | TAFD25.HOYA |
| 4 | 40.32245 | 13.400 | | | | | |
| 5 | −96.47107 | 1.904 | 1.80400 | 46.53 | 0.5578 | 4.4 | S-LAH65VS.OHARA |
| 6 | 609.35772 | 4.403 | | | | | |
| 7 | 93.85700 | 6.084 | 1.72151 | 29.23 | 0.6054 | 2.7 | S-TIH18.OHARA |
| 8 | 4654.34824 | 5.395 | | | | | |
| 9 | −677.98372 | 5.267 | 1.43700 | 95.10 | 0.5336 | −6.3 | FCD100.HOYA |
| 10 | −90.84712 | 0.608 | | | | | |
| 11 | 159.29334 | 1.801 | 1.64769 | 33.79 | 0.5939 | 2.3 | S-TIM22.OHARA |
| 12 | 118.69306 | 10.319 | | | | | |
| 13 | 70.21754 | 1.801 | 1.80518 | 25.42 | 0.6162 | 1.2 | S-TIH6.OHARA |
| 14 | 47.67833 | 12.156 | 1.43700 | 95.10 | 0.5336 | −6.3 | FCD100.HOYA |
| 15 | −304.22221 | 0.240 | | | | | |
| *16 | 133.22589 | 8.189 | 1.69680 | 55.53 | 0.5434 | 4.1 | S-LAL14.OHARA |
| 17 | −92.08813 | DD[17] | | | | | |
| *18 | 134.27490 | 1.101 | 1.90366 | 31.31 | 0.5948 | 4.0 | TAFD25.HOYA |
| 19 | 29.92023 | 4.657 | | | | | |
| 20 | −617.52558 | 0.900 | 1.74400 | 44.79 | 0.5656 | 3.0 | S-LAM2.OHARA |
| 21 | 370.09611 | 0.237 | | | | | |
| 22 | 109.53799 | 0.911 | 1.49700 | 81.61 | 0.5389 | −6.2 | FCD1.HOYA |
| 23 | 28.42760 | 5.379 | 1.85478 | 24.80 | 0.6123 | 4.3 | S-NBH56.OHARA |
| 24 | 302.36279 | 2.520 | | | | | |
| 25 | −56.50394 | 1.208 | 1.84666 | 23.78 | 0.6205 | 1.3 | S-TIH53W.OHARA |
| 26 | −76.50740 | 1.000 | 1.84850 | 43.79 | 0.5620 | 5.2 | J-LASFH22.HIKARI |
| 27 | −512.76985 | DD[27] | | | | | |
| 28 | −1021.16867 | 5.138 | 1.57501 | 41.50 | 0.5767 | 3.3 | S-TIL27.OHARA |
| 29 | −33.82126 | 0.900 | 1.69560 | 59.05 | 0.5435 | 0.4 | K-LAFK58.SUMITA |
| 30 | 369.62456 | DD[30] | | | | | |

TABLE 16B

Example 6

| Sn | R | D | Nd | vd | θgF | dN/dT (×10⁻⁶) | Material Name |
|---|---|---|---|---|---|---|---|
| 31(St) | ∞ | 1.508 | | | | | |
| 32 | 95.47614 | 3.673 | 1.85025 | 30.05 | 0.5980 | 3.0 | S-NBH57.OHARA |
| 33 | −201.24638 | 0.420 | | | | | |
| 34 | 501.48870 | 2.067 | 1.72151 | 29.23 | 0.6054 | 2.7 | S-TIH18.OHARA |
| 35 | −240.81131 | 1.658 | | | | | |
| 36 | 156.01005 | 8.009 | 1.53775 | 74.70 | 0.5394 | −4.3 | S-FPM3.OHARA |
| 37 | −36.16375 | 0.900 | 1.80440 | 39.58 | 0.5762 | 1.5 | S-LAH63Q.OHARA |
| 38 | −699.93002 | DD[38] | | | | | |
| 39 | 57.09054 | 7.879 | 1.49700 | 81.61 | 0.5389 | −6.2 | FCD1.HOYA |
| 40 | −64.68203 | 0.618 | | | | | |
| 41 | 99.99175 | 1.082 | 1.84850 | 43.79 | 0.5620 | 5.2 | J-LASFH22.HIKARI |
| 42 | 49.06005 | 4.891 | 1.84666 | 23.83 | 0.6160 | 18.9 | SF57HTULTRA.SCHOTT |
| 43 | 503.32220 | 0.243 | | | | | |
| 44 | 49.43173 | 8.040 | 1.59522 | 67.73 | 0.5443 | −6.0 | S-FPM2.OHARA |
| 45 | −45.64263 | 1.200 | 1.92119 | 23.96 | 0.6203 | 2.4 | FDS24.HOYA |
| 46 | 31.61098 | 2.823 | | | | | |
| 47 | 94.06242 | 8.829 | 1.49700 | 81.61 | 0.5389 | −6.2 | FCD1.HOYA |
| 48 | −23.34029 | 0.900 | 1.88100 | 40.14 | 0.5701 | 4.5 | TAFD33.HOYA |
| 49 | −1236.44765 | 2.836 | | | | | |
| 50 | 202.52382 | 6.401 | 1.54814 | 45.78 | 0.5686 | 1.8 | S-TIL1.OHARA |
| 51 | −44.30752 | 2.000 | | | | | |
| 52 | ∞ | 3.620 | 1.51680 | 64.20 | 0.5343 | 2.7 | BSC7.HOYA |
| 53 | ∞ | 44.416 | | | | | |

TABLE 17

Example 6

| | Wide Angle End | Telephoto End |
|---|---|---|
| Zr | 1.0 | 2.3 |
| f | 19.678 | 49.987 |
| Bf | 44.416 | 44.416 |
| FNo. | 2.75 | 2.76 |
| 2ω(°) | 101.2 | 48.4 |
| DD[17] | 1.400 | 46.184 |
| DD[27] | 23.201 | 1.403 |
| DD[30] | 6.261 | 1.882 |
| DD[38] | 20.006 | 1.399 |

TABLE 18

Example 6

| Sn | 1 | 3 | 16 | 18 |
|---|---|---|---|---|
| KA | 1.0000000E+00 | 1.0000000E+00 | 1.0000000E+00 | 1.0000000E+00 |
| A4 | 8.5818185E−06 | −6.1735664E−06 | −4.6455558E−07 | −3.1654885E−18 |
| A6 | −9.7587178E−09 | 7.5718943E−10 | −7.0210851E−11 | 1.0129261E−09 |
| A8 | 1.0235792E−11 | 4.5585013E−12 | 2.6250912E−14 | −1.0383995E−11 |
| A10 | −5.5857009E−15 | −1.3025374E−14 | 1.5577569E−17 | 4.4782513E−14 |
| A12 | −3.8336479E−20 | 6.8098039E−18 | −1.6336385E−19 | −7.6419691E−17 |
| A14 | 1.4349002E−21 | 9.0518001E−21 | 1.0474328E−22 | −6.5422655E−20 |
| A16 | 1.6395797E−25 | −4.4671387E−24 | 7.4281621E−26 | 5.5595799E−22 |
| A18 | −7.1651574E−28 | −1.2947190E−26 | 9.0193214E−29 | −1.6864692E−25 |
| A20 | 2.3214186E−31 | 9.5625929E−30 | −1.5714851E−31 | −1.9255531E−27 | tive power. The intermediate lens group Gm consists of the third lens group G3. The final lens group Gs consists of the fourth lens group G4. During zooming, the first lens group G1 and the fourth lens group G4 remain stationary with respect to the image plane Sim. During zooming, the second lens group G2 and the third lens group G3 move along the optical axis Z by changing the distance between the adjacent groups.

The first lens group G1 consists of ten lenses L1a to L1j in order from the object side to the image side. The second lens group G2 consists of six lenses L2a to L2f in order from the object side to the image side. The third lens group G3 consists of, in order from the object side to the image side, an aperture stop St and three lenses L3a to L3c. The fourth lens group G4 consists of nine lenses L4a to L4i in order from the object side to the image side. The lens L4f corresponds to the positive lens Lp, and the lens L4g corresponds to the negative lens Ln.

Figure 15:
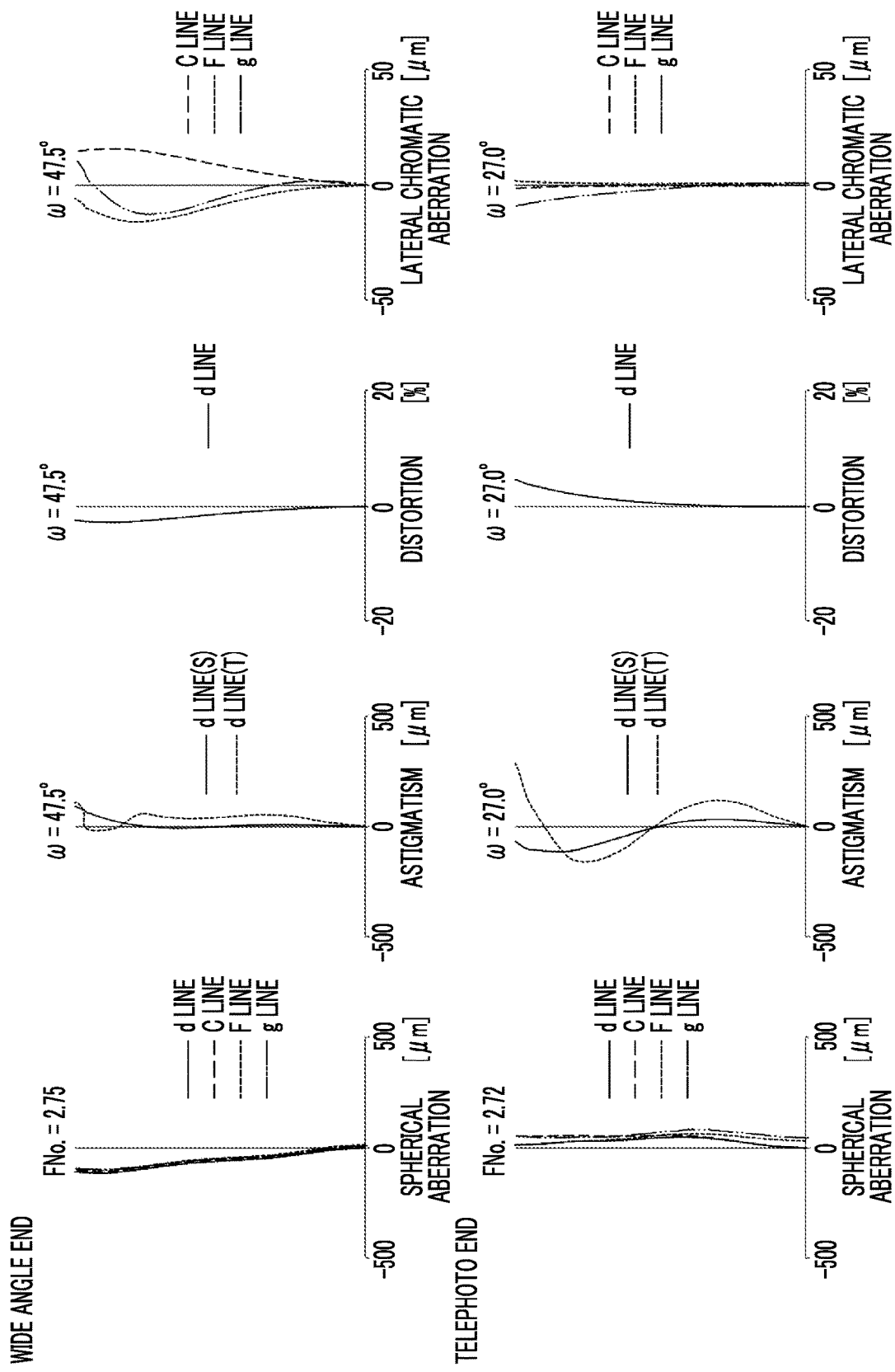
FIG. 15 is a diagram showing aberrations of the zoom lens of Example 7.

Tables 19A and 19B show the basic lens data of the zoom lens of Example 7, Table 20 shows the specifications and the variable surface distances, Table 21 shows the aspheric surface coefficients, and FIG. 15 shows a diagram of aberrations in a state where the object at infinity is in focus.

Example 7

Figure 14:
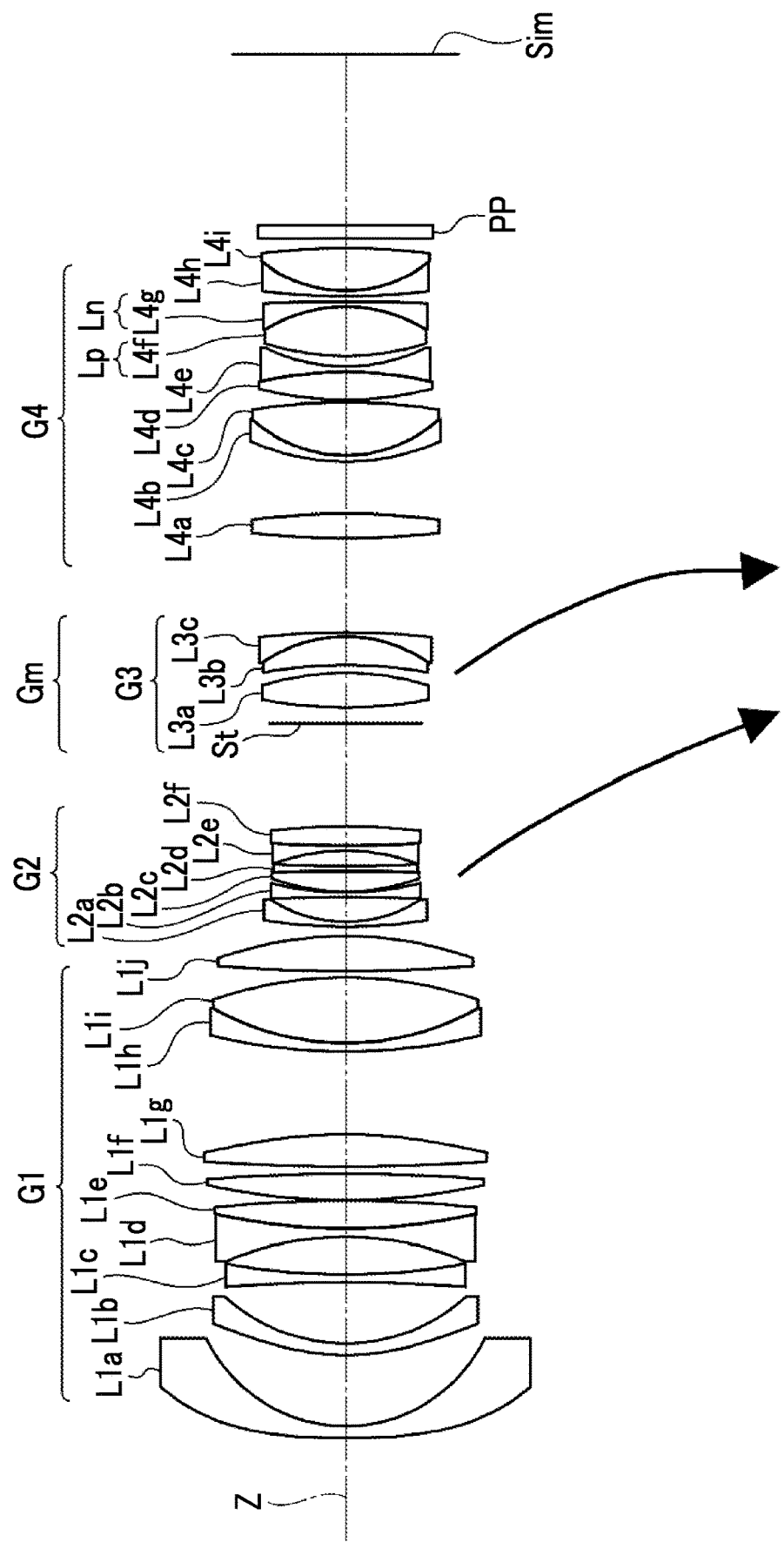
FIG. 14 is a cross-sectional view of a configuration of a zoom lens of Example 7 and a diagram showing movement loci thereof.

FIG. 14 is a cross-sectional view showing a configuration of the zoom lens of Example 7. The zoom lens shown in Example 7 consists of, in order from the object side to the image side, a first lens group G1 having a positive refractive power, a second lens group G2 having a negative refractive power, a third lens group G3 having a positive refractive power, and a fourth lens group G4 having a positive refrac-

TABLE 19A

Example 7

| Sn | R | D | Nd | vd | θgF | dN/dT (×10⁻⁶) | Material Name |
|---|---|---|---|---|---|---|---|
| *1 | 213.22722 | 2.400 | 1.80100 | 34.97 | 0.5864 | 3.6 | S-LAM66.OHARA |
| 2 | 32.38162 | 14.501 | | | | | |
| *3 | 47.77127 | 2.400 | 1.90366 | 31.31 | 0.5948 | 4.0 | TAFD25.HOYA |
| 4 | 37.99748 | 12.345 | | | | | |
| 5 | −342.67760 | 1.650 | 1.90200 | 25.26 | 0.6166 | 2.0 | J-LASFH24HS.HIKARI |
| 6 | 147.04047 | 7.571 | | | | | |
| 7 | −64.46012 | 1.660 | 1.48749 | 70.24 | 0.5301 | −0.8 | S-FSL5.OHARA |
| 8 | 122.37555 | 5.688 | 1.84666 | 23.78 | 0.6192 | 1.4 | FDS90-SG.HOYA |
| 9 | −264.43174 | 0.120 | | | | | |
| 10 | 137.24525 | 5.361 | 1.73800 | 32.33 | 0.5900 | 5.1 | S-NBH53V.OHARA |
| 11 | −377.06968 | 1.482 | | | | | |
| 12 | 437.40104 | 6.535 | 1.49700 | 81.54 | 0.5375 | −6.2 | S-FPL51.OHARA |
| *13 | −100.32467 | 16.843 | | | | | |
| 14 | 121.66702 | 1.740 | 1.84666 | 23.78 | 0.6192 | 1.4 | FDS90-SG.HOYA |
| 15 | 57.30909 | 13.179 | 1.43700 | 95.10 | 0.5336 | −6.3 | FCD100.HOYA |
| 16 | −86.34256 | 1.357 | | | | | |
| 17 | 344.98841 | 7.044 | 1.53775 | 74.70 | 0.5394 | −4.3 | S-FPM3.OHARA |
| 18 | −80.61190 | DD[18] | | | | | |
| 19 | 110.94685 | 1.000 | 1.52841 | 76.45 | 0.5395 | −5.9 | S-FPM4.OHARA |
| 20 | 29.02243 | 4.996 | | | | | |
| 21 | −378.22005 | 1.000 | 1.73800 | 32.33 | 0.5900 | 5.1 | S-NBH53V.OHARA |
| 22 | 65.38026 | 0.147 | | | | | |
| 23 | 45.37352 | 4.188 | 1.78472 | 25.68 | 0.6162 | 1.5 | S-TIH11.OHARA |
| 24 | −325.17629 | 1.000 | 1.80400 | 46.53 | 0.5578 | 4.4 | S-LAH65VS.OHARA |
| 25 | 341.21154 | 3.095 | | | | | |
| 26 | −43.34901 | 1.000 | 1.81600 | 46.62 | 0.5568 | 5.2 | S-LAH59.OHARA |
| 27 | 200.70774 | 3.955 | 1.68893 | 31.07 | 0.6004 | 2.6 | S-TIM28.OHARA |
| 28 | −133.18800 | DD[28] | | | | | |

TABLE 19B

Example 7

| Sn | R | D | Nd | vd | θgF | dN/dT (×10⁻⁶) | Material Name |
|---|---|---|---|---|---|---|---|
| 29(St) | ∞ | 3.197 | | | | | |
| *30 | 92.54139 | 7.000 | 1.72916 | 54.68 | 0.5445 | 4.0 | S-LAL18.OHARA |
| 31 | −60.48815 | 1.638 | | | | | |
| 32 | −96.22963 | 5.778 | 1.52841 | 76.45 | 0.5395 | −5.9 | S-FPM4.OHARA |
| 33 | −30.41757 | 0.900 | 1.74100 | 52.64 | 0.5468 | 4.2 | S-LAL61.OHARA |
| 34 | −154.93481 | DD[34] | | | | | |
| 35 | 177.04444 | 4.928 | 1.58267 | 46.48 | 0.5663 | 1.2 | J-BAF3.HIKARI |
| 36 | −167.13628 | 10.532 | | | | | |
| 37 | 49.15818 | 1.260 | 1.51742 | 52.43 | 0.5565 | 2.4 | S-NSL36.OHARA |
| 38 | 29.24621 | 10.825 | 1.53775 | 74.70 | 0.5394 | −4.3 | S-FPM3.OHARA |
| 39 | −121.01266 | 0.500 | | | | | |
| 40 | 73.29454 | 5.606 | 1.53775 | 74.70 | 0.5394 | −4.3 | S-FPM3.OHARA |
| 41 | −81.30586 | 1.170 | 1.90043 | 37.37 | 0.5767 | 4.2 | TAFD37A.HOYA |
| 42 | 38.60561 | 2.127 | | | | | |
| 43 | 55.42481 | 10.010 | 1.53775 | 74.70 | 0.5394 | −4.3 | S-FPM3.OHARA |
| 44 | −31.94384 | 1.000 | 1.83400 | 37.17 | 0.5787 | −0.1 | S-LAH60MQ.OHARA |
| 45 | −433.83533 | 1.161 | | | | | |
| 46 | 147.37371 | 1.100 | 1.95375 | 32.32 | 0.5901 | 4.9 | TAFD45.HOYA |
| 47 | 28.61799 | 8.563 | 1.67270 | 32.10 | 0.5989 | 2.9 | S-TIM25.OHARA |
| 48 | −149.68039 | 2.000 | | | | | |
| 49 | ∞ | 2.620 | 1.51680 | 64.20 | 0.5343 | 2.7 | BSC7.HOYA |
| 50 | ∞ | 34.875 | | | | | |

TABLE 20

Example 7

|  | Wide Angle End | Telephoto End |
|---|---|---|
| Zr | 1.0 | 2.0 |
| f | 22.004 | 44.008 |
| Bf | 34.875 | 34.875 |
| FNo. | 2.75 | 2.72 |
| 2ω(°) | 95.0 | 54.0 |
| DD[18] | 1.960 | 38.332 |
| DD[28] | 20.764 | 1.476 |
| DD[34] | 19.131 | 2.047 |

TABLE 21

Example 7

| Sn | 1 | 3 | 13 | 30 |
|---|---|---|---|---|
| KA | 1.0000000E+00 | 1.0000000E+00 | 1.0000000E+00 | 1.0000000E+00 |
| A4 | 5.7238432E−06 | −4.6198739E−06 | 9.1183306E−07 | −2.3590920E−07 |
| A6 | −5.1277326E−09 | 1.4483466E−09 | −1.1779856E−09 | −1.5322076E−09 |
| A8 | 4.9660384E−12 | −7.3701293E−12 | 6.9277528E−12 | 1.6149535E−11 |
| A10 | −3.3668015E−15 | 5.7367897E−14 | −2.0750367E−14 | −4.9431664E−14 |
| A12 | 2.0876440E−18 | −2.3489349E−16 | 3.6808394E−17 | −2.0318190E−16 |
| A14 | −1.8823090E−21 | 5.4055227E−19 | −3.9494407E−20 | 2.4074246E−18 |
| A16 | 1.6112252E−24 | −7.1422351E−22 | 2.4660820E−23 | −8.9758402E−21 |
| A18 | −7.5902400E−28 | 5.0657275E−25 | −7.9376516E−27 | 1.5525216E−23 |
| A20 | 1.4066650E−31 | −1.4940841E−28 | 9.2170309E−31 | −1.0408680E−26 |

Example 8

Figure 16:
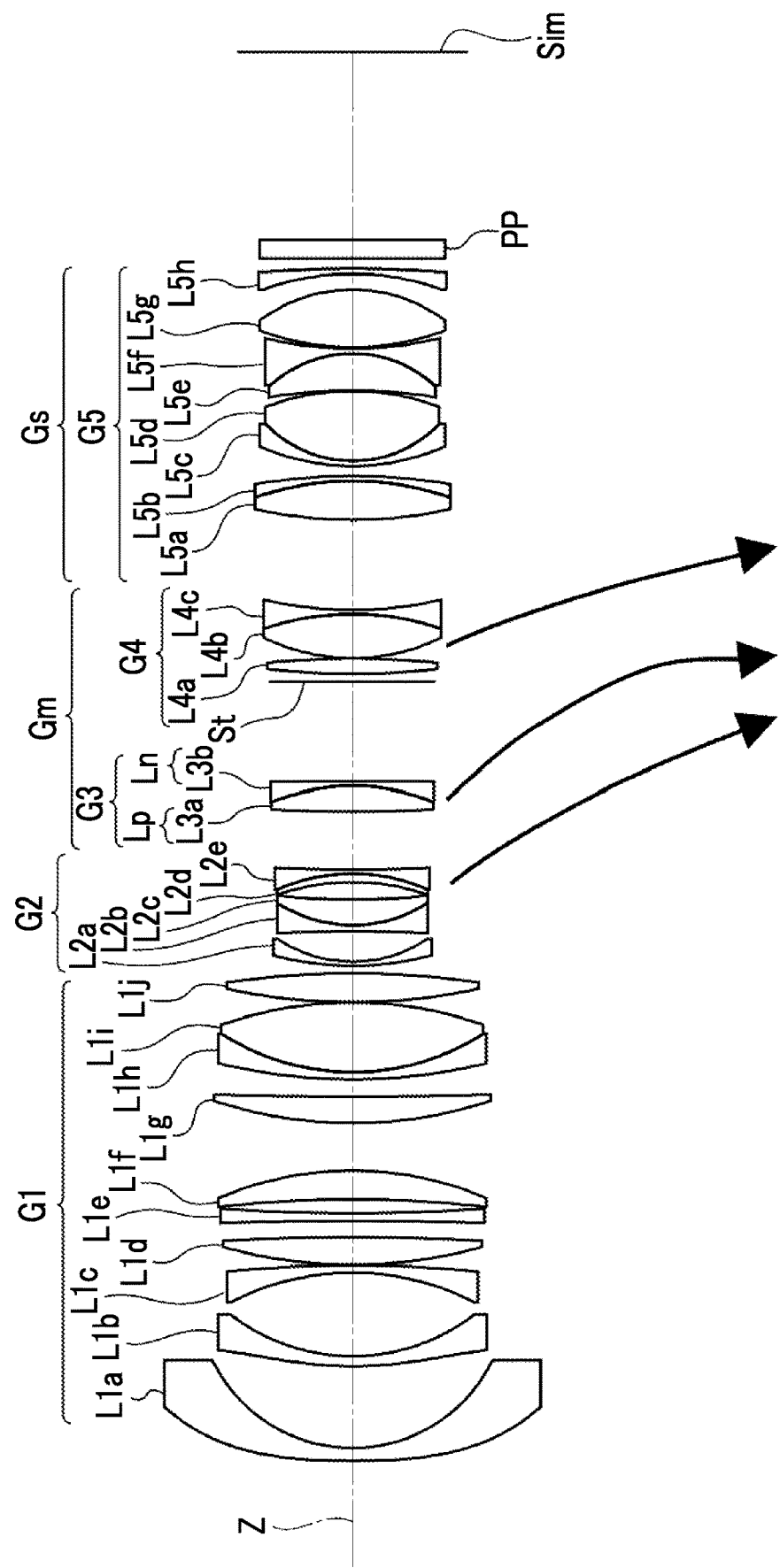
FIG. 16 is a cross-sectional view of a configuration of a zoom lens of Example 8 and a diagram showing movement loci thereof.

FIG. 16 is a cross-sectional view showing a configuration of the zoom lens of Example 8. The zoom lens shown in Example 8 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of two lenses L3a and L3b in order from the object side to the image side. The fourth lens group G4 consists of, in order from the object side to the image side, an aperture stop St and three lenses L4a to L4c. The fifth lens group G5 consists of eight lenses L5a to L5h in order from the object side to the image side. The lens L3a corresponds to the positive lens Lp, and the lens L3b corresponds to the negative lens Ln.

Figure 17:
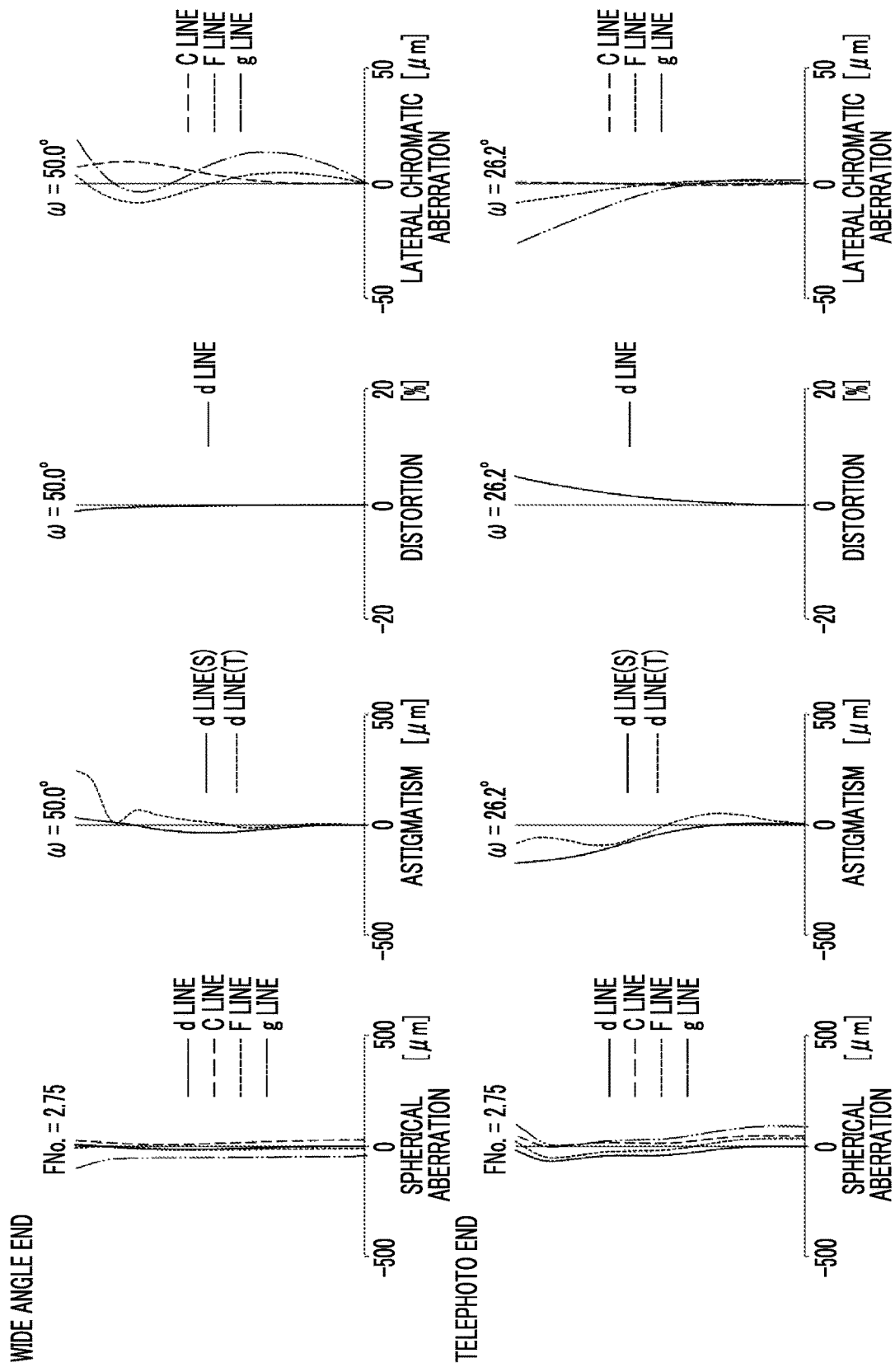
FIG. 17 is a diagram showing aberrations of the zoom lens of Example 8.

Tables 22A and 22B show the basic lens data of the zoom lens of Example 8, Table 23 shows the specifications and the variable surface distances, Table 24 shows the aspheric surface coefficients, and FIG. 17 shows a diagram of aberrations in a state where the object at infinity is in focus.

TABLE 22A

Example 8

| Sn | R | D | Nd | vd | θgF | dN/dT (×10$^{-6}$) | Material Name |
|---|---|---|---|---|---|---|---|
| *1 | 204.00210 | 2.500 | 1.80610 | 33.27 | 0.5885 | 4.7 | NBFD15.HOYA |
| 2 | 31.87667 | 16.271 |  |  |  |  |  |
| *3 | 74.21752 | 2.000 | 1.90366 | 31.31 | 0.5948 | 4.0 | TAFD25.HOYA |
| 4 | 41.19820 | 16.572 |  |  |  |  |  |
| 5 | −54.38184 | 1.400 | 1.49700 | 81.54 | 0.5375 | −6.2 | S-FPL51.OHARA |
| 6 | −266.75532 | 0.121 |  |  |  |  |  |
| 7 | 101.90182 | 5.407 | 1.67270 | 32.10 | 0.5989 | 2.9 | S-TIM25.OHARA |
| 8 | −490.47737 | 3.228 |  |  |  |  |  |
| 9 | −811.11866 | 1.500 | 1.84666 | 23.78 | 0.6205 | 1.3 | S-TIH53W.OHARA |
| 10 | 379.62876 | 2.790 |  |  |  |  |  |
| 11 | −233.32733 | 5.648 | 1.51633 | 64.14 | 0.5353 | 2.7 | S-BSL7.OHARA |
| *12 | −71.04886 | 9.505 |  |  |  |  |  |
| 13 | 91.57991 | 5.269 | 1.48749 | 70.24 | 0.5301 | −0.8 | S-FSL5.OHARA |

TABLE 22A-continued

Example 8

| Sn | R | D | Nd | νd | θgF | dN/dT (×10⁻⁶) | Material Name |
|---|---|---|---|---|---|---|---|
| 14 | 1217.72414 | 3.383 | | | | | |
| 15 | 118.50126 | 1.400 | 1.76200 | 40.10 | 0.5765 | 3.7 | S-LAM55.OHARA |
| 16 | 49.92540 | 13.714 | 1.43700 | 95.10 | 0.5336 | −6.3 | FCD100.HOYA |
| 17 | −83.72652 | 0.120 | | | | | |
| 18 | 125.49568 | 5.685 | 1.53775 | 74.70 | 0.5394 | −4.3 | S-FPM3.OHARA |
| 19 | −181.22727 | DD[19] | | | | | |
| 20 | 62.50589 | 0.800 | 1.88300 | 40.76 | 0.5668 | 4.9 | S-LAH58.OHARA |
| 21 | 27.39909 | 6.033 | | | | | |
| 22 | −282.16491 | 1.221 | 1.43700 | 95.10 | 0.5336 | −6.3 | FCD100.HOYA |
| 23 | 28.33514 | 5.100 | 1.85025 | 30.05 | 0.5980 | 3.0 | S-NBH57.OHARA |
| 24 | 149.81816 | 3.448 | | | | | |
| 25 | −46.72429 | 1.670 | 1.69895 | 30.13 | 0.6030 | 3.6 | S-TIM35.OHARA |
| 26 | −38.25946 | 0.810 | 1.69560 | 59.05 | 0.5435 | 0.4 | K-LAFK58.SUMITA |
| 27 | 350.72809 | DD[27] | | | | | |
| 28 | 303.59885 | 4.986 | 1.77250 | 49.60 | 0.5521 | 4.5 | S-LAH66.OHARA |
| 29 | −43.88434 | 0.810 | 1.63980 | 34.47 | 0.5923 | 2.5 | S-TIM27.OHARA |
| 30 | −8259.20740 | DD[30] | | | | | |

TABLE 22B

Example 8

| Sn | R | D | Nd | νd | θgF | dN/dT (×10⁻⁶) | Material Name |
|---|---|---|---|---|---|---|---|
| 31(St) | ∞ | 1.546 | | | | | |
| 32 | 153.36507 | 2.990 | 1.84666 | 23.78 | 0.6205 | 1.3 | S-TIH53W.OHARA |
| 33 | −172.92267 | 0.120 | | | | | |
| 34 | 41.22921 | 8.769 | 1.48749 | 70.24 | 0.5301 | −0.8 | S-FSL5.OHARA |
| 35 | −55.56716 | 0.800 | 1.80000 | 29.84 | 0.6018 | 4.4 | S-NBH55.OHARA |
| 36 | 79.99190 | DD[36] | | | | | |
| 37 | 91.91513 | 7.695 | 1.84666 | 23.78 | 0.6205 | 1.3 | S-TIH53W.OHARA |
| 38 | −61.81916 | 1.001 | 1.85150 | 40.78 | 0.5696 | 5.3 | S-LAH89.OHARA |
| 39 | −119.07696 | 2.001 | | | | | |
| 40 | 46.97597 | 1.000 | 1.84850 | 43.79 | 0.5620 | 5.2 | J-LASFH22.HIKARI |
| 41 | 24.55688 | 13.884 | 1.43700 | 95.10 | 0.5336 | −6.3 | FCD100.HOYA |
| 42 | −50.04519 | 0.121 | | | | | |
| 43 | −102.83525 | 7.312 | 1.56883 | 56.04 | 0.5485 | 6.6 | BAC4.HOYA |
| 44 | −24.78387 | 1.000 | 2.00069 | 25.46 | 0.6136 | 3.8 | TAFD40-W.HOYA |
| 45 | 77.99877 | 0.212 | | | | | |
| 46 | 53.45927 | 11.488 | 1.53775 | 74.70 | 0.5394 | −4.3 | S-FPM3.OHARA |
| 47 | −31.55306 | 3.089 | | | | | |
| 48 | −54.43544 | 1.000 | 1.80610 | 40.93 | 0.5702 | 6.9 | S-LAH53.OHARA |
| *49 | −168.07479 | 2.000 | | | | | |
| 50 | ∞ | 3.620 | 1.51680 | 64.20 | 0.5343 | 2.7 | BSCY7.HOYA |
| 51 | ∞ | 37.356 | | | | | |

TABLE 23

Example 8

| | Wide Angle End | Telephoto End |
|---|---|---|
| Zr | 1.0 | 2.3 |
| f | 19.699 | 44.933 |
| Bf | 37.356 | 37.356 |
| FNo. | 2.75 | 2.75 |
| 2ω(°) | 100.0 | 52.4 |
| DD[19] | 1.493 | 45.505 |
| DD[27] | 11.473 | 1.475 |
| DD[30] | 19.750 | 1.490 |
| DD[36] | 17.763 | 2.009 |

TABLE 24

Example 8

| Sn | 1 | 3 | 12 | 49 |
|---|---|---|---|---|
| KA | 1.0000000E+00 | 1.0000000E+00 | 1.0000000E+00 | 1.0000000E+00 |
| A4 | 6.1717302E−06 | −4.5297258E−06 | −1.4773137E−07 | 2.8038815E−06 |
| A6 | −6.0176978E−09 | 2.5590904E−09 | −6.4157731E−10 | −6.9766557E−10 |
| A8 | 5.3797093E−12 | −4.5622554E−12 | 7.8153520E−12 | 1.5634384E−11 |
| A10 | 9.1753675E−16 | 2.2641762E−14 | −4.0036728E−14 | −2.1610882E−13 |
| A12 | −1.0446270E−17 | −1.0240072E−16 | 1.1406218E−16 | 1.7397120E−15 |
| A14 | 1.4815198E−20 | 2.6518865E−19 | −1.9281326E−19 | −7.9137992E−18 |
| A16 | −1.0514585E−23 | −3.7843038E−22 | 1.9055601E−22 | 2.1027883E−20 |
| A18 | 3.8801605E−27 | 2.7922150E−25 | −1.0115771E−25 | −3.0651401E−23 |
| A20 | −5.9144123E−31 | −8.3281136E−29 | 2.2128100E−29 | 1.9462228E−26 |

Example 9

Figure 18:
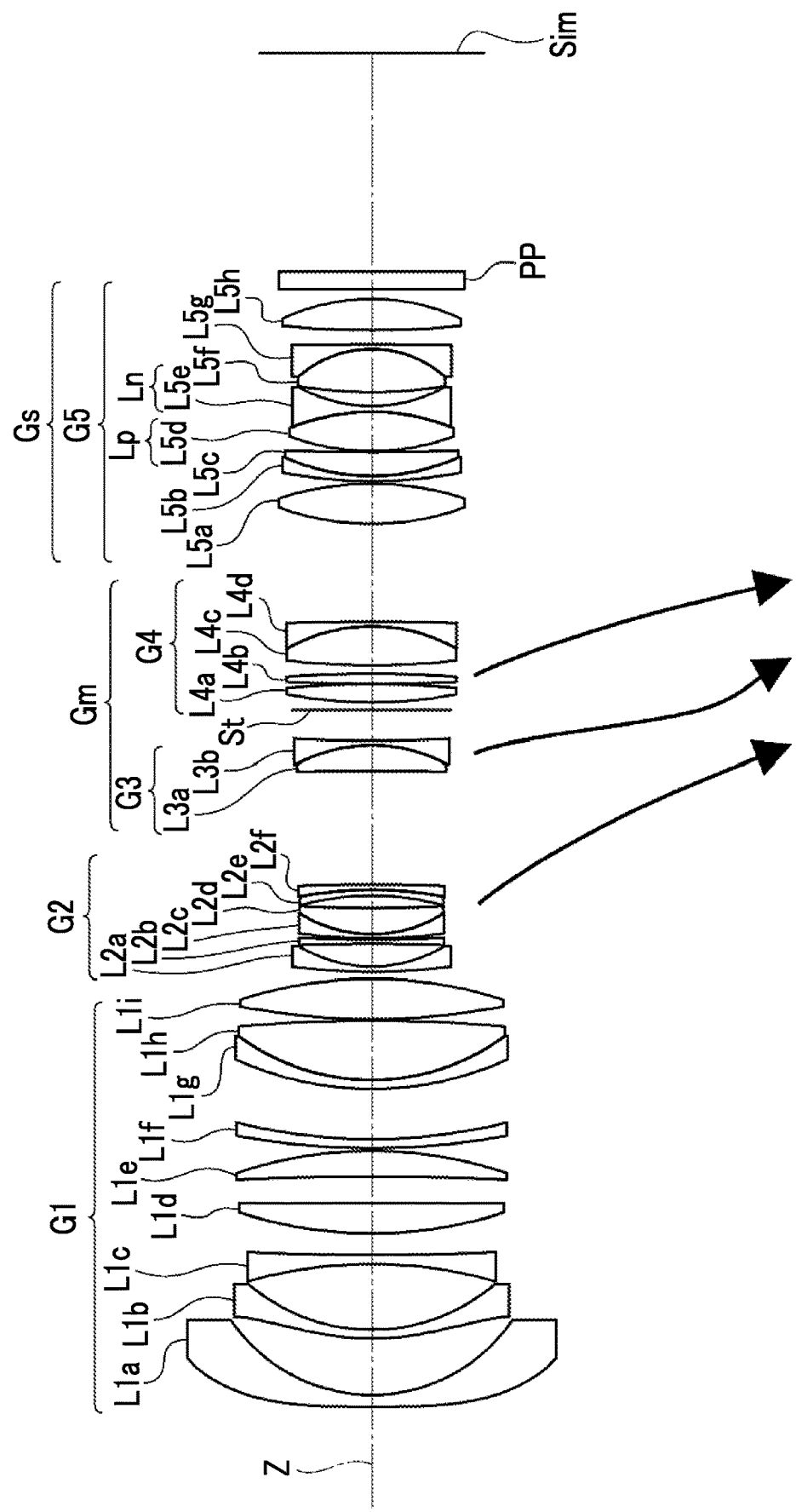
FIG. 18 is a cross-sectional view of a configuration of a zoom lens of Example 9 and a diagram showing movement loci thereof.

FIG. 18 is a cross-sectional view showing a configuration of the zoom lens of Example 9. The zoom lens shown in Example 9 consists of, in order from the object side to the image side, a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of nine lenses L1a to L1i in order from the object side to the image side. The second lens group G2 consists of six lenses L2a to L2f in order from the object side to the image side. The third lens group G3 consists of two lenses L3a and L3b in order from the object side to the image side. The fourth lens group G4 consists of, in order from the object side to the image side, an aperture stop St and four lenses L4a to L4d. The fifth lens group G5 consists of eight lenses L5a to L5h in order from the object side to the image side. The lens L5d corresponds to the positive lens Lp, and the lens L5e corresponds to the negative lens Ln.

Figure 19:
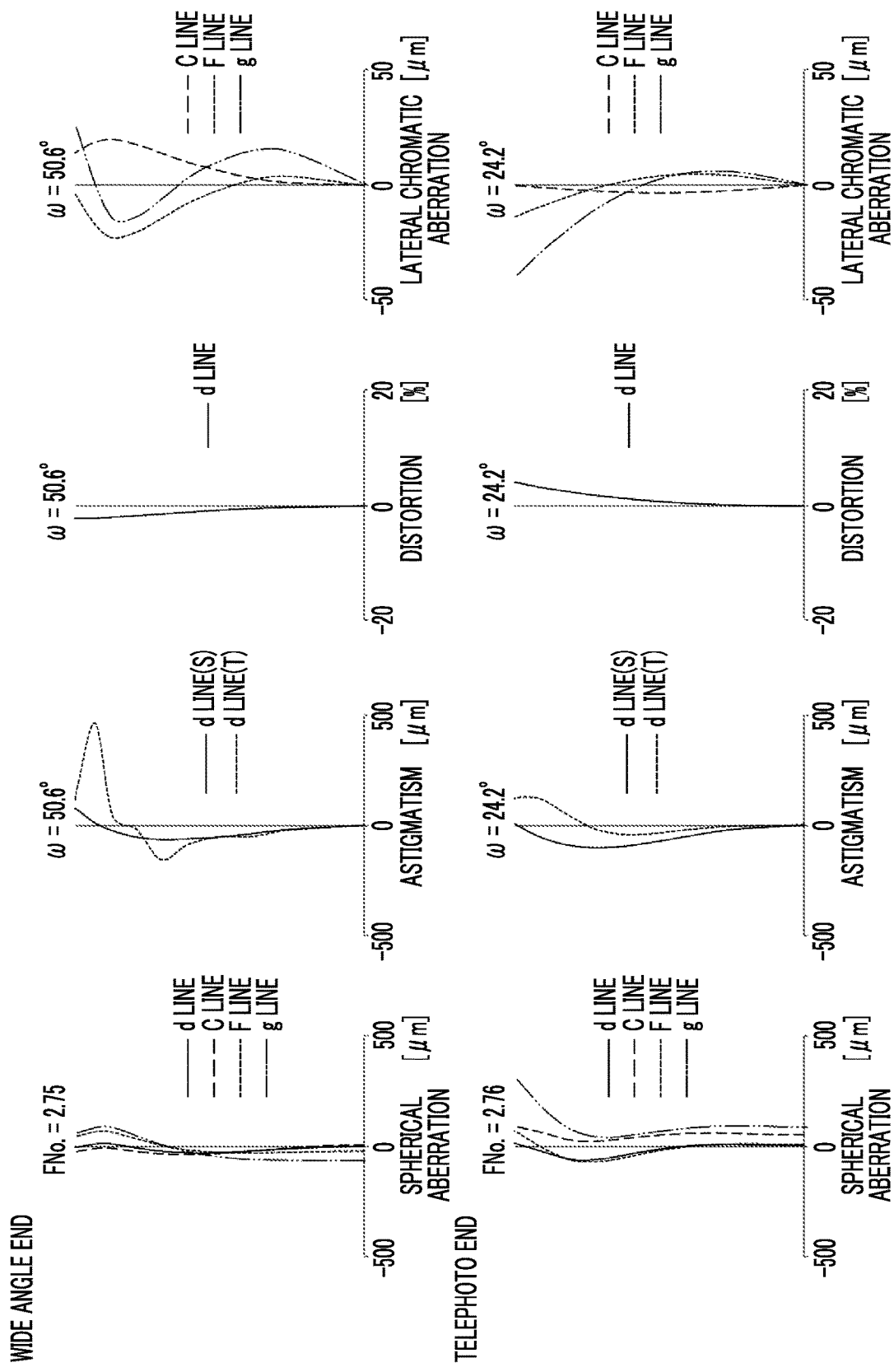
FIG. 19 is a diagram showing aberrations of the zoom lens of Example 9.

Tables 25A and 25B show the basic lens data of the zoom lens of Example 9, Table 26 shows the specifications and the variable surface distances, Table 27 shows the aspheric surface coefficients, and FIG. 19 shows a diagram of aberrations in a state where the object at infinity is in focus.

TABLE 25A

Example 9

| Sn | R | D | Nd | vd | θgF | dN/dT (×10$^{-6}$) | Material Name |
|---|---|---|---|---|---|---|---|
| *1 | 4614.38562 | 2.400 | 1.80610 | 33.27 | 0.5885 | 4.7 | NBFD15.HOYA |
| 2 | 36.01773 | 11.512 | | | | | |
| *3 | 52.98224 | 1.800 | 1.90366 | 31.31 | 0.5948 | 4.0 | TAFD25.HOYA |
| 4 | 40.32122 | 13.405 | | | | | |
| 5 | −96.46881 | 1.899 | 1.80400 | 46.53 | 0.5578 | 4.4 | S-LAH65VS.OHARA |
| 6 | 609.20279 | 4.402 | | | | | |
| 7 | 93.86674 | 6.077 | 1.72151 | 29.23 | 0.6054 | 2.7 | S-TIH18.OHARA |
| 8 | 4638.39363 | 5.390 | | | | | |
| 9 | −677.81998 | 5.259 | 1.43700 | 95.10 | 0.5336 | −6.3 | FCD100.HOYA |
| 10 | −90.85213 | 0.613 | | | | | |
| 11 | 159.30386 | 1.800 | 1.64769 | 33.79 | 0.5939 | 2.3 | S-TIM22.OHARA |
| 12 | 118.68848 | 10.319 | | | | | |
| 13 | 70.21529 | 1.800 | 1.80518 | 25.42 | 0.6162 | 1.2 | S-TIH6.OHARA |
| 14 | 47.67583 | 12.159 | 1.43700 | 95.10 | 0.5336 | −6.3 | FCD100.HOYA |
| 15 | −304.23268 | 0.267 | | | | | |
| *16 | 133.22201 | 8.189 | 1.69680 | 55.53 | 0.5434 | 4.1 | S-LAL14.OHARA |
| 17 | −92.08739 | DD[17] | | | | | |
| *18 | 134.26182 | 1.101 | 1.90366 | 31.31 | 0.5948 | 4.0 | TAFD25.HOYA |
| 19 | 29.92052 | 4.585 | | | | | |
| 20 | −617.79697 | 0.900 | 1.74400 | 44.79 | 0.5656 | 3.0 | S-LAM2.OHARA |
| 21 | 370.17522 | 0.197 | | | | | |
| 22 | 109.53184 | 0.911 | 1.49700 | 81.61 | 0.5389 | −6.2 | FCD1.HOYA |
| 23 | 28.42809 | 5.375 | 1.85478 | 24.80 | 0.6123 | 4.3 | S-NBH56.OHARA |
| 24 | 302.38647 | 2.515 | | | | | |
| 25 | −56.50598 | 1.210 | 1.84666 | 23.78 | 0.6205 | 1.3 | S-TIH53W.OHARA |
| 26 | −77.64429 | 1.001 | 1.84850 | 43.79 | 0.5620 | 5.2 | J-LASFH22.HIKARI |
| 27 | −512.66455 | DD[27] | | | | | |
| 28 | −1028.02721 | 5.139 | 1.57501 | 41.50 | 0.5767 | 3.3 | S-TIL27.OHARA |
| 29 | −33.77153 | 0.900 | 1.69560 | 59.05 | 0.5435 | 0.4 | K-LAFK58.SUMITA |
| 30 | 369.36512 | DD[30] | | | | | |

TABLE 25B

Example 9

| Sn | R | D | Nd | vd | θgF | dN/dT (×10⁻⁶) | Material Name |
|---|---|---|---|---|---|---|---|
| 31(St) | ∞ | 1.499 | | | | | |
| 32 | 93.65417 | 3.727 | 1.83400 | 37.17 | 0.5787 | −0.1 | S-LAH60MQ.OHARA |
| 33 | −197.16622 | 0.119 | | | | | |
| 34 | 499.49887 | 2.068 | 1.72151 | 29.23 | 0.6054 | 2.7 | S-TIH18.OHARA |
| 35 | −240.34411 | 1.665 | | | | | |
| 36 | 155.77937 | 8.009 | 1.53775 | 74.70 | 0.5394 | −4.3 | S-FPM3.OHARA |
| 37 | −36.14474 | 0.900 | 1.80400 | 46.53 | 0.5578 | 4.4 | S-LAH65VS.OHARA |
| 38 | −716.82253 | DD[38] | | | | | |
| 39 | 57.01679 | 8.099 | 1.49700 | 81.61 | 0.5389 | −6.2 | FCD1.HOYA |
| 40 | −64.57883 | 0.589 | | | | | |
| 41 | 100.13349 | 1.034 | 1.84850 | 43.79 | 0.5620 | 5.2 | J-LASFH22.HIKARI |
| 42 | 44.75280 | 4.849 | 1.84666 | 23.83 | 0.6160 | 18.9 | SF57HTULTRA.SCHOTT |
| 43 | 498.84788 | 0.200 | | | | | |
| 44 | 49.45453 | 8.021 | 1.59522 | 67.73 | 0.5443 | −6.0 | S-FPM2.OHARA |
| 45 | −45.80312 | 1.200 | 1.92119 | 23.96 | 0.6203 | 2.4 | FDS24.HOYA |
| 46 | 31.58975 | 2.836 | | | | | |
| 47 | 94.07172 | 8.868 | 1.49700 | 81.61 | 0.5389 | −6.2 | FCD1.HOYA |
| 48 | −23.31710 | 0.901 | 1.88300 | 40.76 | 0.5668 | 4.9 | S-LAH58.OHARA |
| 49 | −1030.57090 | 2.952 | | | | | |
| 50 | 203.89375 | 6.364 | 1.56069 | 58.34 | 0.5453 | 2.5 | H-BAK5.CDGM |
| 51 | −45.09836 | 2.000 | | | | | |
| 52 | ∞ | 3.620 | 1.51633 | 64.14 | 0.5353 | 2.7 | S-BSL7.OHARA |
| 53 | ∞ | 44.598 | | | | | |

TABLE 26

Example 9

| | Wide Angle End | Telephoto End |
|---|---|---|
| Zr | 1.0 | 2.5 |
| f | 19.677 | 49.985 |
| Bf | 44.598 | 44.598 |
| FNo. | 2.75 | 2.76 |
| 2ω(°) | 101.2 | 48.4 |
| DD[17] | 1.400 | 46.194 |
| DD[27] | 23.223 | 1.407 |
| DD[30] | 6.248 | 1.882 |
| DD[38] | 20.014 | 1.402 |

TABLE 27

Example 9

| Sn | 1 | 3 | 16 | 18 |
|---|---|---|---|---|
| KA | 1.0000000E+00 | 1.0000000E+00 | 1.0000000E+00 | 1.0000000E+00 |
| A4 | 8.5861252E−06 | −6.1755938E−06 | −4.6453036E−07 | −2.7545836E−08 |
| A6 | −9.7583854E−09 | 7.5290638E−10 | −6.9710762E−11 | 1.0119310E−09 |
| A8 | 1.0235954E−11 | 4.5570370E−12 | 2.6617366E−14 | −1.0244819E−11 |
| A10 | −5.5845927E−15 | −1.3024286E−14 | 1.4972715E−17 | 4.4954120E−14 |
| A12 | −3.9584773E−20 | 6.8056432E−18 | −1.6344392E−19 | −7.7527308E−17 |
| A14 | 1.4359616E−21 | 9.0593115E−21 | 1.0370408E−22 | −7.4752695E−20 |
| A16 | 1.6314332E−25 | −4.4715872E−24 | 7.5037283E−26 | 5.6775785E−22 |
| A18 | −7.1620035E−28 | −1.2942142E−26 | 9.0107137E−29 | −1.1252817E−25 |
| A20 | 2.3217356E−31 | 9.5647004E−30 | −1.5638593E−31 | −1.9729098E−27 |

Example 10

Figure 20:
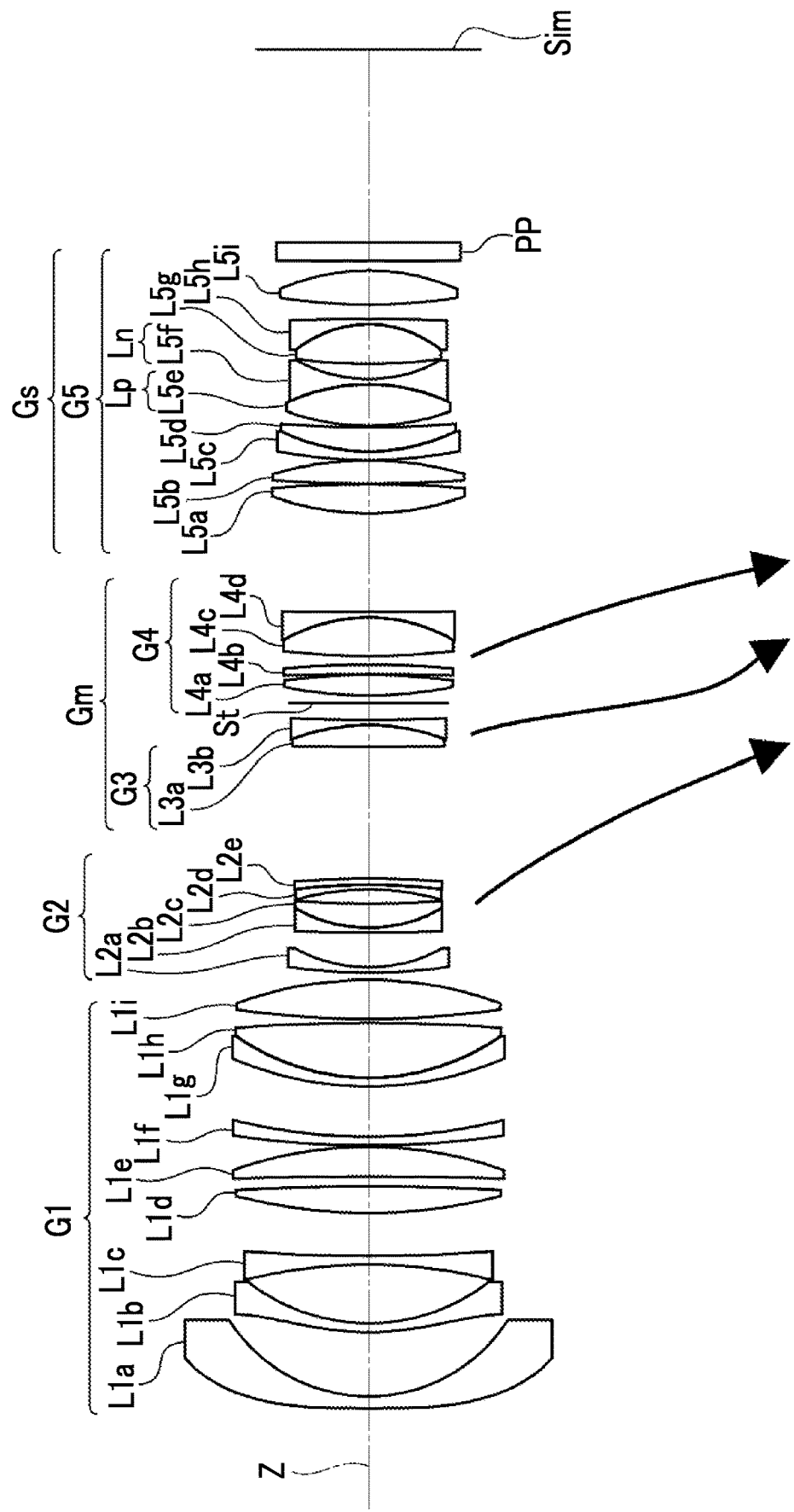
FIG. 20 is a cross-sectional view of a configuration of a zoom lens of Example 10 and a diagram showing movement loci thereof.

FIG. 20 is a cross-sectional view showing a configuration of the zoom lens of Example 10. The zoom lens shown in Example 10 consists of, in order from the object side to the image side, a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of nine lenses L1a to L1i in order from the object side to the image side. The second lens group G2 consists of five lenses L2a to L2e in order from the object side to the image side. The third lens group G3 consists of two lenses L3a and L3b in order from the object side to the image side. The fourth lens group G4 consists of, in order from the object side to the image side, an aperture stop St and four lenses L4a to L4d. The fifth lens group G5 consists of nine lenses L5a to L5i in order from the object side to the image side. The lens L5e corresponds to the positive lens Lp, and the lens L5f corresponds to the negative lens Ln.

Figure 21:
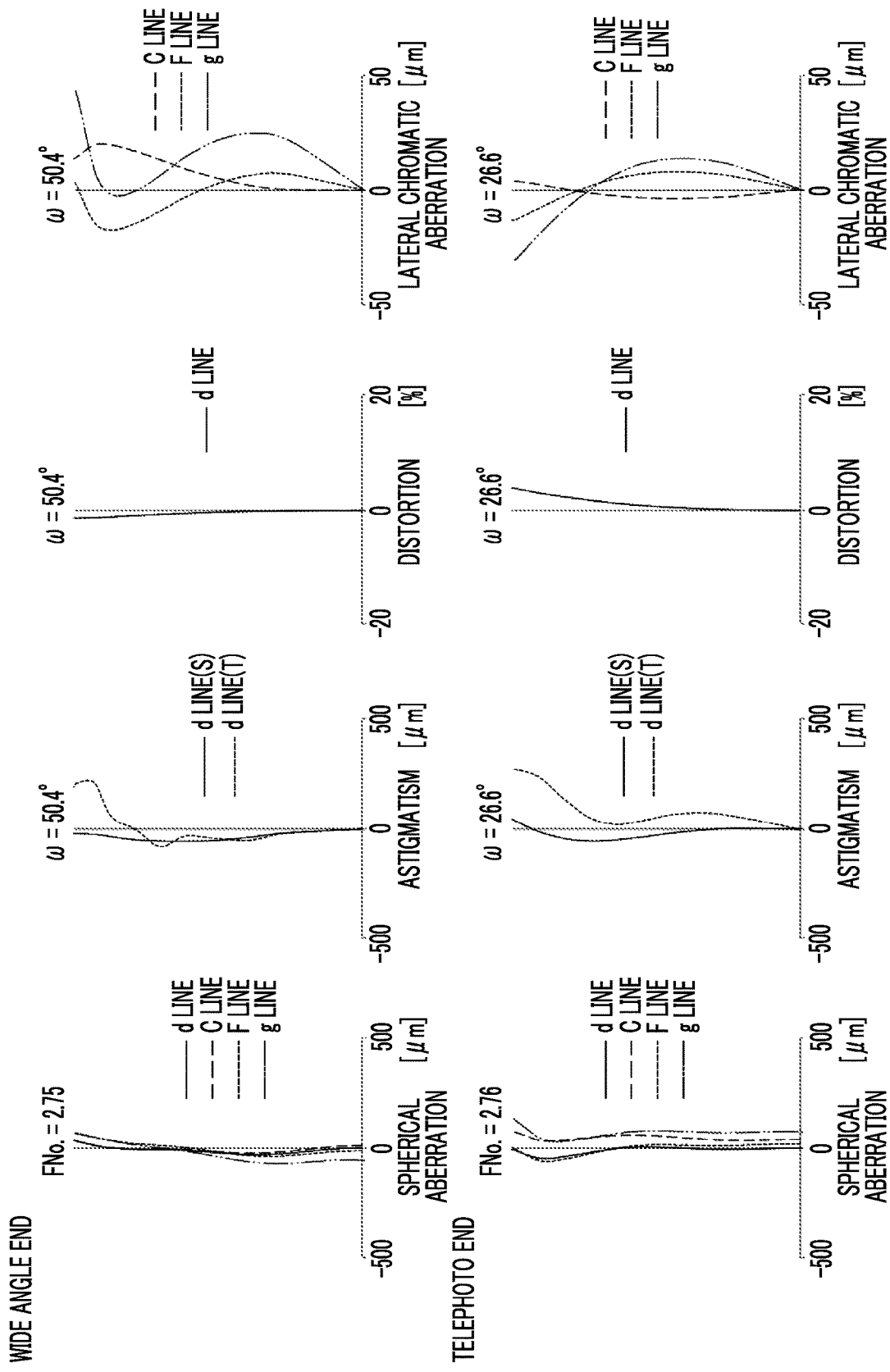
FIG. 21 is a diagram showing aberrations of the zoom lens of Example 10.

Tables 28A and 28B show the basic lens data of the zoom lens of Example 10, Table 29 shows the specifications and the variable surface distances, Table 30 shows the aspheric surface coefficients, and FIG. 21 shows a diagram of aberrations in a state where the object at infinity is in focus.

TABLE 28A

Example 10

| Sn | R | D | Nd | vd | θgF | dN/dT (×10⁻⁶) | Material Name |
|---|---|---|---|---|---|---|---|
| *1 | 1568.22244 | 2.401 | 1.80610 | 33.27 | 0.5885 | 4.7 | NBFD15.HOYA |
| 2 | 35.22811 | 13.160 | | | | | |
| *3 | 56.67972 | 1.801 | 1.90366 | 31.31 | 0.5948 | 4.0 | TAFD25.HOYA |
| 4 | 41.78951 | 12.002 | | | | | |
| 5 | −108.85890 | 1.801 | 1.80400 | 46.53 | 0.5578 | 4.4 | S-LAH65VS.OHARA |
| 6 | 352.47820 | 8.743 | | | | | |
| 7 | 114.21564 | 5.387 | 1.72825 | 28.46 | 0.6077 | 2.8 | S-TIH10.OHARA |
| 8 | −522.34004 | 2.071 | | | | | |
| 9 | −779.27677 | 6.033 | 1.43700 | 95.10 | 0.5336 | −6.3 | FCD100.HOYA |
| 10 | −86.22576 | 0.293 | | | | | |
| 11 | 196.56722 | 1.802 | 1.64769 | 33.79 | 0.5939 | 2.3 | S-TIM22.OHARA |
| 12 | 119.60212 | 10.319 | | | | | |
| 13 | 73.57839 | 1.802 | 1.84666 | 23.78 | 0.6205 | 1.3 | S-TIH53W.OHARA |
| 14 | 49.49185 | 11.206 | 1.43700 | 95.10 | 0.5336 | −6.3 | FCD100.HOYA |
| 15 | −377.22222 | 0.837 | | | | | |
| *16 | 187.11289 | 7.944 | 1.69680 | 55.53 | 0.5434 | 4.1 | S-LAL14.OHARA |
| 17 | −83.11907 | DD[17] | | | | | |
| 18 | 120.65319 | 1.101 | 1.91082 | 35.25 | 0.5822 | 5.3 | TAFD35.HOYA |
| 19 | 32.20267 | 7.084 | | | | | |
| 20 | 457.70529 | 1.021 | 1.49700 | 81.61 | 0.5389 | −6.2 | FCD1.HOYA |
| 21 | 31.06031 | 4.976 | 1.85896 | 22.73 | 0.6284 | 1.9 | S-NPH5.OHARA |
| 22 | 210.30396 | 2.855 | | | | | |
| 23 | −57.18409 | 1.011 | 1.86966 | 20.02 | 0.6435 | 1.0 | FDS20-W.HOYA |
| 24 | −123.37620 | 1.250 | 1.88300 | 40.76 | 0.5668 | 4.9 | S-LAH58.OHARA |
| 25 | −205.11987 | DD[25] | | | | | |
| 26 | 1112.81493 | 4.312 | 1.59551 | 39.24 | 0.5804 | 2.1 | S-TIM8.OHARA |
| 27 | −45.22549 | 1.051 | 1.75500 | 52.32 | 0.5476 | 4.1 | S-LAH97.OHARA |
| 28 | 380.19856 | DD[28] | | | | | |

TABLE 28B

Example 10

| Sn | R | D | Nd | vd | θgF | dN/dT (×10⁻⁶) | Material Name |
|---|---|---|---|---|---|---|---|
| 29(St) | ∞ | 1.501 | | | | | |
| *30 | 84.43825 | 4.255 | 1.80100 | 34.97 | 0.5864 | 3.6 | S-LAM66.OHARA |
| 31 | −135.32578 | 0.121 | | | | | |
| 32 | −624.42634 | 2.000 | 1.75520 | 27.51 | 0.6103 | 2.1 | S-TIH4.OHARA |
| 33 | −209.46256 | 1.762 | | | | | |
| 34 | 156.97368 | 7.891 | 1.53775 | 74.70 | 0.5394 | −4.3 | S-FPM3.OHARA |
| 35 | −36.30980 | 1.101 | 1.79952 | 42.24 | 0.5676 | 10.2 | S-LAH52Q.OHARA |
| 36 | 1641.49902 | DD[36] | | | | | |
| 37 | 62.65477 | 5.830 | 1.49700 | 81.61 | 0.5389 | −6.2 | FCD1.HOYA |
| 38 | −262.99569 | 0.120 | | | | | |
| 39 | 296.64032 | 4.728 | 1.53172 | 48.84 | 0.5631 | 1.9 | S-TIL6.OHARA |
| 40 | −74.51539 | 0.120 | | | | | |
| 41 | 99.59840 | 1.766 | 1.84850 | 43.79 | 0.5620 | 5.2 | J-LASFH22.HIKARI |
| 42 | 42.30226 | 4.905 | 1.84666 | 23.83 | 0.6160 | 18.9 | SF57HTULTRA.SCHOTT |
| 43 | 224.12745 | 0.333 | | | | | |
| 44 | 50.64574 | 8.458 | 1.59522 | 67.73 | 0.5443 | −6.0 | S-FPM2.OHARA |
| 45 | −40.92896 | 1.139 | 1.92119 | 23.96 | 0.6203 | 2.4 | FDS24.HOYA |
| 46 | 31.14555 | 3.129 | | | | | |
| 47 | 118.80653 | 8.069 | 1.49700 | 81.61 | 0.5389 | −6.2 | FCD1.HOYA |
| 48 | −24.50827 | 1.137 | 1.90525 | 35.04 | 0.5849 | 5.5 | S-LAH93.OHARA |
| 49 | −475.71420 | 2.923 | | | | | |
| 50 | 120.59631 | 6.942 | 1.53172 | 48.84 | 0.5631 | 1.9 | S-TIL6.OHARA |
| 51 | −47.29518 | 2.000 | | | | | |
| 52 | ∞ | 3.620 | 1.51633 | 64.14 | 0.5353 | 2.7 | S-BSL7.OHARA |
| 53 | ∞ | 39.664 | | | | | |

TABLE 29

Example 10

|  | Wide Angle End | Telephoto End |
|---|---|---|
| Zr | 1.0 | 2.3 |
| f | 19.674 | 44.982 |
| Bf | 39.664 | 39.664 |
| FNo. | 2.75 | 2.76 |
| 2ω(°) | 100.8 | 53.2 |
| DD[17] | 1.400 | 47.337 |
| DD[25] | 26.861 | 1.394 |
| DD[28] | 3.477 | 1.871 |
| DD[36] | 20.269 | 1.405 |

TABLE 30

Example 10

| Sn | 1 | 3 | 16 | 30 |
|---|---|---|---|---|
| KA | 1.0000000E+00 | 1.0000000E+00 | 1.0000000E+00 | 1.0000000E+00 |
| A4 | 8.6514649E−06 | −6.5538024E−06 | −2.9194923E−07 | −1.0959113E−07 |
| A6 | −9.6688630E−09 | 7.9862477E−10 | −1.4686115E−11 | −1.0394234E−09 |
| A8 | 9.9704174E−12 | 4.1710477E−12 | −2.0616999E−13 | 7.4552103E−12 |
| A10 | −5.3661148E−15 | −1.1896135E−14 | 2.1952163E−16 | −1.6966340E−14 |
| A12 | −3.4563592E−20 | 7.1454562E−18 | 2.8438149E−20 | −2.3184144E−17 |
| A14 | 1.3516908E−21 | 7.9297546E−21 | −1.7223005E−22 | 1.2779887E−19 |
| A16 | 1.6604575E−25 | −5.7275142E−24 | 7.4982634E−26 | 1.9189568E−22 |
| A18 | −6.8237143E−28 | −1.1936475E−26 | −4.1240805E−29 | −1.3800862E−24 |
| A20 | 2.2118208E−31 | 1.0176655E−29 | 4.3107296E−32 | 1.6108591E−27 |

Example 11

Figure 22:
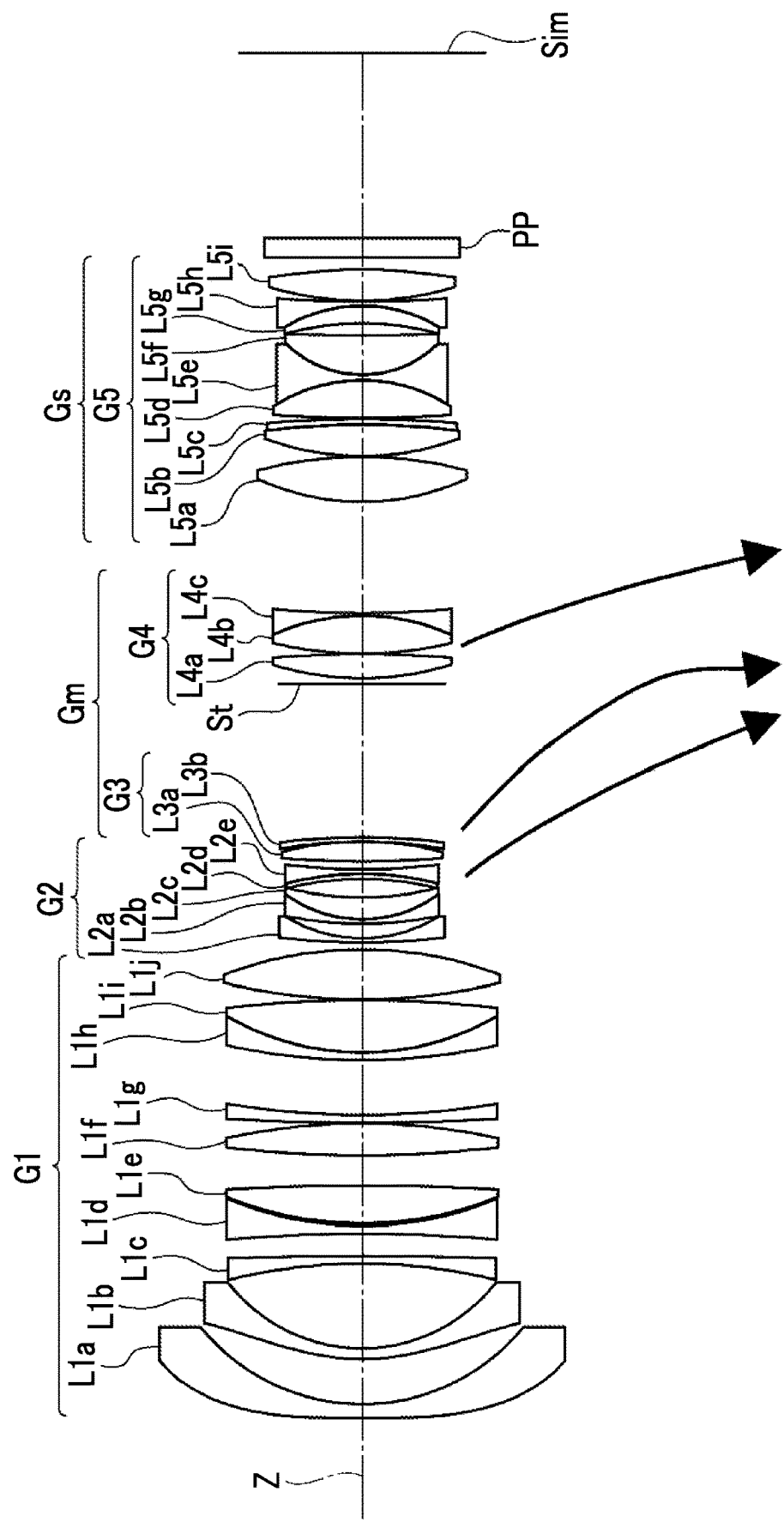
FIG. 22 is a cross-sectional view of a configuration of a zoom lens of Example 11 and a diagram showing movement loci thereof.

FIG. 22 is a cross-sectional view showing a configuration of the zoom lens of Example 11. The zoom lens shown in Example 11 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of two lenses L3a and L3b in order from the object side to the image side. The fourth lens group G4 consists of, in order from the object side to the image side, an aperture stop St and three lenses L4a to L4c. The fifth lens group G5 consists of nine lenses L5a to L5i in order from the object side to the image side.

Figure 23:
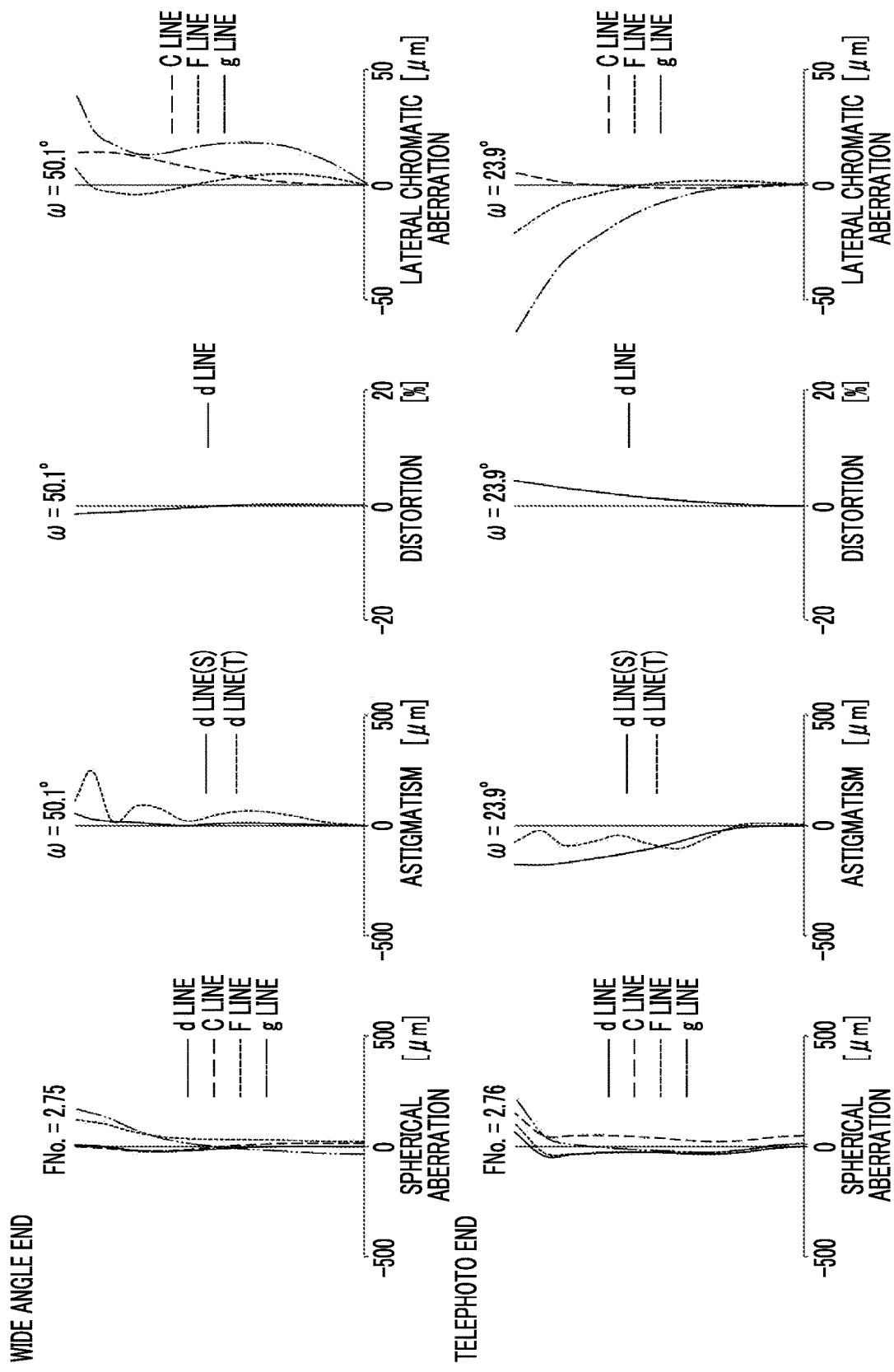
FIG. 23 is a diagram showing aberrations of the zoom lens of Example 11.

Tables 31A and 31B show the basic lens data of the zoom lens of Example 11, Table 32 shows the specifications and the variable surface distances, Table 33 shows the aspheric surface coefficients, and FIG. 23 shows a diagram of aberrations in a state where the object at infinity is in focus. In Tables 31A and 31B, the column of dN/dT and the column of the material name are omitted.

TABLE 31A

Example 11

| Sn | R | D | Nd | vd | θgF |
|---|---|---|---|---|---|
| *1 | −1840.06159 | 2.500 | 1.80610 | 33.27 | 0.5885 |
| 2 | 39.75599 | 8.283 | | | |
| *3 | 41.56169 | 2.000 | 1.90366 | 31.31 | 0.5948 |
| 4 | 32.37692 | 15.594 | | | |
| 5 | −106.89205 | 1.400 | 1.87702 | 32.47 | 0.5919 |
| 6 | −710.36492 | 4.104 | | | |
| 7 | −296.95098 | 1.400 | 1.43700 | 95.10 | 0.5336 |
| 8 | 66.89418 | 0.494 | | | |

TABLE 31A-continued

Example 11

| Sn | R | D | Nd | vd | θgF |
|---|---|---|---|---|---|
| 9 | 70.36366 | 6.873 | 1.84666 | 23.78 | 0.6205 |
| 10 | −457.54989 | 5.619 | | | |
| 11 | 223.92526 | 5.896 | 1.43700 | 95.10 | 0.5336 |
| *12 | −111.66500 | 0.120 | | | |
| 13 | 449.03998 | 1.400 | 1.59270 | 35.31 | 0.5934 |
| 14 | 155.22256 | 10.158 | | | |
| 15 | 121.85978 | 1.400 | 1.84666 | 23.78 | 0.6205 |
| 16 | 51.73980 | 9.623 | 1.43700 | 95.10 | 0.5336 |
| 17 | −227.47097 | 0.120 | | | |
| 18 | 113.66856 | 9.122 | 1.69560 | 59.05 | 0.5435 |
| 19 | −74.79804 | DD[19] | | | |
| 20 | 131.39684 | 0.800 | 1.89181 | 38.82 | 0.5734 |
| 21 | 27.85170 | 2.677 | | | |
| 22 | 73.28693 | 0.810 | 1.43700 | 95.10 | 0.5336 |
| 23 | 24.48762 | 4.029 | 1.99985 | 24.34 | 0.6214 |
| 24 | 56.74226 | 3.385 | | | |
| 25 | −59.41374 | 1.000 | 1.87899 | 21.05 | 0.6361 |
| 26 | −56.11556 | 0.810 | 1.87898 | 40.10 | 0.5703 |
| 27 | 128.55618 | DD[27] | | | |
| 28 | 184.54842 | 3.671 | 1.45751 | 64.11 | 0.5302 |
| 29 | −59.13985 | 0.000 | | | |
| 30 | −86.08590 | 0.800 | 1.85000 | 38.66 | 0.5750 |
| 31 | −124.03719 | DD[31] | | | |

TABLE 31B

Example 11

| Sn | R | D | Nd | vd | θgF |
|---|---|---|---|---|---|
| 32(St) | ∞ | 1.000 | | | |
| 33 | 56.87110 | 4.460 | 1.80518 | 25.42 | 0.6162 |
| 34 | −210.35927 | 0.120 | | | |
| 35 | 72.50428 | 6.953 | 1.48650 | 71.11 | 0.5303 |

TABLE 31B-continued

Example 11

| Sn | R | D | Nd | vd | θgF |
|---|---|---|---|---|---|
| 36 | -42.16447 | 0.500 | 1.89268 | 35.50 | 0.5827 |
| 37 | 180.05157 | DD[37] | | | |
| 38 | 48.02449 | 8.290 | 1.58185 | 67.41 | 0.5416 |
| 39 | -76.91013 | 0.121 | | | |
| 40 | 53.29468 | 5.808 | 1.64712 | 34.34 | 0.5929 |
| 41 | -142.68301 | 1.010 | 1.64711 | 53.34 | 0.5500 |
| 42 | -219.11468 | 0.169 | | | |
| 43 | 231.85653 | 6.992 | 1.69560 | 59.05 | 0.5435 |
| 44 | -31.11369 | 1.000 | 1.99514 | 26.50 | 0.6092 |
| 45 | 20.51167 | 7.246 | 1.53469 | 73.12 | 0.5380 |
| 46 | 366.09557 | 2.266 | | | |
| 47 | -54.81464 | 3.245 | 1.43352 | 90.23 | 0.5306 |
| 48 | -28.44124 | 0.800 | 1.90372 | 33.14 | 0.5892 |
| 49 | 253.76796 | 0.129 | | | |
| 50 | 61.52665 | 5.781 | 1.89850 | 20.08 | 0.6414 |
| *51 | -78.44820 | 2.000 | | | |
| 52 | | 3.620 | 1.51680 | 64.20 | 0.5343 |
| 53 | | 34.198 | | | |

TABLE 32

Example 11

| | Wide Angle End | Telephoto End |
|---|---|---|
| Zr | 1.0 | 2.5 |
| f | 19.660 | 49.927 |
| Bf | 34.199 | 34.199 |
| FNo. | 2.75 | 2.76 |
| 2ω(°) | 100.2 | 47.8 |
| DD [19] | 1.282 | 46.923 |
| DD [27] | 1.444 | 1.447 |
| DD [31] | 28.045 | 1.408 |
| DD [37] | 20.434 | 1.427 |

TABLE 33

Example 11

| Sn | 1 | 3 | 12 | 51 |
|---|---|---|---|---|
| KA | 1.0000000E+00 | 1.0000000E+00 | 1.0000000E+00 | 1.0000000E+00 |
| A4 | 1.1858250E-05 | -9.4877012E-06 | 4.2276134E-07 | 7.1417138E-06 |
| A6 | -1.9623540E-08 | 2.9707467E-09 | 1.7700871E-09 | -4.8799576E-08 |
| A8 | 3.3395437E-11 | 2.3417938E-11 | -1.2195565E-11 | 9.3252320E-10 |
| A10 | -4.3800654E-14 | -1.2079085E-13 | 5.9997495E-14 | -1.0782048E-11 |
| A12 | 4.2928998E-17 | 2.8294399E-16 | -1.8876274E-16 | 7.7640748E-14 |
| A14 | -3.0382040E-20 | -3.8422055E-19 | 3.6931743E-19 | -3.4993264E-16 |
| A16 | 1.4914532E-23 | 3.0558519E-22 | -4.3728355E-22 | 9.5656217E-19 |
| A18 | -4.5751759E-27 | -1.3219409E-25 | 2.8719880E-25 | -1.4470756E-21 |
| A20 | 6.6692341E-31 | 2.4152635E-29 | -8.0395850E-29 | 9.2771322E-25 |

Example 12

Figure 24:
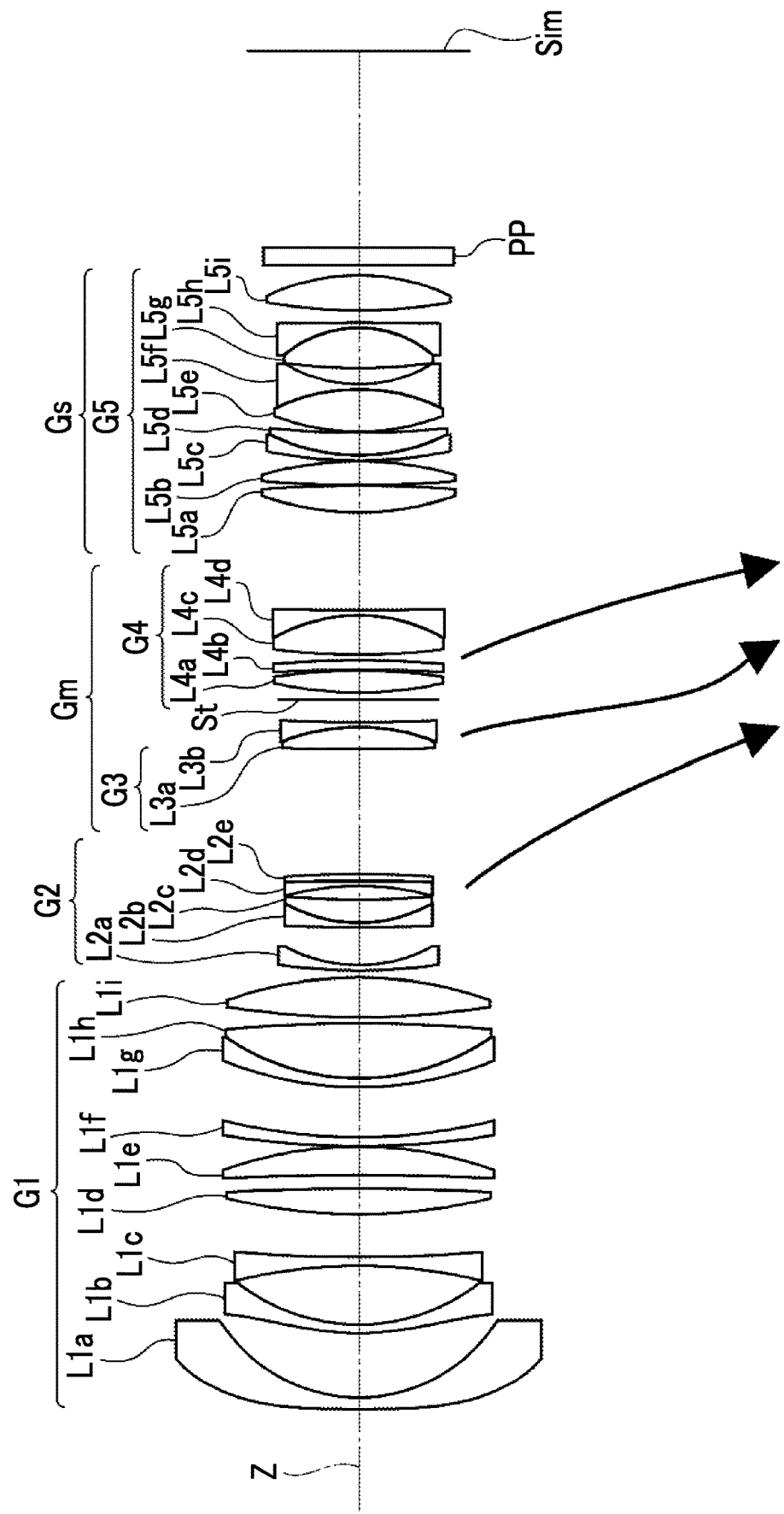
FIG. 24 is a cross-sectional view of a configuration of a zoom lens of Example 12 and a diagram showing movement loci thereof.

FIG. 24 is a cross-sectional view showing a configuration of the zoom lens of Example 12. The zoom lens shown in Example 12 consists of, in order from the object side to the image side, a first lens group G1 having a positive refractive power, a second lens group G2 having a negative refractive power, a third lens group G3 having a negative refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of nine lenses L1a to L1i in order from the object side to the image side. The second lens group G2 consists of five lenses L2a to L2e in order from the object side to the image side. The third lens group G3 consists of two lenses L3a and L3b in order from the object side to the image side. The fourth lens group G4 consists of, in order from the object side to the image side, an aperture stop St and four lenses L4a to L4d. The fifth lens group G5 consists of nine lenses L5a to L5i in order from the object side to the image side.

Figure 25:
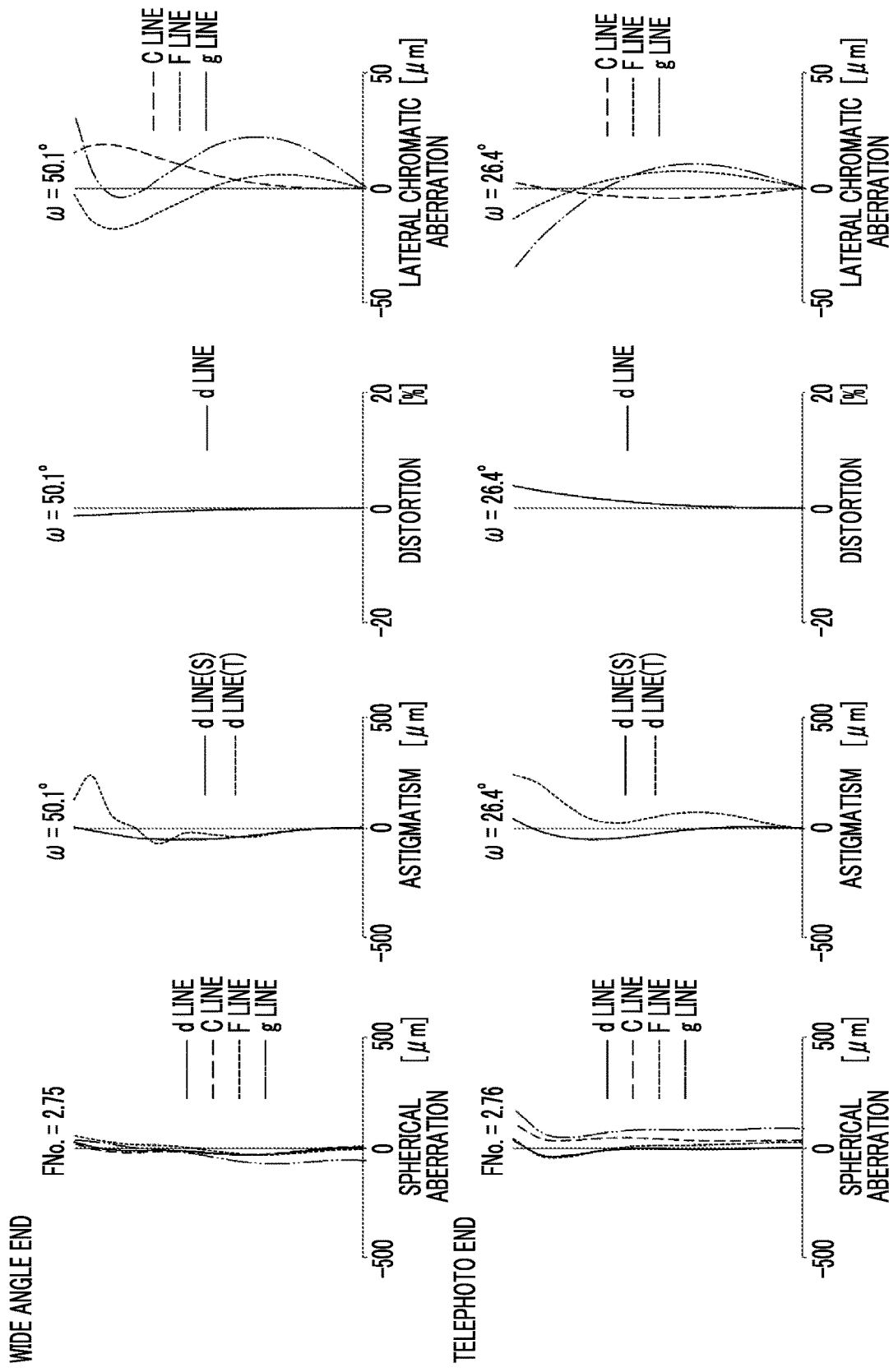
FIG. 25 is a diagram showing aberrations of the zoom lens of Example 12.

Tables 34A and 34B show the basic lens data of the zoom lens of Example 12, Table 35 shows the specifications and the variable surface distances, Table 36 shows the aspheric surface coefficients, and FIG. 25 shows a diagram of aberrations in a state where the object at infinity is in focus. In Tables 34A and 34B, the column of dN/dT and the column of the material name are omitted.

TABLE 34A

Example 12

| Sn | R | D | Nd | vd | θgF |
|---|---|---|---|---|---|
| *1 | 892.49525 | 2.399 | 1.80610 | 33.27 | 0.5885 |
| 2 | 34.82975 | 13.151 | | | |
| *3 | 56.26982 | 1.800 | 1.90366 | 31.31 | 0.5948 |
| 4 | 41.90958 | 12.000 | | | |
| 5 | -108.93770 | 1.800 | 1.81973 | 46.03 | 0.5585 |
| 6 | 317.92224 | 8.720 | | | |
| 7 | 119.33157 | 5.196 | 1.78880 | 28.43 | 0.6009 |
| 8 | -544.36982 | 2.813 | | | |
| 9 | -621.74991 | 5.803 | 1.43700 | 95.10 | 0.5336 |

TABLE 34A-continued

Example 12

| Sn | R | D | Nd | vd | θgF |
|---|---|---|---|---|---|
| 10 | -86.16729 | 0.131 | | | |
| 11 | 183.73060 | 1.801 | 1.65455 | 39.33 | 0.5786 |
| 12 | 118.18071 | 10.319 | | | |
| 13 | 77.18470 | 1.801 | 1.85243 | 23.78 | 0.6207 |
| 14 | 50.15800 | 11.233 | 1.43700 | 95.10 | 0.5336 |
| 15 | -315.93924 | 1.244 | | | |
| *16 | 168.92201 | 8.089 | 1.69680 | 55.53 | 0.5434 |
| 17 | -85.24746 | DD[17] | | | |
| 18 | 123.39767 | 1.101 | 1.91082 | 35.25 | 0.5822 |

TABLE 34A-continued

Example 12

| Sn | R | D | Nd | vd | θgF |
|---|---|---|---|---|---|
| 19 | 32.73033 | 7.716 | | | |
| 20 | 424.39507 | 0.961 | 1.49700 | 81.61 | 0.5389 |
| 21 | 31.59016 | 4.801 | 1.85134 | 23.31 | 0.6240 |
| 22 | 204.42787 | 2.775 | | | |
| 23 | −57.58046 | 1.001 | 1.84999 | 26.84 | 0.6105 |
| 24 | −600.69551 | 1.411 | 1.84999 | 43.00 | 0.5640 |
| 25 | −213.24817 | DD[25] | | | |
| 26 | 820.72889 | 4.357 | 1.58471 | 39.53 | 0.5802 |
| 27 | −45.41822 | 1.051 | 1.75341 | 52.32 | 0.5464 |
| 28 | 366.89329 | DD[28] | | | |

TABLE 34B

Example 12

| Sn | R | D | Nd | vd | θgF |
|---|---|---|---|---|---|
| 29(St) | ∞ | 1.500 | | | |
| *30 | 80.39416 | 4.523 | 1.80100 | 34.97 | 0.5864 |
| 31 | −121.02490 | 0.121 | | | |
| 32 | −425.40151 | 2.000 | 1.72465 | 28.77 | 0.6071 |
| 33 | −204.94084 | 1.160 | | | |
| 34 | 147.52786 | 8.010 | 1.53775 | 74.70 | 0.5394 |
| 35 | −36.61292 | 1.101 | 1.81796 | 44.43 | 0.5620 |
| 36 | 792.64131 | DD[36] | | | |
| 37 | 62.69211 | 5.441 | 1.49700 | 81.61 | 0.5389 |
| 38 | −265.89994 | 0.120 | | | |
| 39 | 270.35940 | 4.852 | 1.53001 | 49.37 | 0.5621 |
| 40 | −73.76871 | 0.121 | | | |
| 41 | 98.11020 | 1.101 | 1.84850 | 43.79 | 0.5620 |
| 42 | 42.61664 | 4.659 | 1.84666 | 23.83 | 0.6160 |
| 43 | 201.50630 | 0.201 | | | |
| 44 | 50.23818 | 8.667 | 1.59282 | 68.62 | 0.5441 |
| 45 | −40.81754 | 1.050 | 1.90000 | 23.78 | 0.6219 |
| 46 | 30.27224 | 3.286 | | | |
| 47 | 115.25643 | 8.265 | 1.49700 | 81.61 | 0.5389 |
| 48 | −24.34721 | 1.050 | 1.89000 | 37.23 | 0.5779 |
| 49 | −866.21591 | 2.524 | | | |
| 50 | 112.17456 | 7.192 | 1.51742 | 52.43 | 0.5565 |
| 51 | −45.92041 | 2.000 | | | |
| 52 | ∞ | 3.620 | 1.51680 | 64.20 | 0.5343 |
| 53 | ∞ | 40.311 | | | |

TABLE 35

Example 12

| | Wide Angle End | Telephoto End |
|---|---|---|
| Zr | 1.0 | 2.3 |
| f | 19.674 | 44.983 |
| Bf | 40.312 | 40.312 |
| FNo. | 2.75 | 2.76 |
| 2ω(°) | 100.2 | 52.8 |
| DD[17] | 1.400 | 46.751 |
| DD[25] | 25.465 | 1.396 |
| DD[28] | 4.556 | 1.889 |
| DD[36] | 20.018 | 1.404 |

TABLE 36

Example 12

| Sn | 1 | 3 | 16 | 30 |
|---|---|---|---|---|
| KA | 1.0000000E+00 | 1.0000000E+00 | 1.0000000E+00 | 1.0000000E+00 |
| A4 | 8.4093492E−06 | −6.4177718E−06 | −2.2422091E−07 | −1.5944892E−07 |
| A6 | −9.2344811E−09 | 7.9462530E−10 | −2.4861004E−12 | −6.7275573E−10 |
| A8 | 9.4724546E−12 | 3.9132089E−12 | −2.1241977E−13 | 4.1919468E−12 |
| A10 | −5.0886254E−15 | −1.1189623E−14 | 2.4268941E−16 | −4.3526490E−15 |
| A12 | −1.2372005E−20 | 6.9920423E−18 | 5.1205982E−20 | −2.4604441E−17 |
| A14 | 1.2674042E−21 | 7.4433425E−21 | −2.4175303E−22 | 3.9723046E−20 |
| A16 | 1.5426198E−25 | −5.3578418E−24 | 1.1861361E−26 | 2.1106331E−22 |
| A18 | −6.4327240E−28 | −1.0913053E−26 | 1.6409289E−28 | −7.4095211E−25 |
| A20 | 2.0953200E−31 | 9.1947649E−30 | −6.7350733E−32 | 7.1030921E−28 |

Example 13

Figure 26:
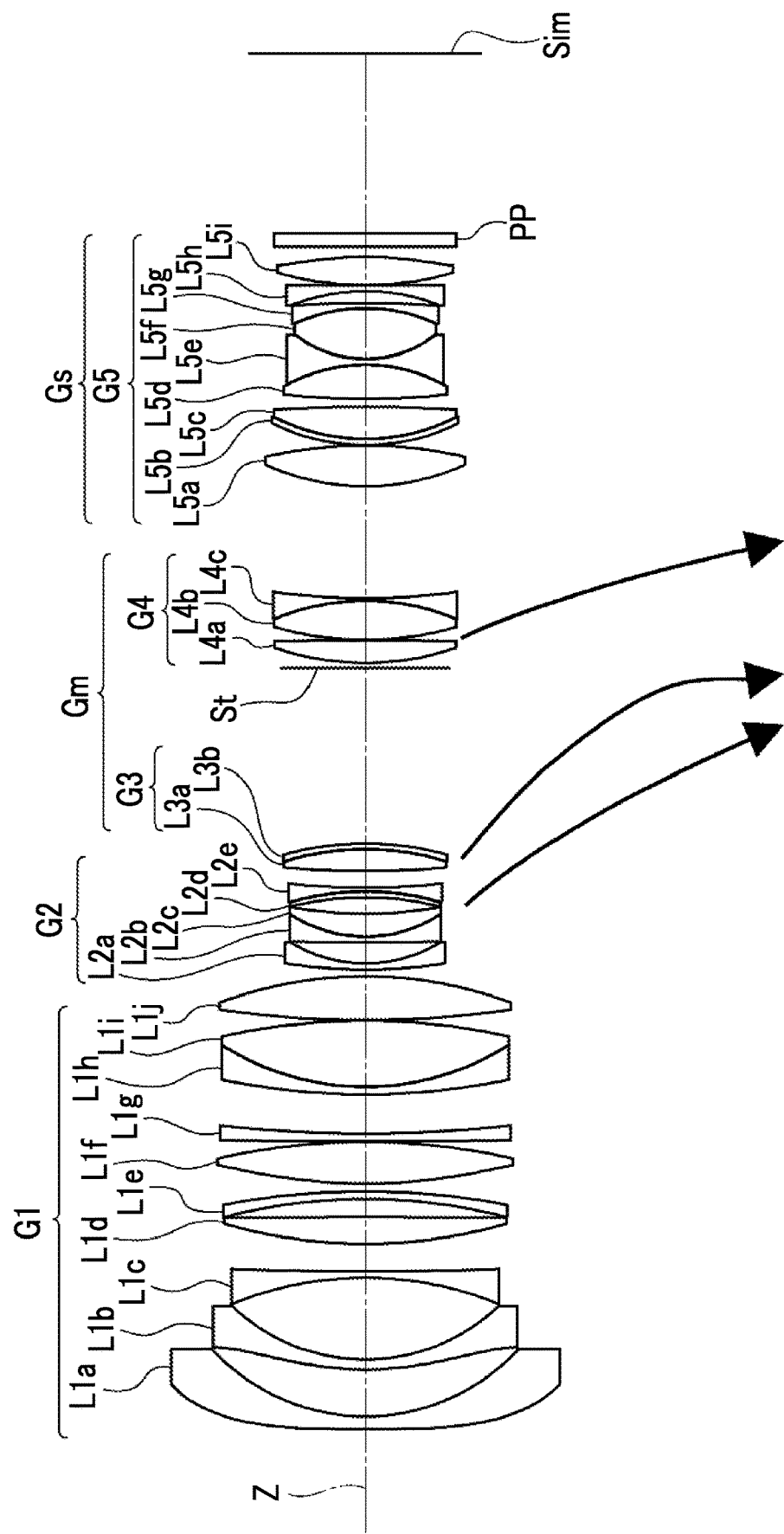
FIG. 26 is a cross-sectional view of a configuration of a zoom lens of Example 13 and a diagram showing movement loci thereof.

FIG. 26 is a cross-sectional view showing a configuration of the zoom lens of Example 13. The zoom lens shown in Example 13 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1a to L1j in order from the object side to the image side. The second lens group G2 consists of five lenses L2a to L2e in order from the object side to the image side. The third lens group G3 consists of two lenses L3a and L3b in order from the object side to the image side. The fourth lens group G4 consists of, in order from the object side to the image side, an aperture stop St and three lenses L4a to L4c. The fifth lens group G5 consists of nine lenses L5a to L5i in order from the object side to the image side.

Figure 27:
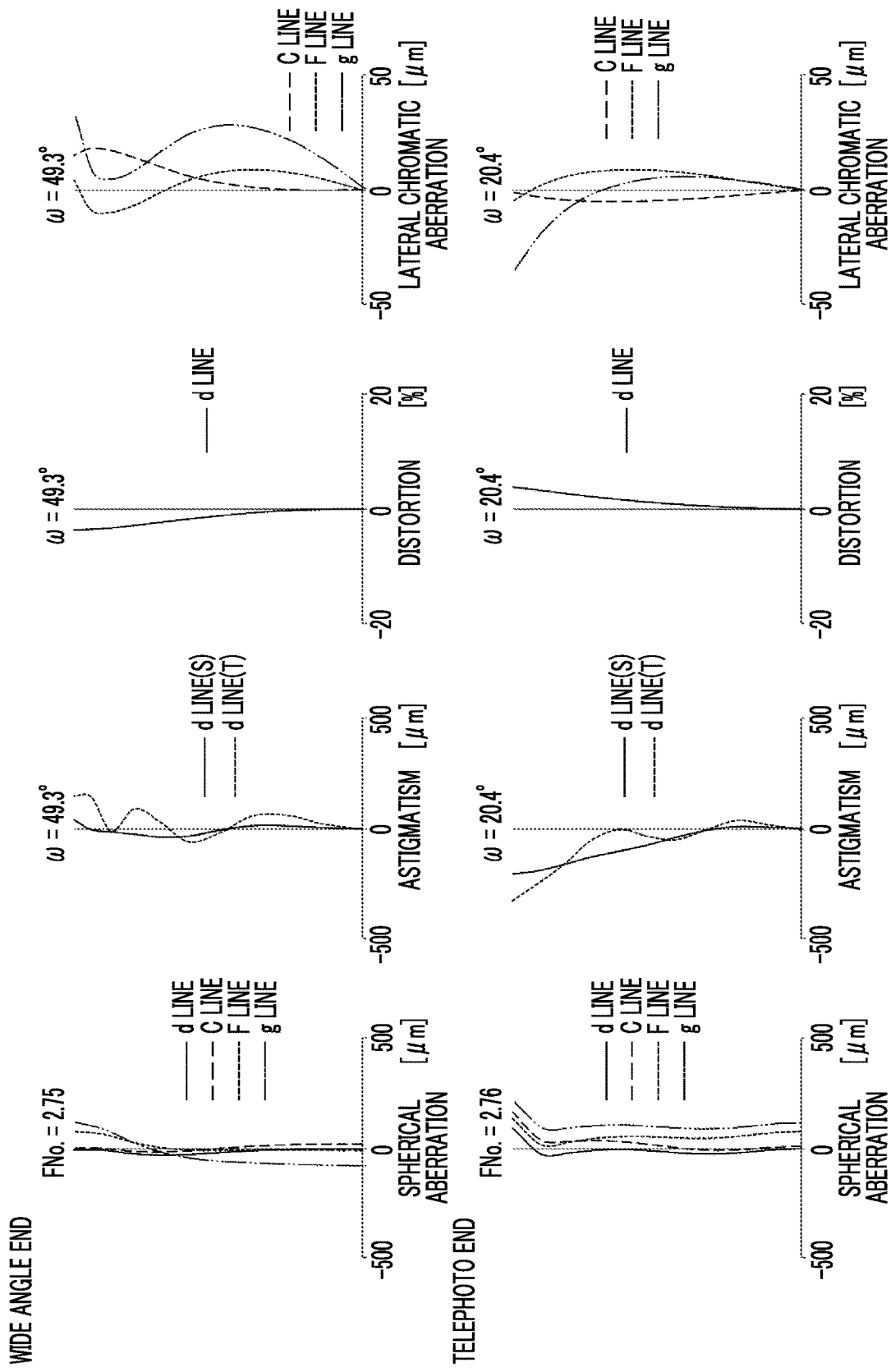
FIG. 27 is a diagram showing aberrations of the zoom lens of Example 13.

Tables 37A and 37B show the basic lens data of the zoom lens of Example 13, Table 38 shows the specifications and the variable surface distances, Table 39 shows the aspheric surface coefficients, and FIG. 27 shows a diagram of aberrations in a state where the object at infinity is in focus. In Tables 37A and 37B, the column of dN/dT and the column of the material name are omitted.

TABLE 37A

Example 13

| Sn | R | D | Nd | vd | θgF |
|---|---|---|---|---|---|
| *1 | 3361.49502 | 2.500 | 1.80100 | 34.97 | 0.5864 |
| 2 | 42.59809 | 9.135 | | | |
| *3 | 61.25402 | 2.000 | 1.90366 | 31.31 | 0.5948 |
| 4 | 39.35106 | 16.006 | | | |
| 5 | −71.83047 | 1.250 | 1.43700 | 95.10 | 0.5336 |
| 6 | 733.97690 | 5.402 | | | |
| 7 | 105.59128 | 5.116 | 1.84666 | 23.78 | 0.6192 |
| 8 | −7423.25581 | 3.581 | | | |
| 9 | −115.07700 | 1.500 | 1.59270 | 35.31 | 0.5934 |
| 10 | −154.12994 | 1.491 | | | |
| *11 | 100.31212 | 8.227 | 1.43700 | 95.10 | 0.5336 |
| 12 | −135.30840 | 0.120 | | | |
| 13 | 2155.68153 | 1.500 | 1.58041 | 39.96 | 0.5794 |
| 14 | 273.06875 | 7.672 | | | |
| 15 | 144.54300 | 1.500 | 1.78880 | 28.43 | 0.6009 |
| 16 | 54.70175 | 12.944 | 1.43700 | 95.10 | 0.5336 |
| 17 | −135.01732 | 0.120 | | | |
| 18 | 209.01469 | 8.486 | 1.69560 | 59.05 | 0.5435 |
| 19 | −86.46085 | DD[19] | | | |
| 20 | 105.77699 | 1.190 | 1.90882 | 37.12 | 0.5777 |
| 21 | 29.02955 | 4.131 | | | |
| 22 | 931.19002 | 1.150 | 1.43700 | 95.10 | 0.5336 |
| 23 | 27.84983 | 4.509 | 2.00069 | 25.46 | 0.6136 |
| 24 | 90.73626 | 3.225 | | | |
| 25 | −58.85634 | 1.122 | 1.89999 | 20.00 | 0.6419 |
| 26 | −53.86251 | 0.700 | 1.90000 | 38.00 | 0.5755 |
| 27 | 140.61327 | DD[27] | | | |
| 28 | 192.70206 | 4.259 | 1.43001 | 90.77 | 0.5302 |
| 29 | −56.67798 | 1.140 | 1.90000 | 20.00 | 0.6419 |
| 30 | −61.22245 | DD[30] | | | |

TABLE 37B

Example 13

| Sn | R | D | Nd | vd | θgF |
|---|---|---|---|---|---|
| 31(St) | ∞ | 1.001 | | | |
| 32 | 56.94781 | 4.434 | 1.82156 | 23.92 | 0.6197 |
| 33 | −742.21115 | 0.120 | | | |
| 34 | 69.43570 | 7.600 | 1.50001 | 55.00 | 0.5525 |
| 35 | −48.07892 | 0.500 | 1.89999 | 36.11 | 0.5808 |
| 36 | 136.79752 | DD[36] | | | |
| 37 | 48.91757 | 7.985 | 1.57228 | 68.84 | 0.5410 |
| 38 | −91.74811 | 0.120 | | | |
| 39 | 42.96988 | 1.200 | 1.48399 | 58.00 | 0.5472 |
| 40 | 40.86406 | 6.260 | 1.52589 | 50.15 | 0.5607 |
| 41 | −326.40378 | 1.604 | | | |
| 42 | 157.05961 | 6.654 | 1.72974 | 55.01 | 0.5441 |
| 43 | −33.27142 | 1.080 | 2.00069 | 25.46 | 0.6136 |
| 44 | 22.66202 | 0.120 | | | |
| 45 | 22.94000 | 9.873 | 1.43700 | 95.10 | 0.5336 |
| 46 | −34.76242 | 1.000 | 1.90366 | 31.31 | 0.5948 |
| 47 | −227.46944 | 2.335 | | | |
| 48 | −41.60026 | 1.130 | 1.87650 | 40.35 | 0.5697 |
| 49 | 14285.02022 | 0.120 | | | |
| 50 | 65.84945 | 5.398 | 1.90000 | 20.00 | 0.6419 |
| *51 | −65.21462 | 2.000 | | | |
| 52 | ∞ | 2.620 | 1.51680 | 64.20 | 0.5343 |
| 53 | ∞ | 35.304 | | | |

TABLE 38

Example 13

| | Wide Angle End | Telephoto End |
|---|---|---|
| Zr | 1.0 | 2.9 |
| f | 20.696 | 59.907 |
| Bf | 35.302 | 35.302 |
| FNo. | 2.75 | 2.76 |
| 2ω(°) | 98.6 | 40.8 |
| DD[19] | 1.343 | 56.301 |
| DD[27] | 3.262 | 1.463 |
| DD[30] | 34.155 | 1.368 |
| DD[36] | 21.851 | 1.479 |

TABLE 39

Example 13

| Sn | 1 | 3 | 11 | 51 |
|---|---|---|---|---|
| KA | 1.0000000E+00 | 1.0000000E+00 | 1.0000000E+00 | 1.0000000E+00 |
| A4 | 6.2385404E−06 | −4.2498997E−06 | −1.2916591E−06 | 8.3797972E−06 |
| A6 | −8.4729553E−09 | 2.7953596E−09 | −2.7332774E−10 | −3.9008076E−08 |
| A8 | 1.7157211E−11 | −4.8702741E−12 | 2.9097833E−12 | 7.2609102E−10 |
| A10 | −2.9563262E−14 | −1.9879316E−15 | −9.3668810E−15 | −7.8313114E−12 |
| A12 | 3.8845521E−17 | 8.6960820E−18 | 2.0337784E−17 | 5.2580025E−14 |
| A14 | −3.5714076E−20 | 3.2438780E−21 | −2.8718443E−20 | −2.2274484E−16 |
| A16 | 2.1393224E−23 | −2.2817654E−23 | 2.5100612E−23 | 5.7734840E−19 |
| A18 | −7.4278742E−27 | 1.9989888E−26 | −1.2338202E−26 | −8.3450642E−22 |
| A20 | 1.1355785E−30 | −5.2422328E−30 | 2.6097638E−30 | 5.1440585E−25 |

Example 14

Figure 28:
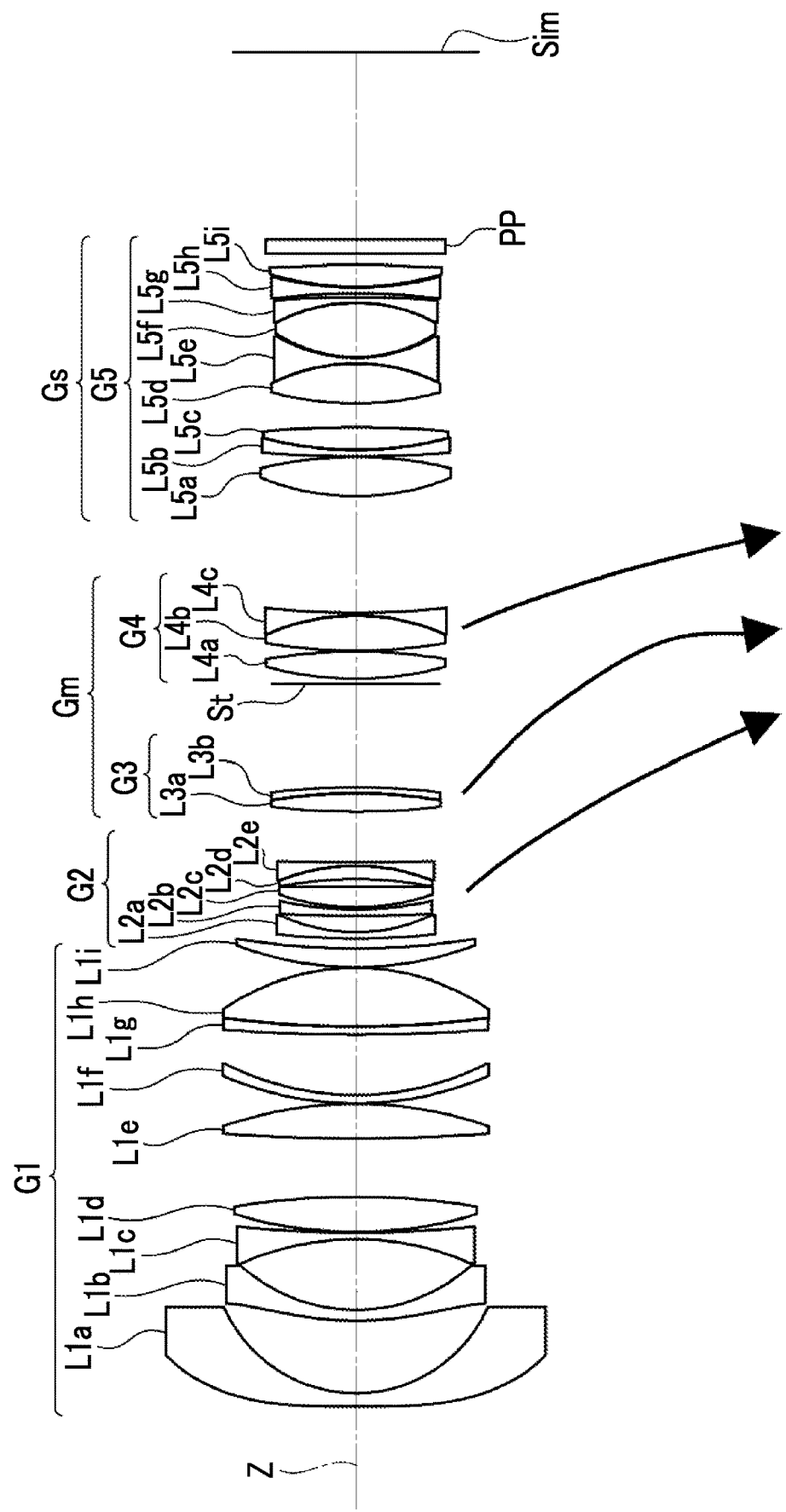
FIG. 28 is a cross-sectional view of a configuration of a zoom lens of Example 14 and a diagram showing movement loci thereof.

FIG. 28 is a cross-sectional view showing a configuration of the zoom lens of Example 14. The zoom lens shown in Example 14 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of nine lenses L1a to L1i in order from the object side to the image side. The second lens group G2 consists of five lenses L2a to L2e in order from the object side to the image side. The third lens group G3 consists of two lenses L3a and L3b in order from the object side to the image side. The fourth lens group G4 consists of, in order from the object side to the image side, an aperture stop St and three lenses L4a to L4c. The fifth lens group G5 consists of nine lenses L5a to L5i in order from the object side to the image side.

Figure 29:
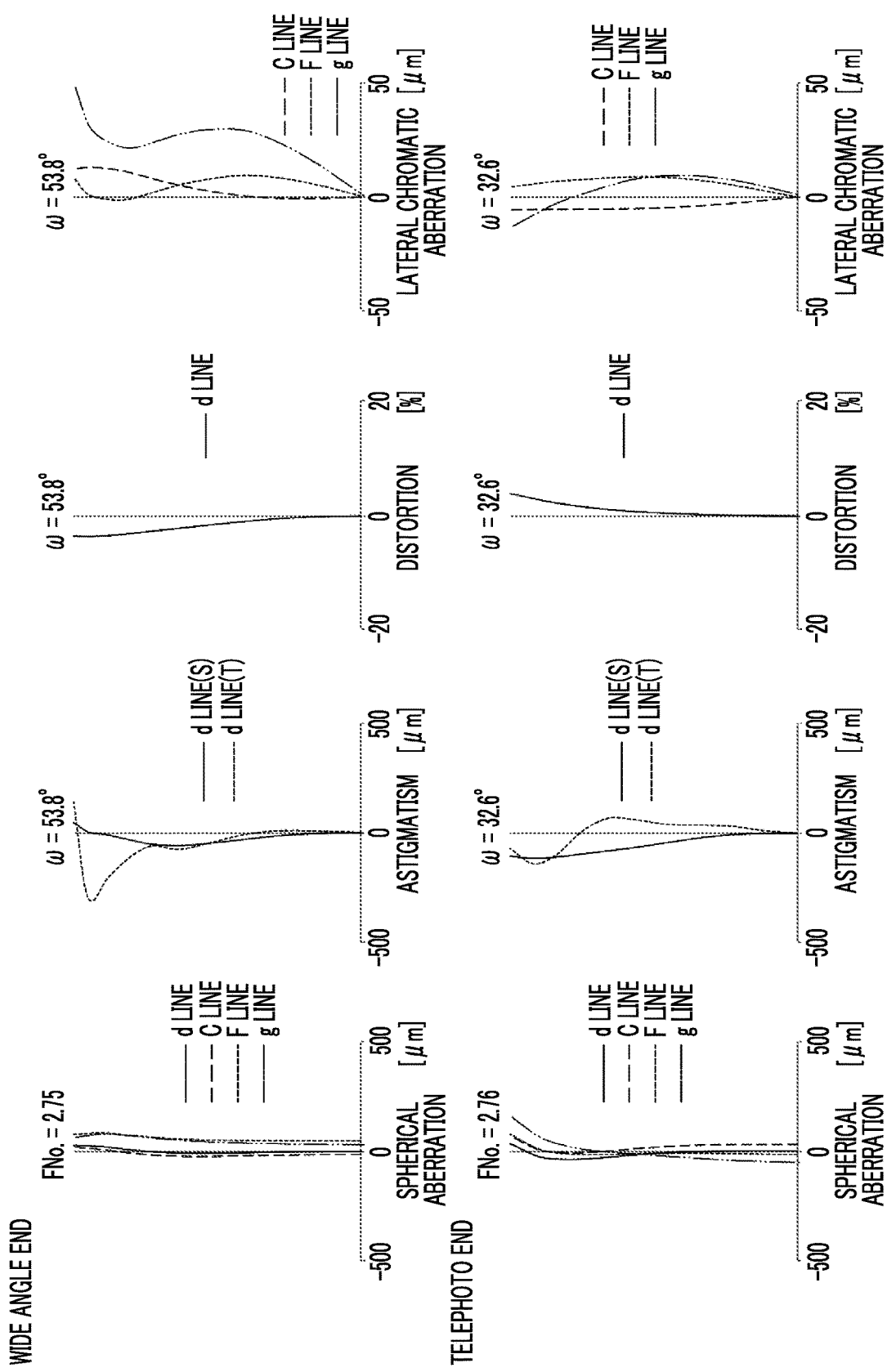
FIG. 29 is a diagram showing aberrations of the zoom lens of Example 14.

Tables 40A and 40B show the basic lens data of the zoom lens of Example 14, Table 41 shows the specifications and the variable surface distances, Table 42 shows the aspheric surface coefficients, and FIG. 29 shows a diagram of aberrations in a state where the object at infinity is in focus. In Tables 40A and 40B, the column of dN/dT and the column of the material name are omitted.

TABLE 40A

Example 14

| Sn | R | D | Nd | vd | θgF |
|---|---|---|---|---|---|
| *1 | 967.71012 | 2.500 | 1.77250 | 49.60 | 0.5521 |
| 2 | 27.63765 | 13.422 | | | |
| *3 | 58.04526 | 2.000 | 1.90999 | 37.00 | 0.5780 |
| 4 | 32.97922 | 13.095 | | | |
| 5 | −54.81547 | 1.250 | 1.43700 | 95.10 | 0.5336 |
| 6 | 222.84280 | 0.120 | | | |
| 7 | 83.31824 | 6.422 | 1.51330 | 52.55 | 0.5564 |
| 8 | −146.13047 | 10.846 | | | |
| 9 | 341.00398 | 6.400 | 1.43700 | 95.10 | 0.5336 |
| 10 | −78.49028 | 0.120 | | | |
| 11 | 65.23033 | 1.500 | 1.85664 | 22.23 | 0.6305 |
| 12 | 55.72350 | 11.225 | | | |
| 13 | 368.60738 | 1.500 | 1.89999 | 20.00 | 0.6419 |
| 14 | 200.16208 | 10.753 | 1.43700 | 95.10 | 0.5336 |
| 15 | −45.77424 | 0.120 | | | |
| 16 | 64.66883 | 3.490 | 1.69560 | 59.05 | 0.5435 |
| 17 | 145.75006 | DD[17] | | | |
| 18 | 140.59941 | 1.190 | 1.85888 | 42.11 | 0.5659 |
| 19 | 33.81246 | 3.083 | | | |
| 20 | 348.08808 | 1.140 | 1.80267 | 47.73 | 0.5552 |
| 21 | 67.08336 | 0.388 | | | |
| 22 | 44.62420 | 3.712 | 1.86017 | 21.99 | 0.6316 |
| 23 | ∞ | 1.503 | | | |
| 24 | −75.14754 | 2.450 | 1.57784 | 40.40 | 0.5786 |
| 25 | −40.26691 | 0.700 | 1.89894 | 38.11 | 0.5752 |
| 26 | 647.99363 | DD[26] | | | |
| 27 | 134.97220 | 3.418 | 1.56616 | 44.44 | 0.5707 |
| 28 | −101.26755 | 1.140 | 1.89359 | 38.64 | 0.5739 |
| 29 | −129.95815 | DD[29] | | | |

TABLE 40B

Example 14

| Sn | R | D | Nd | vd | θgF |
|---|---|---|---|---|---|
| 30(St) | ∞ | 1.000 | | | |
| 31 | 65.96183 | 5.056 | 1.63604 | 34.57 | 0.5925 |
| 32 | −99.73413 | 0.120 | | | |
| 33 | 102.08347 | 6.511 | 1.50001 | 55.00 | 0.5525 |
| 34 | −42.40263 | 0.500 | 1.89958 | 38.04 | 0.5754 |
| 35 | 164.30173 | DD[35] | | | |
| 36 | 48.66321 | 7.263 | 1.52512 | 70.02 | 0.5352 |
| 37 | −79.42990 | 0.149 | | | |
| 38 | 241.00125 | 1.200 | 1.89546 | 34.88 | 0.5844 |
| 39 | 71.86821 | 4.167 | 1.73274 | 29.06 | 0.6060 |
| 40 | −209.91187 | 4.422 | | | |
| 41 | 60.94801 | 7.428 | 1.56646 | 69.78 | 0.5406 |
| 42 | −36.36249 | 1.080 | 1.89938 | 29.33 | 0.6012 |
| 43 | 30.07274 | 0.120 | | | |
| 44 | 28.21978 | 10.065 | 1.43700 | 95.10 | 0.5336 |
| 45 | −32.25504 | 1.010 | 1.60448 | 37.55 | 0.5848 |
| 46 | −192.40114 | 0.710 | | | |
| 47 | −128.13814 | 1.130 | 1.89999 | 28.47 | 0.6040 |
| 48 | 66.42508 | 0.120 | | | |
| 49 | 58.69365 | 4.042 | 1.83701 | 23.15 | 0.6249 |
| *50 | −147.24382 | 2.000 | | | |
| 51 | ∞ | 2.620 | 1.51680 | 64.20 | 0.5343 |
| 52 | ∞ | 34.738 | | | |

TABLE 41

Example 14

| | Wide Angle End | Telephoto End |
|---|---|---|
| Zr | 1.0 | 2.0 |
| f | 17.582 | 34.934 |
| Bf | 34.740 | 34.740 |
| FNo. | 2.75 | 2.76 |
| 2ω(°) | 107.6 | 65.2 |
| DD[19] | 1.815 | 47.044 |
| DD[27] | 9.324 | 1.507 |
| DD[30] | 18.900 | 1.517 |
| DD[35] | 21.502 | 1.473 |

TABLE 42

Example 14

| Sn | 1 | 3 | 50 |
|---|---|---|---|
| KA | 1.0000000E+00 | 1.0000000E+00 | 1.0000000E+00 |
| A4 | 1.0590175E−05 | −6.2358076E−06 | 5.1373648E−06 |
| A6 | −1.5089410E−08 | 1.5354729E−09 | −1.1576681E−08 |
| A8 | 2.6044458E−11 | −6.2482914E−12 | 2.8992302E−10 |
| A10 | −3.8219296E−14 | 8.8592098E−14 | −3.2771306E−12 |
| A12 | 4.3396502E−17 | −5.5504755E−16 | 2.2257508E−14 |
| A14 | −3.4059263E−20 | 1.7237683E−18 | −9.1628534E−17 |
| A16 | 1.6758233E−23 | −2.8667719E−21 | 2.2274197E−19 |
| A18 | −4.4674630E−27 | 2.4059395E−24 | −2.8963443E−22 |
| A20 | 4.8066451E−31 | −7.8909124E−28 | 1.5037554E−25 |

Example 15

Figure 30:
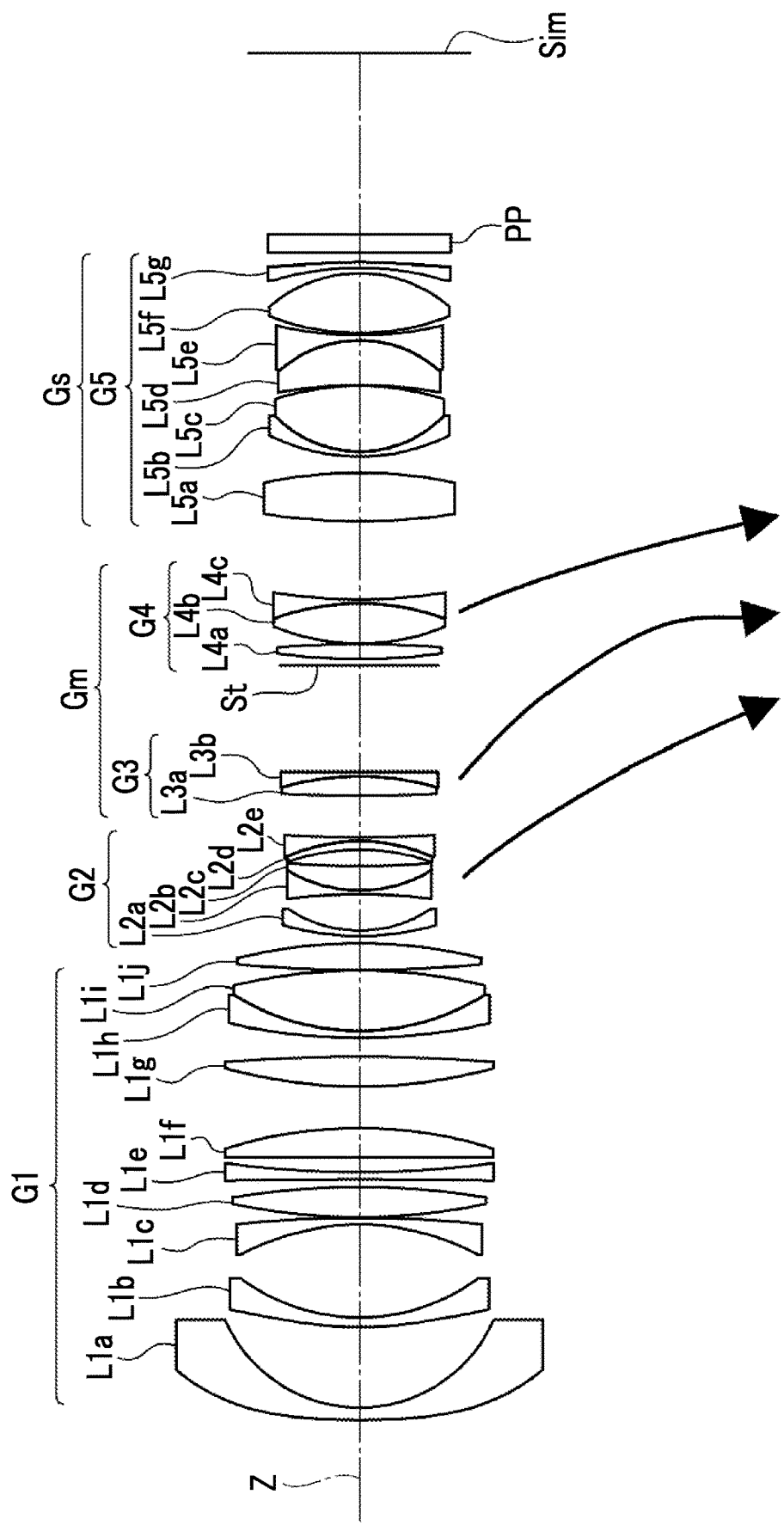
FIG. 30 is a cross-sectional view of a configuration of a zoom lens of Example 15 and a diagram showing movement loci thereof.

FIG. 30 is a cross-sectional view showing a configuration of the zoom lens of Example 15. The zoom lens shown in Example 15 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. The intermediate lens group Gm consists of the third lens group G3 and the fourth lens group G4. The final lens group Gs consists of the fifth lens group G5. During zooming, the first lens group G1 and the fifth lens group G5 remain stationary with respect to the image plane Sim. During zooming, the second lens group G2, the third lens group G3, and the fourth lens group G4 move along the optical axis Z by changing the distance between the adjacent groups.

The first lens group G1 consists of ten lenses L1$a$ to L1$j$ in order from the object side to the image side. The second lens group G2 consists of five lenses L2$a$ to L2$e$ in order from the object side to the image side. The third lens group G3 consists of two lenses L3$a$ and L3$b$ in order from the object side to the image side. The fourth lens group G4 consists of, in order from the object side to the image side, an aperture stop St and three lenses L4$a$ to L4$c$. The fifth lens group G5 consists of seven lenses L5$a$ to L5$g$ in order from the object side to the image side.

Figure 31:
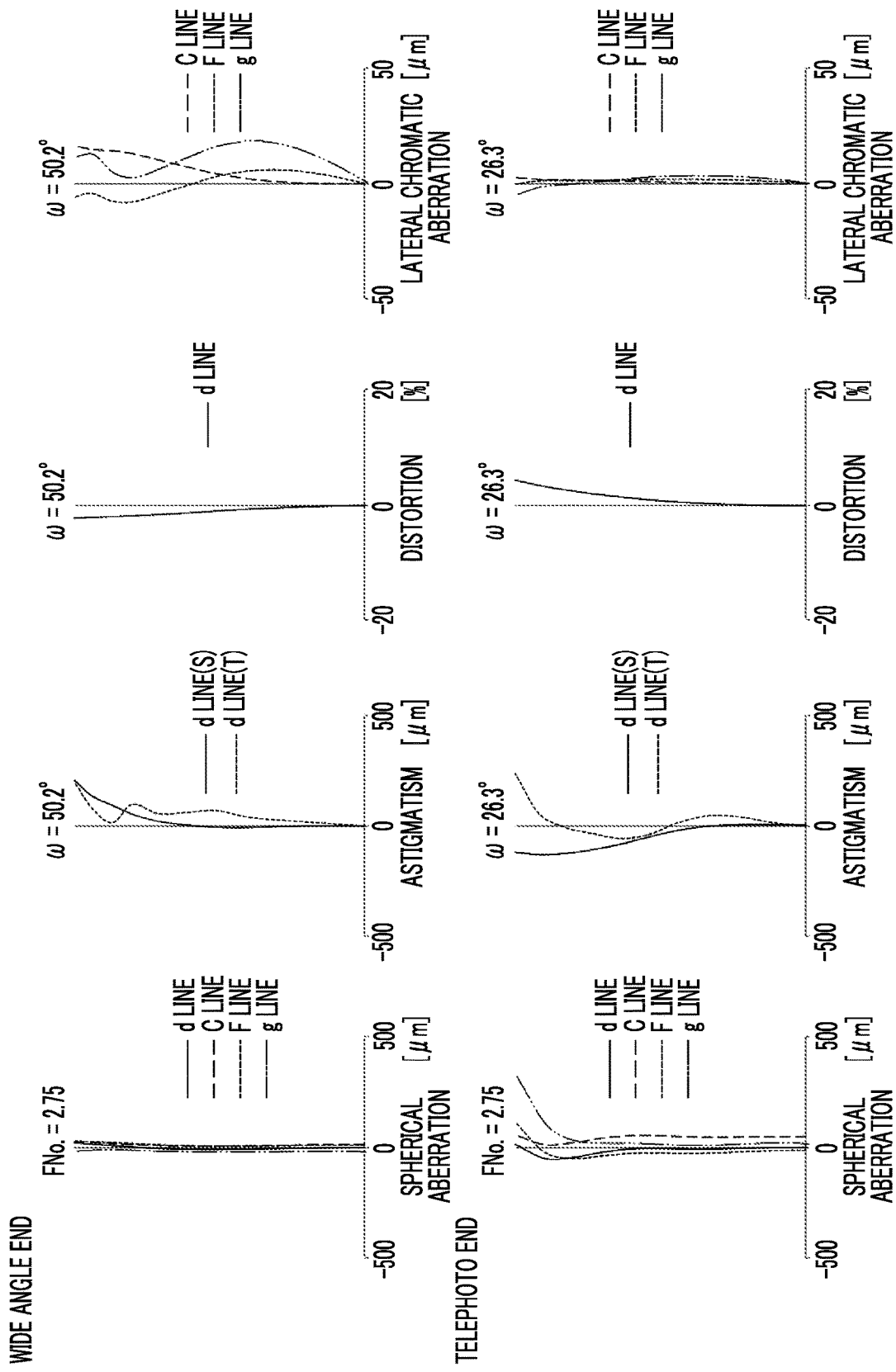
FIG. 31 is a diagram showing aberrations of the zoom lens of Example 15.

Tables 43A and 43B show the basic lens data of the zoom lens of Example 15, Table 44 shows the specifications and the variable surface distances, Table 45 shows the aspheric surface coefficients, and FIG. 31 shows a diagram of aberrations in a state where the object at infinity is in focus. In Tables 43A and 43B, the column of dN/dT and the column of the material name are omitted.

TABLE 43A

Example 15

| Sn | R | D | Nd | vd | θgF |
|---|---|---|---|---|---|
| *1 | 203.42644 | 2.500 | 1.80100 | 34.97 | 0.5864 |
| 2 | 30.99502 | 16.450 | | | |
| *3 | 74.76239 | 2.000 | 2.00069 | 25.46 | 0.6136 |
| 4 | 42.62529 | 18.896 | | | |
| 5 | −53.48118 | 1.400 | 1.49700 | 81.54 | 0.5375 |
| 6 | −243.50052 | 0.121 | | | |
| 7 | 130.23115 | 6.120 | 1.66382 | 27.35 | 0.6320 |
| 8 | −167.03427 | 1.556 | | | |
| 9 | −2279.36265 | 1.500 | 1.75575 | 24.71 | 0.6291 |
| 10 | 211.29277 | 3.011 | | | |
| 11 | 5554.48783 | 6.008 | 1.59282 | 68.62 | 0.5441 |
| *12 | −95.44252 | 8.531 | | | |
| 13 | 106.92189 | 6.074 | 1.49700 | 81.54 | 0.5375 |
| 14 | −369.90146 | 3.890 | | | |
| 15 | 127.21849 | 1.400 | 1.80000 | 29.84 | 0.6018 |
| 16 | 50.31970 | 12.210 | 1.43700 | 95.10 | 0.5336 |
| 17 | −112.74939 | 0.121 | | | |
| 18 | 286.37855 | 5.436 | 1.61490 | 39.88 | 0.5786 |
| 19 | −108.52930 | DD[19] | | | |
| 20 | 57.04391 | 1.138 | 1.90043 | 37.37 | 0.5772 |
| 21 | 27.09299 | 7.420 | | | |
| 22 | −118.41411 | 0.810 | 1.43700 | 95.10 | 0.5336 |
| 23 | 29.49460 | 4.972 | 1.85025 | 30.05 | 0.5980 |
| 24 | 182.38104 | 3.321 | | | |
| 25 | −46.05734 | 1.759 | 1.66382 | 27.35 | 0.6320 |

TABLE 43A-continued

Example 15

| Sn | R | D | Nd | vd | θgF |
|---|---|---|---|---|---|
| 26 | −37.12705 | 0.800 | 1.69560 | 59.05 | 0.5435 |
| 27 | 317.60426 | DD[27] | | | |
| 28 | 376.38055 | 3.917 | 1.87070 | 40.73 | 0.5683 |
| 29 | −58.57740 | 0.810 | 1.66382 | 27.35 | 0.6320 |
| 30 | 2189.94018 | DD[30] | | | |

TABLE 43B

Example 15

| Sn | R | D | Nd | vd | θgF |
|---|---|---|---|---|---|
| 31(St) | ∞ | 1.356 | | | |
| 32 | 126.95242 | 3.071 | 1.89286 | 20.36 | 0.6394 |
| 33 | −202.19149 | 0.120 | | | |
| 34 | 48.07484 | 8.169 | 1.49700 | 81.54 | 0.5375 |
| 35 | −51.98437 | 0.800 | 1.83557 | 31.48 | 0.5962 |
| 36 | 115.51448 | DD[36] | | | |
| 37 | 133.67730 | 9.857 | 1.88123 | 27.78 | 0.6066 |
| 38 | −94.36325 | 3.311 | | | |
| 39 | 43.08483 | 1.000 | 1.83627 | 32.48 | 0.5931 |
| 40 | 24.85515 | 13.411 | 1.43700 | 95.10 | 0.5336 |
| 41 | −58.41518 | 0.163 | | | |
| 42 | −92.61025 | 9.194 | 1.59270 | 35.31 | 0.5934 |
| 43 | −25.25558 | 1.000 | 2.05090 | 26.94 | 0.6052 |
| 44 | 74.44563 | 0.478 | | | |
| 45 | 53.19547 | 12.206 | 1.48749 | 70.24 | 0.5301 |
| 46 | −29.27809 | 1.148 | | | |
| 47 | −62.10509 | 1.000 | 1.78470 | 26.29 | 0.6136 |
| *48 | −137.38171 | 2.000 | | | |
| 49 | ∞ | 3.620 | 1.51680 | 64.20 | 0.5343 |
| 50 | ∞ | 37.221 | | | |

TABLE 44

Example 15

| | Wide Angle End | Telephoto End |
|---|---|---|
| Zr | 1.0 | 2.3 |
| f | 19.696 | 44.927 |
| Bf | 37.220 | 37.220 |
| FNo. | 2.75 | 2.75 |
| 2ω(°) | 100.4 | 52.6 |
| DD[19] | 1.499 | 42.353 |
| DD[27] | 8.550 | 1.538 |
| DD[30] | 21.557 | 1.583 |
| DD[36] | 15.993 | 2.125 |

TABLE 45

Example 15

| Sn | 1 | 3 | 12 | 48 |
|---|---|---|---|---|
| KA | 1.0000000E+00 | 1.0000000E+00 | 1.0000000E+00 | 1.0000000E+00 |
| A4 | 5.3785669E−06 | −3.4307937E−06 | −2.2626731E−08 | 2.9621070E−06 |
| A6 | −4.8494795E−09 | 3.4167768E−09 | 1.0227189E−10 | 2.3246759E−09 |
| A8 | 4.8665795E−12 | −1.8665580E−11 | 1.0771371E−12 | −6.5317849E−11 |
| A10 | −1.5455508E−15 | 9.0157380E−14 | −1.0365097E−14 | 9.5637738E−13 |
| A12 | −3.9697076E−18 | −2.8938770E−16 | 3.9609774E−17 | −7.4022324E−15 |
| A14 | 6.9571629E−21 | 5.8394804E−19 | −8.3984288E−20 | 3.3372961E−17 |
| A16 | −5.1843073E−24 | −7.0620203E−22 | 1.0268104E−22 | −8.6661350E−20 |
| A18 | 1.9354201E−27 | 4.6662529E−25 | −6.7903633E−26 | 1.1952072E−22 |
| A20 | −2.9454871E−31 | −1.2925868E−28 | 1.8846303E−29 | −6.7111424E−26 |

Table 46 shows the corresponding values of Conditional Expressions (1) to (9) of the zoom lenses of Examples 1 to 10 and the corresponding values of Conditional Expressions (8) and (9) of the zoom lenses of Examples 11 to 15. In Examples 1 to 15, the d line is set as the reference wavelength. Table 46 shows the values based on the d line.

TABLE 46

| Expression Number | Conditional Expression | Example 1 | Example 2 | Example 3 | Example 4 | Example 5 |
|---|---|---|---|---|---|---|
| (1) | dNn/dT | −0.1 | −0.1 | 1.5 | −0.2 | −0.1 |
| (2) | Nn + 0.0105 × vn − 2.2188 | 0.00549 | 0.00549 | 0.00119 | 0.00147 | 0.00549 |
| (3) | vp/vn | 2.010 | 1.880 | 1.887 | 1.701 | 2.194 |
| (4) | Nn | 1.83400 | 1.83400 | 1.80440 | 1.71700 | 1.83400 |
| (5) | vn | 37.17 | 37.17 | 39.58 | 47.93 | 37.17 |
| (6) | (dNp/dT)/fp + (dNn/dT)/fn | −0.12 | 0.10 | −0.14 | −0.14 | −0.13 |
| (7) | θgFn − θgFp | 0.0393 | 0.0469 | 0.0368 | 0.0231 | 0.0412 |
| (8) | v pave/v nave | 1.601 | 1.547 | 1.580 | 1.640 | 1.766 |
| (9) | fw/f1 | 0.449 | 0.445 | 0.447 | 0.445 | 0.448 |

| Expression Number | Conditional Expression | Example 6 | Example 7 | Example 8 | Example 9 | Example 10 |
|---|---|---|---|---|---|---|
| (1) | dNn/dT | 1.5 | −0.1 | 2.5 | 2.4 | 2.4 |
| (2) | Nn + 0.0105 × vn − 2.2188 | 0.00119 | 0.00549 | −0.21707 | −0.04603 | −0.04603 |
| (3) | vp/vn | 1.887 | 2.010 | 1.439 | 2.827 | 2.827 |
| (4) | Nn | 1.80440 | 1.83400 | 1.63980 | 1.92119 | 1.92119 |
| (5) | vn | 39.58 | 37.17 | 34.47 | 23.96 | 23.96 |
| (6) | (dNp/dT)/fp + (dNn/dT)/fn | −0.11 | −0.11 | 0.05 | −0.26 | −0.28 |
| (7) | θgFn − θgFp | 0.0368 | 0.0393 | 0.0402 | 0.0760 | 0.0760 |
| (8) | v pave/v nave | 1.281 | 1.462 | 1.566 | 1.286 | 1.340 |
| (9) | fw/f1 | 0.457 | 0.519 | 0.460 | 0.457 | 0.426 |

| Expression Number | Conditional Expression | Example 11 | Example 12 | Example 13 | Example 14 | Example 15 |
|---|---|---|---|---|---|---|
| (8) | v pave/v nave | 1.499 | 1.328 | 1.629 | 1.526 | 1.834 |
| (9) | fw/f1 | 0.442 | 0.432 | 0.402 | 0.423 | 0.484 |

From the above data, it can be seen that the zoom lenses of Examples 1 to 15 have been reduced in size and various aberrations have been satisfactorily corrected to realize high optical performance. Further, it can be seen that the zoom lenses of Examples 1 to 7 satisfactorily correct chromatic aberration in a range from the wide angle end to the telephoto end while suppressing fluctuation in focusing position especially in a case where the temperature at the wide angle end changes.

Figure 32:
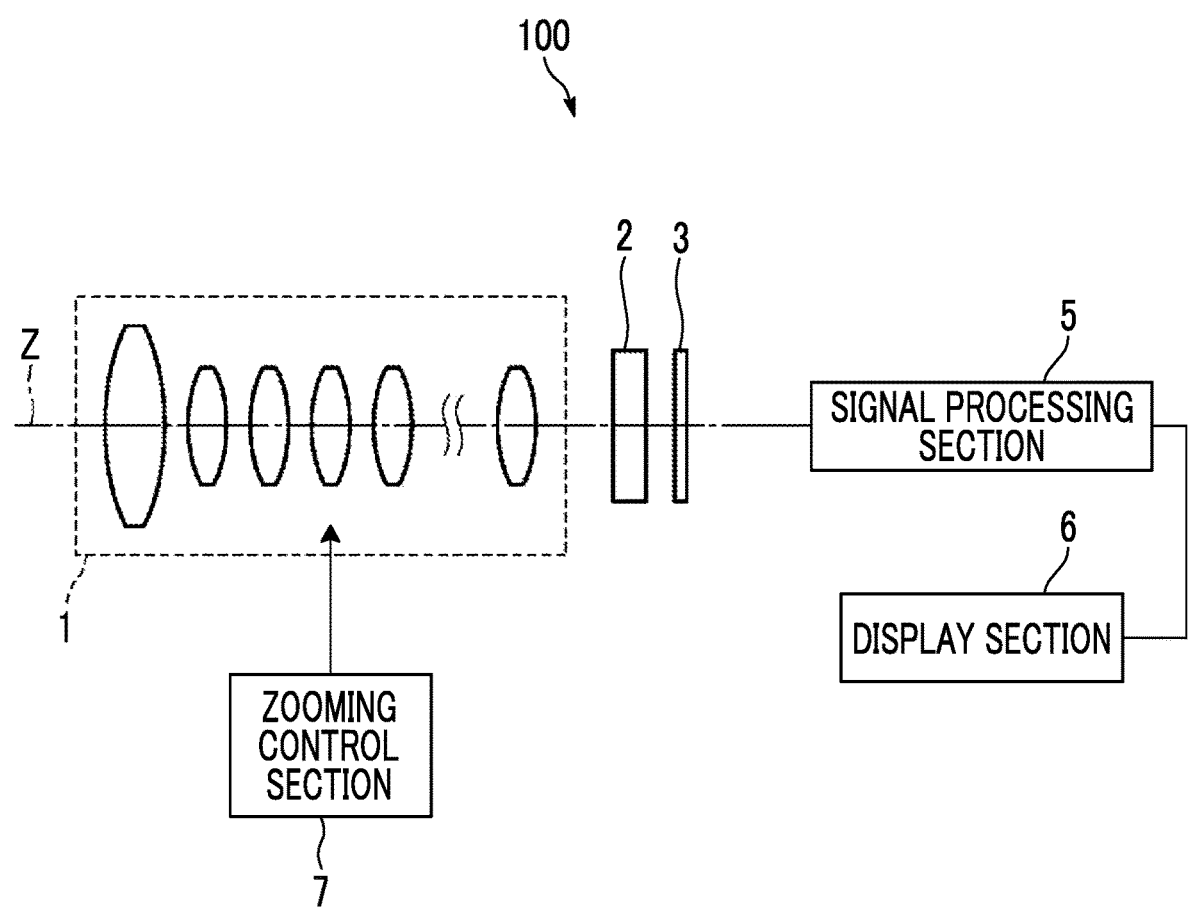
FIG. 32 is a schematic configuration diagram of an imaging apparatus according to an embodiment of the present disclosure.

Next, an imaging apparatus according to an embodiment of the present disclosure will be described. FIG. 32 shows a schematic configuration diagram of an imaging apparatus 100 using the zoom lens 1 according to the embodiment of the present disclosure as an example of the imaging apparatus according to the embodiment of the present disclosure. Examples of the imaging apparatus 100 include a broadcasting camera, a movie camera, a video camera, a surveillance camera, and the like.

The imaging apparatus 100 includes a zoom lens 1, a filter 2 arranged on the image side of the zoom lens 1, and an imaging element 3 arranged on the image side of the filter 2. It should be noted that FIG. 32 schematically shows plural lenses included in the zoom lens 1.

The imaging element 3 converts an optical image formed by the zoom lens 1 into an electric signal, and is able to employ, for example, a charge coupled device (CCD), a complementary metal oxide semiconductor (CMOS), or the like. The imaging element 3 is disposed so that the imaging surface thereof coincides with the image plane of the zoom lens 1.

The imaging apparatus 100 also comprises a signal processing section 5 that calculates and processes an output signal from the imaging element 3, a display section 6 that displays an image formed by the signal processing section 5, and a zooming control section 7 that controls zooming of the zoom lens 1. Although FIG. 32 shows only one imaging element 3, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:
1. A zoom lens consisting of, in order from an object side to an image side:
a first lens group that has a positive refractive power;
a second lens group that has a negative refractive power;
an intermediate lens group that consists of one or two lens groups; and
a final lens group that has a positive refractive power,
wherein during zooming, the second lens group moves along an optical axis, and all distances between adjacent lens groups change, at least one lens group of the intermediate lens group and the final lens group includes a pair of a positive lens and a negative lens arranged adjacent to each other, and assuming that an Abbe number of the positive lens based on a d line is vp, an Abbe number of the negative lens besed on the d lin is vn, a refractive index of the negative lens at the d line is Nn, and a temperature coefficient of the refractive index of the negative lens at the d line is 25° C. is $(dNn/dT) \times 10^{-6}$, where a unit of dNn/dT is $° C.^{-1}$, Conditional Expressions (1), (2), and (3) are satisfied:

$$-1.5 < dNn/dT < 3 \qquad (1),$$

$$0 < Nn + 0.0105 \times vn - 2.2188 < 0.15 \qquad (2), \text{ and}$$

$$1.5 < vp/vn < 2.5 \qquad (3).$$

2. The zoom lens according to claim 1, wherein Conditional Expressions (4) and (5) are satisfied:

$$1.68 < Nn < 1.88 \qquad (4), \text{ and}$$

$$30 < vn < 50 \qquad (5).$$

3. The zoom lens according to claim 1, wherein assuming that a focal length of the positive lens is fp, a focal length of the negative lens is fn, and a temperature coefficient of the refractive index of the positive lens at the d line at 25° C. is $(dNp/dT) \times 10^{-6}$, where a unit of fp and fn is mm and a unit of dNp/dT is $° C.^{-1}$, Conditional Expression (6) is satisfied:

$$-0.2 < (dNp/dT)/fp + (dNn/dT)/fn < 0.2 \qquad (6).$$

4. The zoom lens according to claim 1, wherein assuming that a partial dispersion ratio of the positive lens between a g line and an F line is θgFp, and a partial dispersion ratio of the negative lens between the g line and the F line is θgFn, Conditional Expression (7) is satisfied:

$$0 < \theta gFn - \theta gFp < 0.07 \qquad (7).$$

5. The zoom lens according to claim 1, wherein assuming that an average value of Abbe numbers of all positive lenses included in the intermediate lens group and the final lens group based on a d line is vpave, and an average value of Abbe numbers of all negative lenses included in the intermediate lens group and the final lens group based on the d line is vnave, Conditional Expression (8) is satisfied:

$$1 < vpave/vnave < 1.85 \qquad (8).$$

6. The zoom lens according to claim 1, wherein the first lens group remains stationary with respect to an image plane during zooming.

7. The zoom lens according to claim 1, wherein the final lens group remains stationary with respect to an image plane during zooming.

8. The zoom lens according to claim 1, wherein assuming that a focal length of the zoom lens at a wide angle end in a state where an object at infinity is in focus is fw, and a focal length of the first lens group is f1, Conditional Expression (9) is satisfied:

$$0.3 < fw/f1 < 0.55 \qquad (9).$$

9. The zoom lens according to claim 1, wherein the intermediate lens group consists of, in order from the object side to the image side:

a third lens group having a positive refractive power; and a fourth lens group having a positive refractive power.

10. The zoom lens according to claim 1, wherein the intermediate lens group consists of, in order from the object side to the image side:

a third lens group having a negative refractive power; and a fourth lens group having a positive refractive power.

11. The zoom lens according to claim 1, wherein Conditional Expression (1-1) is satisfied:

$$-0.5 < dNn/dT < 2 \qquad (1\text{-}1).$$

12. The zoom lens according to claim 1, wherein Conditional Expression (2-1) is satisfied:

$$0 < Nn + 0.0105 \times vn - 2.2188 < 0.1 \qquad (2\text{-}1).$$

13. The zoom lens according to claim 1, wherein Conditional Expression (3-1) is satisfied:

$$1.7 < vp/vn < 2.3 \qquad (3\text{-}1).$$

14. The zoom lens according to claim 2, wherein Conditional Expression (4-1) is satisfied:

$$1.71 < Nn < 1.85 \qquad (4\text{-}1).$$

15. The zoom lens according to claim 2, wherein Conditional Expression (5-1) is satisfied:

$$33 < vn < 48 \qquad (5\text{-}1).$$

16. The zoom lens according to claim 3 wherein Conditional Expression (6-1) is satisfied:

$$-0.15 < (dNp/dT)/fp + (dNn/dT)/fn < 0.15 \qquad (6\text{-}1).$$

17. The zoom lens according to claim 4, wherein Conditional Expression (7-1) is satisfied:

$$0.01 < \theta gFn - \theta gFp < 0.06 \qquad (7\text{-}1).$$

18. The zoom lens according to claim 5, wherein Conditional Expression (8-1) is satisfied:

$$1 < vpave/vnave < 1.8 \qquad (8\text{-}1).$$

19. An imaging apparatus comprising the zoom lens according to claim 1.

* * * * *